(12) United States Patent
Krasser et al.

(10) Patent No.: US 10,726,128 B2
(45) Date of Patent: Jul. 28, 2020

(54) MALWARE DETECTION USING LOCAL COMPUTATIONAL MODELS

(71) Applicant: CrowdStrike, Inc., Irvine, CA (US)

(72) Inventors: Sven Krasser, Los Angeles, CA (US);
David Elkind, Arlington, VA (US);
Patrick Crenshaw, Atlanta, GA (US);
Kirby James Koster, Lino Lakes, MN (US)

(73) Assignee: CrowdStrike, Inc., Irvine, CA (US)

( * ) Notice: Subject to any disclaimer, the term of this patent is extended or adjusted under 35 U.S.C. 154(b) by 238 days.

(21) Appl. No.: 15/657,379

(22) Filed: Jul. 24, 2017

(65) Prior Publication Data
US 2019/0026466 A1 Jan. 24, 2019

(51) Int. Cl.
| | | |
|---|---|---|
| *G06F 21/56* | (2013.01) | |
| *G06F 21/55* | (2013.01) | |
| *H04L 29/06* | (2006.01) | |
| *G06N 20/20* | (2019.01) | |
| *G06N 3/04* | (2006.01) | |
| *G06N 3/08* | (2006.01) | |
| *G06N 7/00* | (2006.01) | |

(52) U.S. Cl.
CPC .......... *G06F 21/566* (2013.01); *G06F 21/552* (2013.01); *G06F 21/565* (2013.01); *G06N 3/0454* (2013.01); *G06N 3/08* (2013.01); *G06N 7/005* (2013.01); *G06N 20/20* (2019.01); *H04L 63/1425* (2013.01)

(58) Field of Classification Search
CPC .................................................... G06F 21/566
See application file for complete search history.

(56) References Cited

U.S. PATENT DOCUMENTS

| | | | | |
|---|---|---|---|---|
| 2007/0240219 | A1* | 10/2007 | Tuvell | G06F 21/56 726/24 |
| 2008/0178288 | A1 | 7/2008 | Alperovitch et al. | |
| 2010/0192222 | A1 | 7/2010 | Stokes et al. | |
| 2015/0040218 | A1 | 2/2015 | Alperovitch et al. | |

(Continued)

OTHER PUBLICATIONS

Ghahramani, Z., "A Tutorial on Gaussian Processes (or why I don't use SVMs)", 2011, retrieved May 15, 2017 from <<http://mlss2011.comp.nus.edu.sg/uploads/Site/lect1gp.pdf >>, 31 pages.

(Continued)

*Primary Examiner* — Simon P Kanaan
(74) *Attorney, Agent, or Firm* — Lee & Hayes, P.C.

(57) ABSTRACT

Example techniques herein determine that a trial data stream is associated with malware ("dirty") using a local computational model (CM). The data stream can be represented by a feature vector. A control unit can receive a first, dirty feature vector (e.g., a false miss) and determine the local CM based on the first feature vector. The control unit can receive a trial feature vector representing the trial data stream. The control unit can determine that the trial data stream is dirty if a broad CM or the local CM determines that the trial feature vector is dirty. In some examples, the local CM can define a dirty region in a feature space. The control unit can determine the local CM based on the first feature vector and other clean or dirty feature vectors, e.g., a clean feature vector nearest to the first feature vector.

18 Claims, 17 Drawing Sheets

(56) References Cited

U.S. PATENT DOCUMENTS

| | | | | |
|---|---|---|---|---|
| 2015/0128263 | A1* | 5/2015 | Raugas | H04L 63/1408 726/23 |
| 2015/0295945 | A1* | 10/2015 | Canzanese, Jr. | G06F 9/45545 726/23 |
| 2017/0053119 | A1 | 2/2017 | Mankin et al. | |
| 2018/0314835 | A1* | 11/2018 | Dodson | G06F 21/577 |

OTHER PUBLICATIONS

"Mahalanobis Distance", Wikipedia, Feb. 19, 2017, retrieved May 15, 2017 from <<https://en.wikipedia.org/w/index.php?title=Mahalanobis_distance&oldid=766325418>>, 5 pages.

Andrianakis, et al., "Parameter Estimation and Prediction Using Gaussian Process", Aug. 20, 2009, retrieved from <<http://mucm.ac.uk/Pages/Downloads/Technical%20Reports/09-05%20YA%203.2.3%20Parameter%20estimation%20and%20prediction%20using%20Gaussian.pdf>>, 16 pages.

Breiman, et al., "Random Forests", retrieved Jun. 12, 2017 from <<https://www.stat.berkeley.edu/~breiman/RandomForests/cc_home.htm>>, 24 pages.

"Introduction to Boosted Trees", xgboost 0.6 documentation, retrieved Jun. 12, 2017 from <<http://xgboost.readthedocs.io/en/latest/model.html>>, 5 pages.

Jones, et al., "Efficient Global Optimization of Expensive Black-Box Functions", Journal of Global Optimization, vol. 13, Dec. 1998, pp. 455-492.

Rasmussen, et al., "Gaussian Processes for Machine Learning", MIT Press, 2006, Chapter 6, 22 pages.

Rasmussen, et al., "Gaussian Processes for Machine Learning", MIT Press, 2006, Chapter 5, 24 pages.

"Trevor 79 Comments on Iam Jon Miller", Reddit, retrieved Nov. 1, 2017 from <<https://www.reddit.com/r/IAmA/comments/5qibxb/i_am_jon_miller_cylance_chief_research_officer/dczhbaa/?st=j9hiqa95&sh=ab4b2557>> 3 pages.

Wallace, B., "Hunting for Malware with Machine Learning", Cylance, Dec. 18, 2015, 11 pages.

Extended European Search Report dated Dec. 11, 2018 for European Patent Application No. 18183807.9, 11 pages.

European Office Action dated Jul. 17, 2019 for European Patent Application No. 18183807.9, a counterpart of U.S. Appl. No. 15/657,379, 5 pages.

* cited by examiner

MALWARE DETECTION USING LOCAL COMPUTATIONAL MODELS

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, macros or scripts embedded in document files, steganographic encodings within media files such as images, and/or other types of computer programs, or combinations thereof.

Malware authors or distributors ("adversaries") frequently produce new variants of malware in attempts to evade detection by malware-detection or -removal tools. For example, adversaries may use various obfuscation techniques to change the contents of a malware file without changing its malicious function. Consequently, it is challenging to determine if a program is malware and, if so, to determine the harmful actions the malware performs without actually running the malware.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
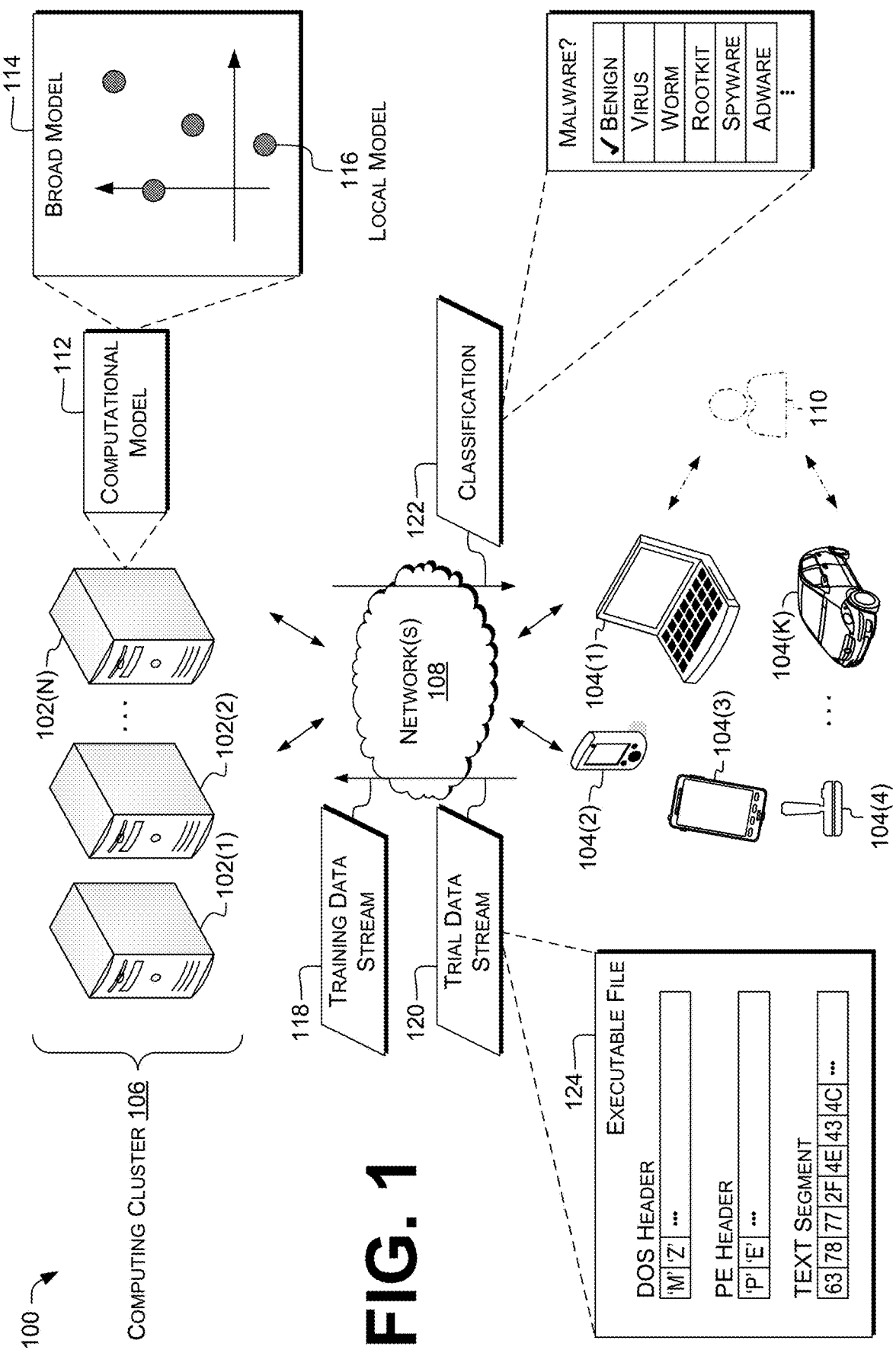
FIG. 1 is a block diagram depicting example scenarios for determining and operating computational model(s) as described herein.

Some examples herein relate to detection or classification of malware, e.g., newly-discovered malware. Some examples herein relate to determining of computational models that can detect malware or that can classify files (or other data streams, and likewise throughout this discussion). Classifications can include, e.g., malware vs. non-malware, type of malware (e.g., virus vs. Trojan), or family of malware (WannaCry, Cryptolocker, Poison Ivy, etc.). Some examples permit reducing the time or memory or network bandwidth required to train computational models. Some examples permit more effectively detecting or classifying malware samples, e.g., without requiring retraining of a computational model.

Throughout this document, "dirty" is used to refer to data streams associated with malware, feature vectors representing such data streams, or other values associated with, produced by, or indicative of malware or malicious behavior. "Clean" is used to refer to values not associated with, produced by, or indicative of malware or malicious behavior. A "false detection" or "false positive" is a determination that a data stream is associated with malware when, in fact, that data stream is not associated with malware, or the data stream that is the subject of such a determination. A "false miss" or "false negative" is a determination that a data stream is not associated with malware when, in fact, that data stream is indeed associated with malware, or the data stream that is the subject of such a determination. Various examples herein permit reducing the occurrence of false misses by, once a false miss occurs, determining a local computational model that can be used to prevent the same or similar false misses from occurring again.

Some examples herein permit analyzing a data stream including data stored in, e.g., a file, a disk boot sector or partition root sector, or a block of memory, or a portion thereof. For brevity, the term "sample" herein refers to a data stream, or a portion of a data stream being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample. Some examples determine or use a classification indicating, e.g., characteristics of a sample (e.g., a data stream).

Some examples can determine a local computational model representing both a dirty data stream and similar data stream(s). This can permit avoiding a false miss with respect to both the dirty data stream and variants thereof. Some examples can test a trial data stream against a broad computational model and at least one local computational model to determine whether the trial data stream is associated with malware. Some examples can significantly reduce the amount of time required to update a computational model based on newly-discovered malware samples, compared to prior schemes, by using the local computational model(s) together with the broad computational model instead of by rebuilding the broad computational model.

While example techniques described herein may refer to analyzing a program that may potentially be malware, it is understood that the techniques may also apply to other software, e.g., non-malicious software. Accordingly, analysis of data streams discussed herein may be used by, for example, anti-malware security researchers, white-hat vulnerability researchers, interoperability developers, anti-piracy testers or other analysts of data streams. In some examples, the described techniques are used to detect, and prevent execution of, predetermined software packages, e.g., for enforcement of computer-security policies. In some examples, techniques described herein can be used to detect not only a current version of a specific prohibited software package, but also future versions of that software package, or other data streams similar to the prohibited software package.

Various entities, configurations of electronic devices, and methods for determining and operating computational models, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

FIG. 1 shows an example scenario 100 in which examples of computational-model-based systems can operate and/or in which computational-model determination and/or use methods such as those described herein can be performed. Illustrated devices and/or components of scenario 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N<K or N>K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

In some examples, as indicated, computing device(s), e.g., computing devices 102(1) and 104(1), can intercommunicate to participate in and/or carry out computational-model determination and/or operation as described herein. For example, computing device 104(1) can be or include a data source owned or operated by or on behalf of a user, and computing device 102(1) can be a computational-model determination and operation system, as described below.

Different devices and/or types of computing devices 102 and 104 can have different needs and/or ways of interacting with cluster 106. For example, computing devices 104 can interact with cluster 106 with discrete request/response communications, e.g., for queries and responses using an already-determined computational model. For example, a computing device 104 can provide a signature or a feature vector of a sample and receive from cluster 106 an indication of whether the sample is malware. A signature can include, e.g., the output of a hash function applied to the data stream, e.g., a cryptographic hash, locality-sensitive hash, or other hash function. Additionally and/or alternatively, computing devices 104 can be data sources and can interact with cluster 106 with discrete and/or ongoing transmissions of data to be used as input to a computational model or a technique of determining a computational model. For example, a data source in a personal computing device 104(1) can provide to cluster 106 data of newly-installed executable files, e.g., signatures or feature vectors of those files, after installation and before execution of those files. The data of newly-installed executable files can include, e.g., identifiers (e.g., cryptographic hashes) and feature data such as that as described herein with respect to Table 1. This can provide improved accuracy of outputs of a computational model (CM), e.g., a malware-detection CM, by increasing the amount of data input to the CM. Additionally and/or alternatively, computing devices 104 can be data sinks and can interact with cluster 106 with discrete and/or ongoing requests for data output from a CM, e.g., updates to black-lists or other computational models. Examples are discussed herein, e.g., with reference to operations 1224, 1228, and 1230.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Communications between computing devices 102 and/or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services and/or Representational State Transfer (REST) API endpoint. Remote Procedure Call (RPC) APIs or other types of APIs can additionally or alternatively be used for network communications.

In some examples, computing devices 102 and/or 104, e.g., laptops, smartphones, and/or other computing devices 102 and/or 104 described herein, interact with an entity 110 (shown in phantom). The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 operate CM(s) to determine a model output corresponding to a file on a user's computing device 104, and transmit an indication of the model output via network 108 to the computing device 104, e.g., a smartphone. The computing device 104 can, e.g., present information of the model output to entity 110. A "trial" data stream refers to a data stream being tested against an existing broad model 114 and local model(s) 116 to determine whether that data stream is associated with malware, or other characteristics of that data stream. Examples of processing of trial files, e.g., from a user's computing device 104, are discussed in more detail below with reference to at least FIG. 3, 4, 9, 10, or 12.

Computing device(s) 102 can store one or more computational model(s), CM(s), 112, individually and/or collectively referred to herein with reference 112. In some examples, algorithms for determining or operating CM(s) 112 as described herein can be performed on a computing device (e.g., computing device 102), such as a smartphone, a tablet, a desktop computer, a server, a server blade, a supercomputer, etc. The resulting models can be used on such computing devices and/or on computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 102 can determine a CM 112 initially and the computing device(s) 104 can perform incremental updating of the CM 112.

In various examples, e.g., of CM(s) 112 for classifying files, determining whether files contain malware, or other use cases noted herein, the CM(s) 112 may include, but are not limited to, multilayer perceptrons (MLPs), neural networks (NNs), gradient-boosted NNs, deep neural networks (DNNs) (i.e., neural networks having at least one hidden layer between an input layer and an output layer), recurrent neural networks (RNNs) such as long short-term memory (LSTM) networks or Gated Recurrent Unit (GRU) networks, decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMMs). The CMs 112 can additionally or alternatively include regression models, e.g., linear or nonlinear regression using mean squared deviation (MSD) or median absolute deviation (MAD) to determine fitting error during the regression; linear least squares or ordinary least squares (OLS); fitting using generalized linear models (GLM); hierarchical regression; Bayesian regression; or nonparametric regression. In some examples, a CM 112 includes a set of signatures used to detect malware, e.g., antivirus signatures such as hashes or portions of a data stream, or file rules such as those used by PEiD or TrID.

The CMs 112 can include parameters governing or affecting the output of the CM 112 for a particular input. Parameters can include, but are not limited to, e.g., per-neuron, per-input weight or bias values, activation-function selections, neuron weights, edge weights, tree-node weights, or other data values. A training module 226, FIG. 2, can be configured to determine CMs 112, e.g., to determine values of parameters in CMs 112. For example, CMs 112 can be determined using an iterative update rule such as gradient descent (e.g., stochastic gradient descent or AdaGrad) with backpropagation.

In some examples, the training module 226 can determine the CMs 112 based at least in part on "hyperparameters," values governing the training. Example hyperparameters can include learning rate(s), momentum factor(s), minibatch size, maximum tree depth, maximum number of trees, regularization parameters, dropout, class weighting, or convergence criteria. In some examples, the training module 226 can determine the CMs 112 in an iterative technique or routine involving updating and validation. The training data set can be used to update the CMs 112, and the validation data set can be used in determining (1) whether the updated CMs 112 meet training criteria or (2) how the next update to the CMs 112 should be performed. Examples are discussed herein, e.g., with reference to at least FIG. 8.

The computing device(s) 102 can be configured to use the determined parameter values of trained CM(s) 112 to, e.g., categorize a file with respect to malware type, and/or to perform other data analysis and/or processing. In some examples, the computing device 104 can be configured to communicate with computing device(s) 102 to operate a CM 112. For example, the computing device 104 can transmit a request to computing device(s) 102 for an output of the CM(s) 112, receive a response, and take action based on that response. For example, the computing device 104 can provide to entity 110 information included in the response, or can quarantine or delete file(s) indicated in the response as being associated with malware.

In some examples, CM 112 includes one or more broad computational model(s) ("broad model") 114 and zero or more local computational model(s) ("local model(s)") 116. A sample is considered to be malware, in some examples, if it is indicated as being malware by the broad model 114 or by at least one of the local models 116. A broad model 114, or any local model 116, can include any of the types of CM described herein with reference to CM 112, e.g., neural networks or decision forests.

Throughout this document, examples are given in the context of local models 116 being used to rectify false misses of broad model 114. The techniques herein can additionally or alternatively be used to rectify false detections of the broad model 114. For example, a sample can be considered to be clean if it is indicated as being clean by the broad model 144 or by at least one of the local models 116. In some examples, some local models 116 can be used to rectify false misses and other local models 116 can be used to rectify false detections.

The broad model 114 is depicted as covering a feature space. The feature space is graphically represented (without limitation) by two orthogonal axes. Throughout this document, a "feature vector" is a collection of values associated with respective axes in the feature space. Accordingly, a feature vector defines a point in feature space when the tail of the feature vector is placed at the origin of the N-dimensional feature space. Feature vectors can often be represented as mathematical vectors of, e.g., scalar or vector values, but this is not required. The feature space can have any number N of dimensions, $N \geq 1$. In some examples, features can be determined by a feature extractor, such as a previously-trained CM or a hand-coded feature extractor. For example, features can be hidden-neuron outputs of a denoising autoencoder, as discussed below.

In some examples, a feature vector can at least one of the features listed in Table 1 with respect to a data stream. For brevity, the symbol $\Sigma$ in Table 1 refers to the data stream or portion(s) thereof as may be determined or processed by a feature extractor. In some examples, the feature vector can include any of the categorical or discrete-valued features in Table 1, encoded as one-hot or n-hot categorical data.

TABLE 1

| Feature |
|---|
| Entropy of $\Sigma$ |
| Entropy of a segment or other portion(s) of $\Sigma$, e.g., a TEXT or DATA segment |
| Entropy of a subset of $\Sigma$, e.g., of multiple sections |
| Character(s) or symbol(s), or hash(es) or other representation(s), of human-readable text ("printable strings") included in $\Sigma$ |
| Number of printable strings in $\Sigma$ |
| Flags or other values of standardized headers in $\Sigma$, e.g., the MZ or PE headers or the DLL import table of a WINDOWS executable file 124 |
| Flags or other values of other headers or structures in $\Sigma$, e.g., comp.id values found in the Rich header in a WINDOWS executable file 124 |
| Contents of $\Sigma$, e.g., ten (or another number of) bytes at the entry point or the beginning of main( ) in an executable file 124 |
| Output(s) of an autoencoder (as discussed below) when provided $\Sigma$ as input, e.g., when provided bytes at the entry point |
| Size of $\Sigma$ (e.g., in bytes) |
| A cryptographic hash value, e.g., a Secure Hash Algorithm 2-256 bit (SHA-256), SHA-3, Skein, or other cryptographic hash value(s) of at least portion(s) of $\Sigma$, e.g., of headers, individual sections, metadata, version information, or icons, text, fonts, audio, graphics, or other content assets embedded or included in $\Sigma$. |
| Output(s) of hash function(s) applied to at least portion(s) of $\Sigma$, e.g., as noted in the previous item. Hash function(s) can include, e.g., cryptographic hash function(s), as noted above, locality-sensitive hash function(s), context-triggered piecewise hashes such as the ssdeep hash, or other hash function(s). |
| Computer Antivirus Research Organization (CARO) family name, or other human-readable malware name, or numeric (e.g., interned) representation of any of those. |
| File type of $\Sigma$, e.g., as output by pefile, PEiD, TrID, or file(1) |

As noted in Table 1, one example feature is output(s) of an autoencoder. An autoencoder can include, e.g., a deep neural network, trained to produce output substantially equal to its input. Neural-network autoencoders generally include at least one hidden layer having fewer outputs than the number of inputs. As a result, the outputs of the hidden layer are a representation of the input, and that representation has lower dimensionality than the input itself. This reduction in dimensionality can provide information about the structure of the input or of a class of related inputs. In some examples, the autoencoder is a denoising autoencoder. The denoising autoencoder is trained to produce output substantially equal to a reference, when the training inputs to the neural network are portions of, or partly-corrupted versions of, the reference. The lower-dimensional hidden-layer outputs of a denoising autoencoder can provide information about the input that is robust to minor variations, such as may be introduced by adversaries to render their malware more difficult to detect. In some examples, e.g., of an autoencoder having n neurons in the hidden layer, two or more, or all n, hidden-layer outputs can be a single feature, e.g., a vector-valued feature, or each hidden-layer output can be a separate feature. Similarly, for other features listed in Table 1 that include multiple values, the multiple values can be respective, different features, or can be combined into one or more aggregate features.

Locality-sensitive hashing (LSH) techniques, which can be used singly or in combination with other techniques to determine feature value(s), can include lattice LSH, spherical LSH, or other $l_p$-distance based LSH techniques; $E^2$LSH, kernel LSH, or other angle-based LSH techniques; Hamming-distance based LSH techniques; min-hash, K-min sketch, or other Jaccard-coefficient based LSH techniques; chi-squared-based LSH techniques; winner-take-all hashing; or shift-invariant kernel hashing.

In some examples, given a feature vector in the feature space, e.g., anywhere in the feature space, the broad model 114 can provide an indication of whether or not a data stream represented by that feature vector is considered to be associated with malware. For example, broad model 114 can be a classification model. Broad model 114 may vary in accuracy across the feature space, in some examples.

Each local model 116 is depicted as covering a particular portion of the feature space. Although graphically represented as circles, local models 116 do not necessarily cover the same extent in each dimension of the feature space. For example, local models 116 may not be spherical in shape, with respect to a particular space. In some examples, the portion of the feature space covered by a particular local model 116 is referred to as a "dirty region," i.e., a region in which feature vectors are considered to represent data streams associated with malware. In some examples, each local model 116 is associated with a false miss. For example, a local model 116 can be a hypersphere in feature space centered at the feature vector of a respective false miss, as discussed herein with reference to FIGS. 8 and 9. As used herein, a "hypersphere" is a ball having a center c and a radius R. A hypersphere includes all points p for which the distance to the center is less than, or less than or equal to, R, i.e., $\|p-c\|<R$ or $\|p-c\|\leq R$. A hypersphere can be in a space having one or more dimensions. Additionally or alternatively, a dirty region can be, in a space having one or more dimensions, a hyperellipsoid or other hyperconic section, a simplex (e.g., a 2D triangle), a hypercube, or another polytope. In some examples, a dirty region can include one or more connected or disjoint regions or segments. In some examples, a dirty region can be or include a sponge or hypersponge. In some examples, a dirty region is not defined geometrically, e.g., as discussed herein with reference to FIGS. 15-17.

In the illustrated example, computing device(s) 104 provide data streams (or portions thereof, and likewise throughout this document) to computing device(s) 102. The illustrated data streams include training data stream 118 and trial data stream 120. Although only one of each stream 118 and 120 is shown, multiple of either can be used. The computing device(s) 102 can determine or operate CM 112 based at least in part on the stream(s) 118 and 120. The computing device(s) 102 can provide to computing device(s) 104 a classification 122 or other outputs of CM 112. In some examples, at least one of, or all of, the training data stream(s) 118 or trial data stream(s) can comprise or consist of the partial or full contents of respective digital files, e.g., executable files, data files, or system files. In some examples, training data stream 118 can be used in determining CM 112, and CM 112 can be operated to determine whether trial data stream 120 is associated with malware.

In the illustrated example, trial data stream 120 includes bytes of an executable file ("EXE") 124, e.g., a WINDOWS Portable Executable (PE)-format file. The specific illustrated form and contents of executable file 124 are provided for clarity of explanation, and are not limiting. The illustrated executable file 124 includes a DOS (Disk Operating System) header ("MZ"), a PE header, and a TEXT segment including computer-executable instructions. In this example, the first byte of the TEXT segment is an entry point at which execution begins, e.g., after an operating system loads the executable file 124 into memory. Trial data stream 120 can include any number of bytes of the executable file 124, e.g., of headers, the TEXT segment, or other segments (e.g., a DATA segment holding compile-time-initialized data).

In some examples, data streams 118 and 120 have the same format (although this is not required). Moreover, in some examples, CM 112 can perform the same processing on a training data stream 118 as on a trial data stream 120. Accordingly, discussion herein of formats or processing of trial data stream 120 can additionally or alternatively apply to training data stream 118, and vice versa, unless otherwise expressly specified.

In the illustrated example, the classification 122 includes a bitmask, attribute list, softmax output, or other representation of categories to which the trial data stream 120 belongs, as determined by CM 112. For example, classification 122 can include a Boolean value indicating whether or not trial data stream 120 is associated with malware, or an enumerated value indicating with which of several categories the trial data stream 120 is associated (e.g., "benign," "virus," or "spyware"). Classification 122 can additionally or alternatively include one or more confidence values or other values indicating the likelihood of a classification, e.g., a "spyware" value of 0.42 indicating a 42% likelihood that the sample is spyware. In an example, classification 122 can include multiple confidence values for respective categories of malware (e.g., "spyware=0.42; worm=0.05").

A data stream 118 or 120, e.g., an executable file 124, can be associated with malware if, e.g., the data stream is itself malicious code; the data stream is (or is likely) at least a portion of a grouping of malicious code (e.g., a benign file modified by a file infector virus); the data stream is, or is output by, a generator commonly used for generating malware (e.g., a packer or installer); or the data stream is an input file relied on by malware (e.g., a large sequence of data designed to trigger a buffer overflow that will permit remote code execution, or shellcode embedded in a document file). In an example of generators, a data stream 118 or 120 may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with malware, as indicated by the classification 122. Some generators are used for malware, and are also used for legitimate software. A determination that a data stream is associated with malware does not necessarily require or guarantee that the data stream in fact be malware. In some examples, classification 122 can be used by a security analyst in triaging data streams, and can permit the security analyst to readily separate data streams based on a likelihood they are in fact malware. In some examples, a computer-security system can delete or quarantine files associated with malware, or terminate processes launched from data streams associated with malware.

In some examples, malware comprises malicious data instead of or in addition to malicious code. Such data is also considered to be associated with malware. For example, some programs may have bugs that prevent them from correctly processing certain inputs. Examples include Structured Query Language (SQL) injection attacks, in which a program populates a query with unescaped external data. For example, the query template "SELECT cost from Products WHERE name LIKE '%{$name}%';" can be abused by providing malicious data to be populated in place of the placeholder "{$name}". When the malicious data $name="foo'; DROP TABLE Products;—" is substituted into the query template, for example, the resulting query will cause the "Products" table of the database to be deleted ("dropped"), causing unexpected loss of data. In another example, malicious data can include malformed UTF-8 (Unicode Transformation Format-8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

Except as expressly indicated otherwise, a determination of whether a trial data stream 120 is associated with malware is carried out programmatically by or using CM 112 according to techniques herein. Various examples herein can be performed without human judgment of whether a program or data block is in fact malicious. Using CM 112 can permit more readily identifying potential computational threats, e.g., in the context of an antivirus program, cloud security service, or on-premises security appliance.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), depicted as a joystick), automotive computers such as vehicle control systems, vehicle security systems, and/or electronic keys for vehicles (e.g., 104(K), depicted as an automobile), desktop computers, and/or integrated components for inclusion in computing devices, appliances, and/or other computing device(s) configured to participate in and/or carry out computational-model determination and/or operation as described herein, e.g., for file-analysis or malware-detection purposes.

Network(s) 108 can include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

As noted above, network(s) 108 can include public network(s) or private network(s). Example private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
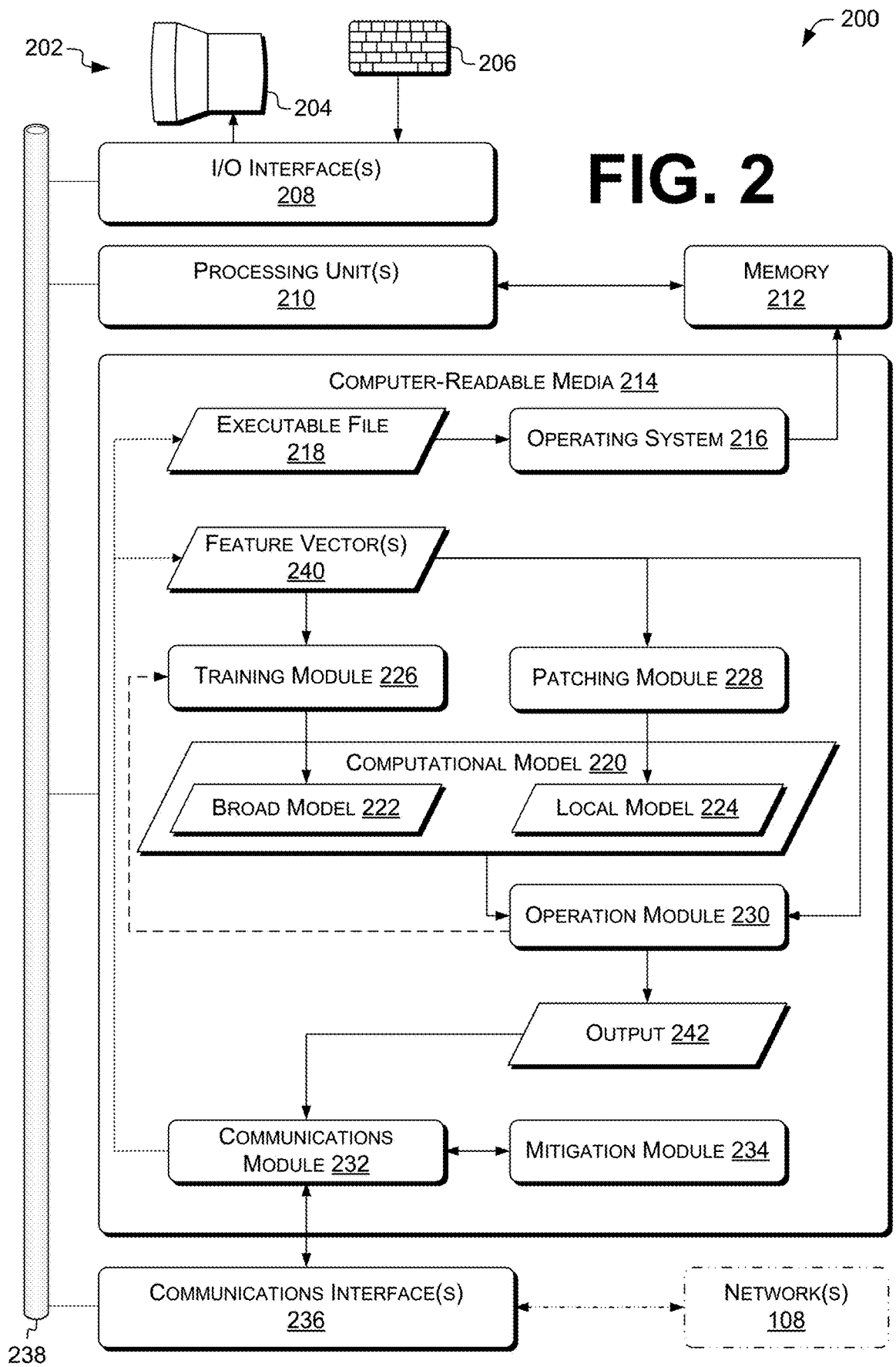
FIG. 2 is a block diagram depicting an example computing device configured to participate in determining or operating computational model(s) according to various examples described herein.

FIG. 2 is an illustrative diagram that shows example components of a computing device 200, which can represent computing device(s) 102 and/or 104, and which can be and/or implement a computational-model determination and/or operation system, device, and/or apparatus, according to various examples described herein. Computing device 200 can include and/or be included in a system and/or device for determining and/or operating a computational model as described herein.

Computing device 200 can include and/or be connected to a user interface 202. In some examples, user interface 202 can be configured to permit a user, e.g., entity 110 and/or a computational-model (CM) administrator, to operate the CM 112, or to control and/or otherwise interact with cluster 106 and/or computing devices 102 therein. Accordingly, actions such as presenting information of or corresponding to an output of a CM 112 to entity 110 can be taken via user interface 202.

In some examples, user interface 202 can include various types of output devices configured for communication to a user and/or to another computing device 200. Output devices can be integral and/or peripheral to computing device 200. Examples of output devices can include a display 204, a printer, audio speakers, beepers, and/or other audio output devices, a vibration motor, linear vibrator, and/or other haptic output device, and the like. Display 204 can include an organic light-emitting-diode (OLED) display, a liquid-crystal display (LCD), a cathode-ray tube (CRT), and/or another type of visual display. Display 204 can be a component of a touchscreen, and/or can include a touchscreen.

User interface 202 can include a user-operable input device 206 (depicted as a gamepad). User-operable input device 206 can include one or more input devices, integral and/or peripheral to computing device 200. The input devices can be user-operable, and/or can be configured for input from other computing device 200. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 202.

Computing device 200 can further include one or more input/output (I/O) interface(s) 208 to allow computing device 200 to communicate with input, output, and/or I/O devices (for clarity, some not depicted). Examples of such devices can include components of user interface 202 such as user-operable input devices and output devices described above. Other examples of such devices can include power meters, accelerometers, and other devices for measuring properties of entity 110, computing device 200, and/or another computing device 102 and/or 104. Computing device 200 can communicate via I/O interface 208 with suitable devices and/or using suitable electronic/software interaction methods. Input data, e.g., of user inputs on user-operable input device 206, can be received via I/O interface 208 (e.g., one or more I/O interface(s)). Output data, e.g., of user interface screens, can be provided via I/O interface 208 to display 204, e.g., for viewing by a user.

The computing device 200 can include one or more processing unit(s) 210. In some examples, processing unit(s) 210 can include and/or be connected to a memory 212, e.g., a RAM and/or cache. Processing units 210 can be operably coupled to the I/O interface 208 and to at least one computer-readable media 214 (CRM), e.g., a tangible non-transitory computer-readable medium.

Processing unit(s) 210 can be and/or include one or more single-core processors, multicore processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), and/or hardware logic device, can be incorporated in computing device 200, while in some examples at least one processing unit 210, e.g., one or more of a CPU, GPU, and/or hardware logic device, can be external to computing device 200.

Computer-readable media described herein, e.g., CRM 214, includes computer storage media and/or communication media. Computer storage media includes tangible storage units such as volatile memory, nonvolatile memory, and/or other persistent, non-transitory, and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 200.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, CRM 214 can store instructions executable by the processing unit(s) 210, and/or instructions executable by external processing units such as by an external central processing unit (CPU) and/or external processor of any type discussed herein. Any of these instructions are referred to herein as computer-executable instructions or processor-executable instructions. For example, CRM 214 can store instructions of an operating system 216. CRM 214 can additionally or alternatively store at least one executable file 218, which can represent executable file 124, FIG. 1, or another system component. In some examples, operating system 216 can cause processing unit(s) 210 to load the computer-executable instructions from executable file 218 into a RAM or other high-speed memory, e.g., memory 212, or to otherwise prepare computer-executable instructions from executable file 218 for execution by processing unit(s) 210. Some examples, e.g., bare-metal embedded-systems configurations, can include a loader but not an operating system 216. Examples herein are discussed with reference to executable file 218 and can additionally or alternatively be used for other types of files, e.g., data files.

In some examples, a "control unit" as described herein includes processing unit(s) 210. A control unit can also include, if required, memory 212, CRM 214, or portions of either or both of those. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing executable instructions.

Computer-executable instructions or other data stored on CRM 214 can include at least one computational model (CM) 220, which can represent CM 112, FIG. 1. CM 220 can be stored as data (e.g., parameters); as code (e.g., for testing branch points in a decision tree); or as a combination of data and code. CM 220 can include a broad computational model 222, which can represent broad model 114, and a local computational model 224, which can represent local model 116.

Computer-executable instructions or other data stored on CRM 214 can include instructions of the operating system 216, a training module 226, a patching module 228, an operation module 230, a communications module 232, a mitigation module 234, and/or other modules, programs, and/or applications that are loadable and executable by processing unit(s) 210. In some examples, mitigation module 234 can be included in or associated with operating system 216. For example, mitigation module 234 can run at ring zero (on x86 processors) or another high-privilege execution level. Processing unit(s) 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 and/or 104 to perform operations described herein with reference to the operating system 216 or the above-listed modules 226-234.

In some examples not shown, one or more of the processing unit(s) 210 in one of the computing device(s) 102 and/or 104 can be operably connected to CRM 214 in a different one of the computing device(s) 102 and/or 104, e.g., via communications interface 236 (discussed below) and network 108. For example, program code to perform steps of flow diagrams herein, e.g., as described herein with reference to modules 226-234, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 236, which can include a transceiver device such as a network interface controller (NIC) to send and receive communications over a network 108 (shown in phantom), e.g., as discussed above. As such, the computing device 200 can have network capabilities. Communications interface 236 can include any number of network, bus, memory, or register-file interfaces, in any combination, whether packaged together and/or separately. In some examples, communications interface 236 can include a memory bus internal to a particular computing device 102 or 104, transmitting or providing data via communications interface 236 can include storing the data in memory 212 or CRM 214, and receiving via communications interface 236 can include retrieving data from memory 212 or CRM 214. In some examples, communications interface 236 can include a datapath providing a connection to a register file within a processor. For example, a first software module can load parameters into the register file via the datapath, and then and issue a function call to a second software module. The second software module can retrieve the parameters from the register file and return a result via the register file.

In some examples, the communications interface 236 can include, but is not limited to, a transceiver for cellular (3G, 4G, and/or other), WI-FI, Ultra-wideband (UWB), BLUETOOTH, and/or satellite transmissions. The communications interface 236 can include a wired I/O interface, such as an Ethernet interface, a serial interface, a Universal Serial Bus (USB) interface, an INFINIBAND interface, and/or other wired interfaces. The communications interface 236 can additionally and/or alternatively include at least one user-interface device or user interface, at least one bus such as a memory bus, datapath, and/or local bus, at least one memory interface, and/or at least one hardwired interface such as a 0-20 mA control line.

In some examples, the operating system 216 can include components that enable and/or direct the computing device 200 to receive data via various inputs (e.g., user controls such as user-operable input device 206, network and/or communications interfaces such as communications interface 236, devices implementing memory 212, and/or sensors), and process the data using the processing unit(s) 210 to generate output. The operating system 216 can further include one or more components that present the output (e.g., display an image on an electronic display 204, store data in memory 212, and/or transmit data to another computing device 102 or 104. The operating system 216 can enable a user (e.g., entity 110) to interact with the computing device 200 using a user interface 202. Additionally, the operating system 216 can include components that perform various functions generally associated with an operating system, e.g., storage management and internal-device management.

In some examples, the processing unit(s) 210 can access the module(s) on the CRM 214 via a bus 238. I/O interface 208 and communications interface 236 can also communicate with processing unit(s) 210 via bus 238. Bus 238 can include, e.g., at least one of a system bus, a data bus, an address bus, a Peripheral Component Interconnect (PCI) Express (PCIe) bus, a PCI bus, a Mini-PCI bus, any variety of local, peripheral, and/or independent buses, and/or any combination thereof.

In various examples, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the training module 226 and the operation module 230 can be combined in a single module that performs at least some of the example functions described below of those modules, or likewise the training module 226 and the patching module 228, the communications module 232 and the mitigation module 234, or modules 226, 228, and 230. In some examples, CRM 214 can include a subset of the above-described modules.

In the illustrated example, the training module 226 can determine at least part of the CM 220, e.g., the broad model 222. The broad model 222 can be determined, e.g., based at least in part on feature vector(s) 240. For example, the training module 226 can update parameters of a neural network, or rebuild or update a decision forest, based at least in part on training feature vectors of the feature vector(s) 240 representing the training data streams 118 of the training set. Examples are discussed herein, e.g., with reference to at least FIG. 5, e.g., second broad computational model 522.

In the illustrated example, the patching module 228 can determine at least part of the CM 220, e.g., the local model 224, based at least in part on a feature vector of the feature vector(s) 240. That feature vector can represent, e.g., a false miss. As used herein, "patching" refers to determining a local model 116. Examples are discussed herein, e.g., with reference to at least one of FIG. 3, 5, 7-11, or 13-17.

In the illustrated example, the operation module 230 can operate the CM 220 based at least in part on, e.g., a trial feature vector of the feature vector(s) 240, e.g., a feature vector representing a trial data stream 120, to provide an output 242, e.g., a classification 122 or other indication of whether a data stream, such as the trial data stream 120 represented by the trial feature vector, is associated with malware. The trial model output can include a classification 122. Examples are discussed herein, e.g., with reference to at least one of FIG. 3-6, 9, 12, 13, or 15-17.

Output 242 is shown as stored in CRM 214. Output 242 can additionally or alternatively be stored in memory 212 or another processor-accessible storage device, e.g., a transmit buffer of communications interface 236. In some examples, CM 220 can be configured to provide a classification 122 for any type of trial data stream 120. In other examples, CM 220 can be configured to provide a classification 122 for trial data stream 120 known to be of a particular type, e.g., of a particular family of malware. For example, separate CMs 220 can be determined and operated for ransomware and spyware.

In some examples, the training module 226 or the operation module 230 can operate the CM 220 based at least in part on training data stream(s) 118 of the validation set to evaluate the performance of the CM 220. The CM 220, e.g., the broad model 222, can then be updated based on the evaluation. The dashed arrow from operation module 230 to training module 226 depicts coordination between those modules. Alternatively, the evaluation and updating can both be performed by the training module 226.

In the illustrated example, the communications module 232 can receive feature vector(s) 240, e.g., representing training data stream(s) 118 or trial data stream(s) 120, as represented by the stippled arrows. The communications module 232 can provide an indication of the output 242, e.g., via the communications interface 236. For example, the indication can be transmitted to a computing device 104, e.g., via network(s) 108. Examples are discussed herein, e.g., with reference to at least FIG. 3-7, 9, 10, 12, or 13. In some examples, communications module 232 can additionally or alternatively receive the executable file 218 (or another data stream 118 or 120) via the communications interface 236.

In the illustrated example, the mitigation module 234 can receive an indication that a data stream is associated with malware. The indication can be, e.g., output 242. The mitigation module 234 can then take action to reduce negative effects the dirty data stream may cause. Examples are discussed herein, e.g., with reference to at least FIG. 4 or 12.

In some examples, the operation module 230, the communications module 232, or another module stored in CRM 214 can be configured to receive inputs, e.g., via user-operable input device 206 or from a filesystem, transmit corresponding queries to a computing device 102, receive responses from computing device 102, and present the responses, e.g., via display 204. In some examples, determination and operation of CMs are carried out on computing device(s) 102. In some examples, determination and operation are carried out on a computing device 104. In some examples, a computing device 102 executes modules 226, 228, 230, and 232, and a computing device 104 executes modules 232 and 234. In some examples, one or more computing device(s) execute modules 226 and 228, and one or more different computing device(s) execute module 230.

In some examples, any of the above-noted modules can be configured to receive inputs and to determine and/or operate CM(s) 112 using instructions of operation module 230 based at least in part on those inputs, e.g., to determine a model output 242. In some examples, computer-executable instructions on CRM 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

Illustrative Techniques

Figure 3:
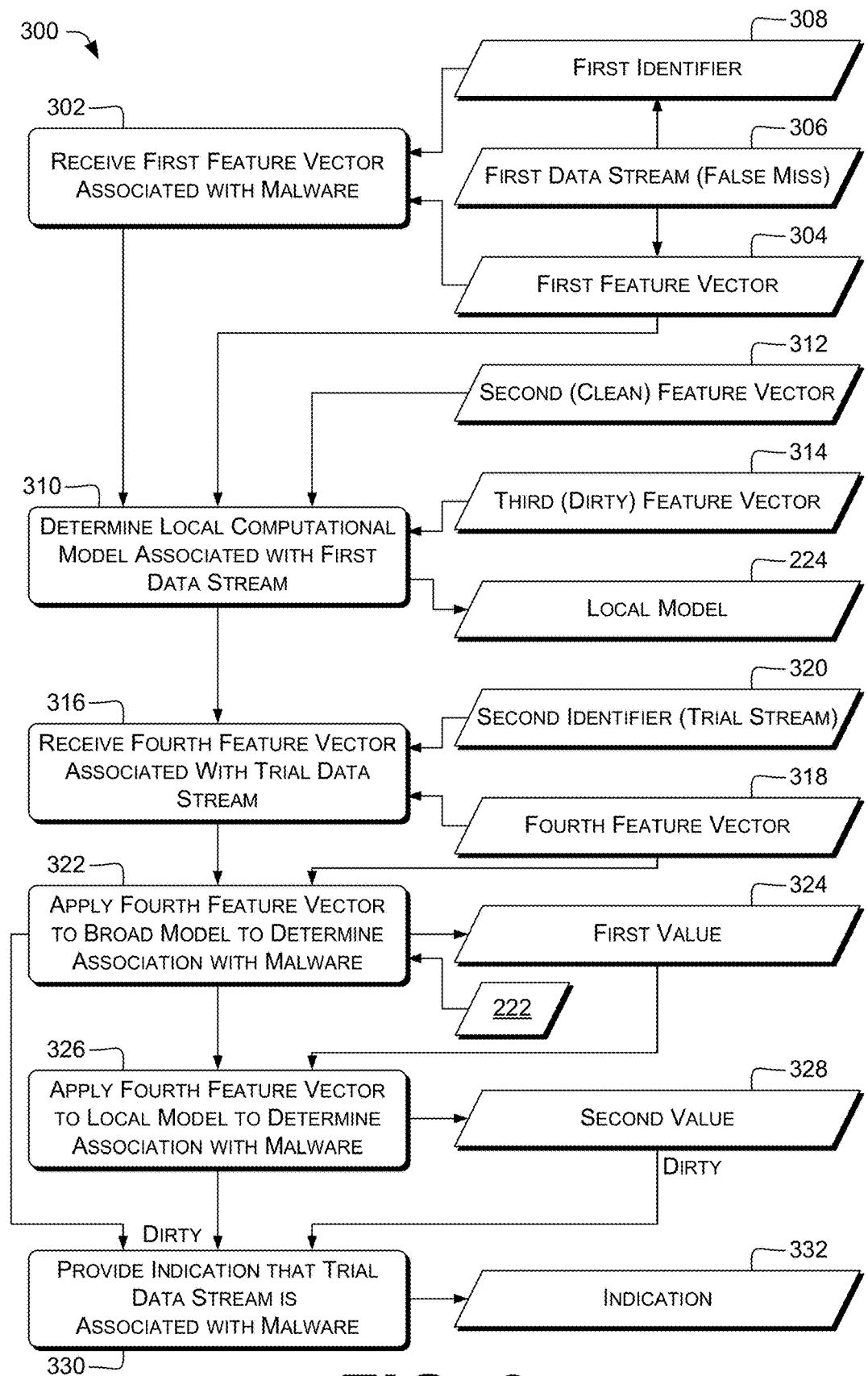
FIG. 3 is a dataflow diagram that illustrates example techniques for determining and operating computational model(s), e.g., to determine whether a trial data stream is associated with malware.

FIG. 3 is a dataflow diagram that illustrates an example technique 300 for determining and operating computational model(s), e.g., to determine whether a trial data stream 120 is associated with malware, and related dataflow. Example functions shown in FIG. 3 and other flow diagrams and example techniques herein can be implemented on and/or otherwise embodied in one or more computing device(s) 102 and/or 104, e.g., a computing device 200, e.g., using software running on such device(s), e.g., software executed by processing unit(s) 210. For the sake of illustration, the example technique 300 is described below with reference to processing unit 210 and other components shown in FIGS. 1 and 2 that can carry out and/or participate in the steps of the example method (e.g., a control unit), and with reference to data structures shown in FIGS. 1 and 2. However, other processing unit(s) such as processing unit(s) 210 and/or other components of computing device(s) 102 and/or 104 can carry out step(s) of described example techniques such as technique 300. Similarly, example method(s) shown in FIGS. 4-17 are also not limited to being carried out by any specifically-identified components.

In software embodiments, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram and/or technique is not intended to be construed as a limitation, and any number of the described operations can be combined in any order and/or in parallel to implement each technique. In each flow diagram, fewer than all of the depicted operations can be performed, except as expressly noted. Moreover, the operations in each of FIGS. 3-17 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

For clarity of explanation, the operations of FIG. 3 are described in terms of batch processing. However, this is not limiting, and the operations of FIG. 3 (or FIGS. 4-17) can be performed in a streamed or pipelined manner, or any combination of batch, stream, and pipelined processing.

Various of the following figures provide more details of example implementations of the operations shown in FIG. 3. In some examples: operation 310 can include operations 502 and 506; operation 326 can include operations 510 and 514; or operation 330 can be followed by operations 402, 516-520, or 602-612.

In some examples, at operation 302, the communications module 232 can receive, via a communications interface 236, a first feature vector 304 associated with a first data stream 306. The first data stream 306 can be associated with malware. For example, the first data stream can be a false miss, e.g., newly discovered by a security analyst. In some examples, e.g., as discussed herein with reference to FIG. 11, the first feature vector 304 can be associated with a plurality of data streams that includes the first data stream 306. For example, the first feature vector 304 can be a centroid, medoid, or other representative value of a plurality of feature vectors, including first feature vector 304, representing dirty data streams.

In some examples, the communications module 232 can also receive a first identifier 308 of the first data stream 306, e.g., a cryptographic hash of the first data stream. In other examples, operation 302 does not include receiving first identifier 308. In some examples, operation 302 or another operation can include adding the first identifier 308 to a blacklist to prevent future false misses of the first data stream 306. However, variants of the first data stream 306 may have different identifiers, and so may not be captured.

Accordingly, in some examples, at operation 310, the patching module 228 can determine a local model 224 associated with the first data stream 306. The local model 224 can be, e.g., a model that can detect variants of the first data stream 306. The patching module 228 can determine the local model 224 based at least in part on: the first feature vector 304; a second feature vector 312 that is not associated with malware; and a third feature vector 314 that is associated with malware. In some examples, the second feature vector 312 is a feature vector representing a nearest, in the feature space, clean data stream with respect to the first feature vector 304. In some examples, the third feature vector 314 is a feature vector near the first feature vector 304 that represents a dirty data stream.

In some examples, at operation 316, the communications module 232 can receive, via the communications interface 236, a fourth feature vector 318 associated with the trial data stream 120. In some examples, the communications module 232 can also receive a second identifier 320 of the trial data stream 120. In other examples, operation 316 does not include receiving second identifier 320.

In some examples, at operation 322, the operation module 230 can apply the fourth feature vector 318 to broad model 222 to determine a first value 324 indicating whether the trial data stream 120 is associated with malware. If the trial data stream 120 is associated with malware, operation 322 can be followed by operation 330 ("Dirty"); if not, by operation 326. In some examples, operation 322 can be followed by operation 326 regardless of whether or not first value 324 indicates the trial data stream 120 is associated with malware. This can permit determining information from local model 224, e.g., having a higher confidence of detection than broad model 222 or having associated therewith metadata such as a malware family name.

In some examples in which the broad model 222 includes a neural network, the operation module 230 can apply multiplication, summing, and activation functions to successive layers of the neural network, beginning with the fourth feature vector 318 applied as the input to a first layer of the neural network. Operation module 230 can provide the outputs of each layer, transformed based on edge weights, as inputs to the next layer.

In some examples in which the broad model 222 includes a decision tree, the operation module 230 can perform successive tests for specific characteristics of the feature vector while traversing the decision tree. In some examples in which the broad model 222 includes a decision forest, the operation module 230 can perform successive tests for specific characteristics of the feature vector while traversing each decision tree, and can provide the output 242 indicating, e.g., the mode (most common) of the results of traversing the trees, or a summation of the individual decision values of each tree. In some examples of classification, each leaf can include respective weight values for one or more classes. The operation module 230 can sum the weights for each class over all the trees and pick the class with the highest total weight as output 242. In some examples, the operation module 230 can apply a logistic or other squashing function, e.g., to each weight before summing or to the sums of the weights.

In some examples, at operation 326, in response to the first value 324 indicating the trial data stream 120 is not associated with malware, the operation module 230 can apply the fourth feature vector 318 to local model 224 to determine a second value 328 indicating whether the trial data stream is associated with malware. The operation module 230 can apply a neural-network, decision-tree, or decision-forest local model 224 as described in the preceding paragraph with respect to broad model 222. In some examples, the first value 324 or the second value 328 can include at least: a Boolean value indicating whether the trial data stream dirty or clean, a classification 122, or a malware family name associated with the first data stream 306. The first value 324 or the second value 328 can include additional information supplemental to, or incorporating or subsuming, information regarding whether the trial data stream 120 is associated with malware.

In some examples, the operation module 230 can apply a hypersphere or other local model 224 by testing whether the fourth feature vector 318 is within a dirty region 726 (e.g., FIGS. 7, 8) defined by the local model 224, e.g., a sphere or other region defined geometrically or using a custom distance function, e.g., as described herein. Additionally or alternatively, the operation module 230 can determine a Hamming or other distance between internal parameters or results of the local model 224 or the broad model 222 for two feature vectors, e.g., as discussed herein with reference to FIGS. 13-17. For example, leaf identifiers or hidden-layer outputs for the first feature vector 304 and the fourth feature vector 318 can be compared to determine a distance between those two feature vectors. The distance can be compared to a threshold to determine whether the fourth feature vector 318 is associated with malware.

In some examples, multiple local models 224 can be used, e.g., associated with respective, different false misses. In some of these examples, operation module 230 can iteratively repeat operation 326 with respect to each of the local models 224. While repeating operation 326, operation module 230 can terminate the iteration and proceed to operation 330 if any of the local models 224 determines that the fourth feature vector 318 is associated with malware. If none of the local models 224 determines that the fourth feature vector 318 is associated with malware, then processing can conclude, or an indication can be provided that the fourth feature vector 318 is considered by the system to be clean. In some examples, e.g., tens, hundreds, or thousands of local models 224 can be tested. The iteration of operation 326 can be carried out in series or in parallel. For example, the local models 224 can be divided between several worker threads. Each worker thread can then carry out operation 326 with respect to that thread's local models 224 in parallel with the other worker threads. Further examples of using multiple local models are described herein with reference to FIGS. 7 and 11.

In some examples, multiple local models 224 are available. In some of these examples, operation module 230 can select fewer than all of the local models 224, e.g., based at least in part on a fitness function that compares the fourth feature vector 318 with a local model 224. In some examples, the fitness function determines a distance metric (e.g., any distance metric described herein) between the fourth feature vector 318 and the centroid, medoid, or other representative value of a particular local model 224. In some example, operation module 230 iteratively tests only local models 224 satisfying a predetermined criterion on the output of the fitness function, e.g., a distance less than a predetermined threshold. This can reduce the occurrence of false detections.

In some examples, the fourth feature vector 318 is iteratively tested against the local models 224 without regard for the relative positions of the fourth feature vector 318 and a particular local model 224 in the feature space. In other examples, as noted above, operation module 230 tests local models 224 that satisfy a distance criterion or other criterion on a fitness function. In still other examples, operation module 230 determines a neighborhood of the fourth feature vector 318 in a feature space, e.g., by searching an octree or other spatial-subdivision or proximity data structure, and tests the fourth feature vector 318 only against local models 224 in the neighborhood of the fourth feature vector 318. In some examples, the spatial subdivision is performed in the feature space, or in a lower-dimensional subspace into which the feature vectors are projected. Using fitness functions or proximity data structures can reduce the amount of compute time required to iterate operation 326. Fitness functions and proximity data structures can be used in combination, in some examples. Examples of feature spaces are described herein with reference to FIG. 8.

In some examples, a local model 224 can be in the neighborhood of the fourth feature vector if the center, or at least one point, of the dirty region defined by the local model 224 is within a threshold distance (e.g., Manhattan, Euclidean, or Mahalanobis) of the fourth feature vector 318 in the feature space, or in a rescaled space such as those described herein with reference to operations 1102 and 1106, or operations 1102-1118. Additionally or alternatively, the local model 224 can be in the neighborhood of the fourth feature vector 318 if all (or a predetermined portion, or at least one point, or the center) of the dirty region defined by the local model 224 is within the same spatial subdivision as the fourth feature vector 318. In some examples, a spatial-subdivision tree can have a plurality of cells, each holding a list of local model(s) 224 in the neighborhood of that cell. Searching the tree for the fourth feature vector 318 can permit determining the cell containing the fourth feature vector 318. The corresponding local model(s) 224 can then be retrieved from the cell and rapidly tested. This can permit testing a smaller number of local model(s) 224 without reducing accuracy.

In some examples, a spatial-subdivision tree has a branching factor equal to the number N of dimensions of the feature space. In some examples, a spatial-subdivision tree has a predetermined branching factor, e.g., $2^3$ for an octree, and the operation module 230 searches the tree only in a corresponding number M<N of dimensions (e.g., three). For example, the operation module 230 can search an octree in the three (or M) highest-variance dimensions to rapidly cull the number of local models 224 to be tested while iterating operation 326. Variance along axes is described herein with reference to FIG. 11. In some examples, operation module 230 can perform a principal-components analysis (PCA) to determine the K highest-variance axes, then use those axes for spatial subdivision, or as the representative axes 1116 described herein with reference to FIG. 11. This can reduce the amount of computation to be performed in technique 1100, since the representative axes 1116 do not need to be determined via a Mahalanobis-distance procedure. In some examples, a K-component PCA can provide results similar to a Mahalanobis distance computation over 1 eigenvalues, with the lowest I–K of those eigenvalues set to zero. In some examples, K can be selected by finding an inflection point or elbow in the plot of eigenvalue magnitude vs. eigenvalue number, and setting K at or near the eigenvalue number of the inflection point or elbow. In some examples, a spatial-subdivision tree over K dimensions can be used in determining which local model(s) 224 are in the neighborhood of a particular feature vector.

In some examples, at operation 330, in response to the second value 328 (or the first value 324) indicating the trial data stream 120 is associated with malware ("Dirty"), the communications module 232 can provide, via the communications interface 236, a first indication 332 that the trial data stream 120 is associated with malware. First indication 332 can be, or can be included in, output 242. First indication 332 can be or include a classification 122.

Figure 4:
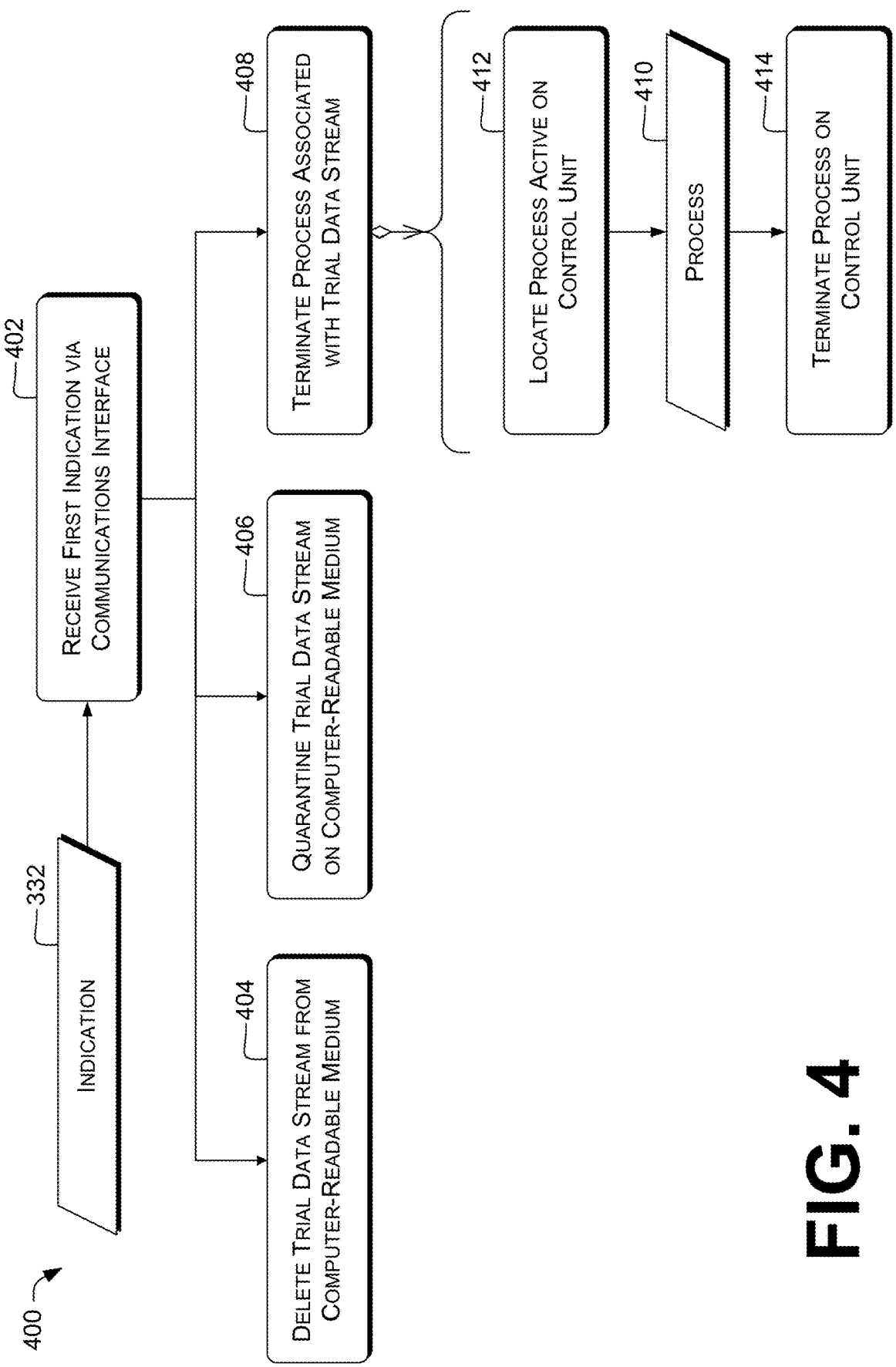
FIG. 4 is a dataflow diagram that illustrates example techniques for mitigating detected malware.

FIG. 4 is a dataflow diagram that illustrates an example technique 400 for mitigating malware, and related dataflow.

In some examples, technique 400 can be performed by a control unit, as described herein. In some examples, operations can be performed by a control unit of a computing device 104 communicatively connected with a control unit of a computing device 102. In some examples, the control unit of the computing device 102 can perform operations 302-330, FIG. 3.

In some examples, at operation 402, a communications module 232 of the second control unit can receive, via a second communications interface 236 communicatively connected with the second control unit, the first indication 332. Operation 402 can be followed by, e.g., can trigger performance of, at least one of operations 404, 406, or 408.

In some examples, at operation 404, the mitigation module 234 can delete the trial data stream 120 from a computer-readable medium, e.g., CRM 214, communicatively connected with the second control unit. For example, the trial data stream 120 can include an executable file infected with a virus or other malware, or a saved copy of a malicious Web page or other data designed to exploit a vulnerability in an application or operating system 216.

In some examples, at operation 406, the mitigation module 234 can quarantine the trial data stream 120 on the computer-readable medium. For example, the mitigation module 234 can move, rename, archive, or encrypt, the trial data stream 120, or otherwise prevent the trial data stream 120 from being, e.g., loaded or accessed. Operation 406 can additionally or alternatively include altering or removing settings, e.g., registry keys or inittab entries, to prevent operating system 216 from loading the trial data stream 120.

In some examples, at operation 408, the mitigation module 234 can terminate a process 410, e.g., a process associated with the trial data stream 120. For example, the process 410 can be a process spawned from, or actively running or using, the trial data stream 120. Operation 408 can include operations 412 and 414.

In some examples, at operation 412, the mitigation module 234 can locate the process 410 active, e.g., running or ready to run, on the second control unit. For example, mitigation module 234 can determine a process identifier (PID) of the process 410. Process 410 can be active with respect to only one core or processor of a multicore or multiprocessor second control unit, or with respect to multiple cores or processors.

For example, the mitigation module 234 can call the WINDOWS EnumProcesses( ) and OpenProcess( ) functions, or traverse the /dev/proc filesystem on UNIX-like systems supporting it. The mitigation module 234 can find process 410 based on at least one criterion, or a predetermined combination of criteria. Example criteria can include, but are not limited to: having as a primary module the trial data stream 120; having loaded the trial data stream 120 via a dynamic linker (e.g., as a .dll or .so module); currently holding trial data stream 120 open; having previously accessed trial data stream 120 in its lifetime (e.g., as determined by querying an execution-trace service or log, or audit data); having a parent (or grandparent, great-grandparent, . . . ) process whose primary module was trial data stream 120; having specific options, text, or commands in its command line; or having a specific combination of privileges.

In some examples, at operation 414, the mitigation module 234 can terminate the process 410 on the second control unit. For example, the mitigation module 234 can issue a WINDOWS TerminateProcess(pid,•) call or a POSIX "kill (pid, 9)" system call to the process ID pid of process 410. Terminating process 410 can prevent process 410 from carrying out subsequent malicious activity. In some examples, the mitigation module 234 can terminate at least one descendant process of process 410.

Figure 5:
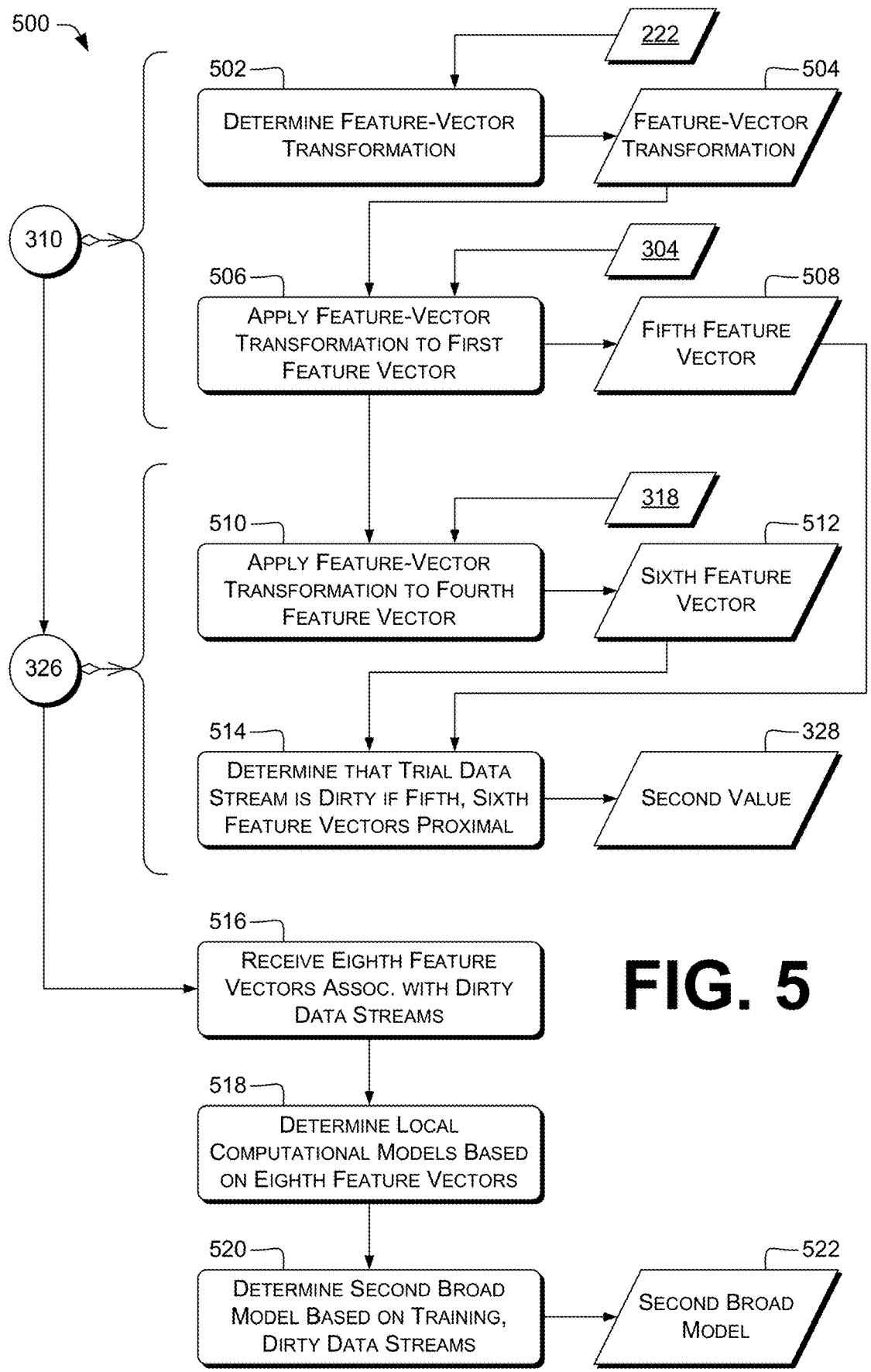
FIG. 5 is a dataflow diagram that illustrates example techniques for determining or updating computational model(s), e.g., to detect malware using a local computational model or to rebuild a broad computational model.

FIG. 5 is a dataflow diagram that illustrates an example technique 500 for determining and operating CM(s), and related dataflow. In some examples, technique 500 can be performed by a control unit, as described herein, e.g., of a computing device 102.

In some examples, operation 310 of determining the local model 224 can include operations 502 and 506. In some examples, operation 326 of applying the fourth feature vector 318 to the local model 224 can include operations 510 and 514. In some examples, operation 326 can be followed by operation 516.

In some examples, at operation 502, the patching module 228 can determine a feature-vector transformation 504 based at least in part on at least a portion of the broad model 222. Examples are discussed herein, e.g., with reference to FIGS. 8 and 11, e.g., operations 1102-1118. For example, the feature-vector transformation 504 can transform feature vectors in a feature space (e.g., feature space 800, FIG. 8) into feature vectors in an orthogonal or orthonormal space.

In operation 502 (and operations 1102-1114, and likewise throughout this document), the feature-vector transformation 504 can be determined based on all the data included in, or used in determining, the broad model 222, or based on only a portion of that data. For example, broad model 222 can be trained on a corpus of feature vectors associated with training data streams 118. The data can include the feature vectors of the corpus. In some examples, operation 502 can include selecting the portion of the data, e.g., as a random (or pseudorandom, and likewise throughout the document) subsample of feature vectors in the corpus, or as a random sample from among feature vectors sufficiently close to the first feature vector 304.

In some examples, at operation 506, the operation module 230 can apply the feature-vector transformation 504 to the first feature vector 304 (e.g., a false miss) to determine a fifth feature vector 508. The fifth feature vector 508 can represent, e.g., a center (or centroid or medoid) of a dirty region defined by the local model 224. Examples are discussed herein, e.g., with reference to at least FIG. 8 and operation 1122.

In some examples, at operation 510, the operation module 230 can apply the transformation to the fourth feature vector 318 associated with the trial data stream to determine a sixth feature vector 512. Examples are discussed herein, e.g., with reference to at least FIG. 8 and operation 1122.

In some examples, at operation 514, the operation module 230 can determine the second value 328 indicating that the trial data stream 120 is associated with malware if the sixth feature vector 512 is within a predetermined distance of the fifth feature vector 508. This can be done, e.g., using Mahalanobis distance computation or another Euclidean distance computation in an orthonormal space, Hamming distance, angular distance (e.g., dot product), or other distances described herein with reference to FIGS. 7-17, e.g., FIG. 8, 11, 13, 15, or 16.

In some examples, the broad model 222 is associated with a plurality of data streams, e.g., data streams used in training or otherwise determining the broad model 222. The plurality of data streams can include, e.g., data streams represented by the second feature vector 312 or the third feature vector 314.

In some examples, at operation 516, communications module 232 can receive a plurality of eighth feature vectors associated with respective dirty data streams. Examples are discussed herein, e.g., with reference to operation 302.

Receiving an eighth feature vector can include receiving values of that eighth feature vector. Additionally or alternatively, receiving an eighth feature vector can include receiving an indication that a known feature vector, e.g., stored in a database, is associated with malware.

In some examples, at operation 518, the patching module 228 can determine a plurality of local models 224 based at least in part on respective feature vectors of the eighth feature vectors, which are associated with respective ones of the dirty data streams. Examples are discussed herein, e.g., with reference to at least operations 310 or 722, 1216, 1320, or 1438.

Operations 516 and 518 can be interleaved, e.g., over a period of time. For example, as successive false misses are detected, operations 516 and 518 can be performed for each false miss to provide a respective local model 224 for each false miss. The respective local models 224 can then be used in an iterative technique or routine of testing a fourth feature vector 318, e.g., as discussed herein with reference to operation 326.

In some examples, at operation 520, the training module 226 can, e.g., subsequent to operation 518, determine a second broad computational model 522 based at least in part on at least some data streams of the plurality of data streams with which the broad model 222 is associated ("training"). The training modules 226 can determine the second broad model 522 further based on at least some of the dirty data streams ("dirty") associated with the eighth feature vectors. This can permit replacing multiple local models with second broad model 522, as discussed below.

In some examples, the broad model 222 is associated with a plurality of seventh feature vectors. For example, the seventh feature vectors can be feature vectors of the corpus, discussed above with reference to operation 502.

In some examples, communications module 232 can receive a plurality of eighth feature vectors associated with respective third data streams.

In some examples, the patching module 228 can determine a plurality of local models 224 based at least in part on respective feature vectors of the plurality of eighth feature vectors. As discussed above with reference to operations 516 and 518, receiving feature vectors and determining local models can be interleaved.

In some examples, the training module 226 can, e.g., subsequent to determining local models, determine the second broad computational model 522 based at least in part on at least some feature vectors of the plurality of seventh feature vectors, e.g., the corpus, and on at least some feature vectors of the plurality of eighth feature vectors, e.g., the false misses. For example, the training module 226 can train a neural network, forest, or other type of second broad model 522.

In some examples, the seventh feature vectors represent data streams with respect to which the broad model 222 was trained, and the eighth feature vectors represent false misses not classified by the broad model 222 as being associated with malware. Using both sets of feature vectors, or the corresponding data streams, in determining the second broad model 522 can permit second broad model 522 to avoid those false misses. Consequently, after determining the second broad model 522 based at least in part on the eighth feature vectors or the dirty data streams, some or all of the local model(s) 224 can be discarded or deactivated. This can improve efficiency of determining whether a data stream is associated with malware, since operation 326 can be omitted. In response to detection of a false miss by second broad model 522, operations 302 and 310, or technique 700, can be performed to determine at least one second local model for use in association with the second broad model 522. In some examples, operation 520 can be carried out on a schedule, e.g., weekly or monthly; on expiration of a predetermined validity period of broad model 222; or when the number of false misses represented by local model(s) 224 has reached a predetermined threshold. Techniques described herein for determining second broad model 522 can additionally or alternatively be used in determining broad model 114 or other models herein.

In some examples, at operation 520, the training module 226 can perform a supervised learning technique or routine to determine the second broad model 522. The supervised learning technique can use at least one training data stream 118 as training data. In other examples, an unsupervised learning technique or routine can additionally or alternatively be used. In some examples, each of multiple training data streams 118 is associated with a classification 122, e.g., as discussed herein with reference to training value 1006. The training module 226 can determine the second broad model 522 to output classifications 122, e.g., with at least a predetermined level of accuracy, for the training data streams 118.

In some examples, the second broad model 522 can include a neural network, decision tree, decision forest, support vector classification, support vector regression, logistic regression, Gaussian process regression or other type of model described herein. For example, the training module 226 can perform stochastic gradient descent to train a neural network or decision tree, can perform gradient-boosted tree-ensemble training, as in xgboost, to train a decision forest, or can perform another computational-model determining technique, routine, or algorithm discussed herein. In some examples, the training module 226 can perform minibatch-based training. In some examples, the training module 226 can run at least one training epoch, then validate using a validation set.

Some CMs are subject to overfitting, an effect by which the training increases the accuracy of the CM on the specific training data provided, at the expense of the model's ability to generalize or correctly process new samples. For example, consider a CM being trained to classify malware. There are various high-level categories of malware, such as spyware, adware, ransomware, and botnet software. Within each category, there may be numerous families of malware. For example, some families of ransomware lock the user interface of an infected computer, e.g., until a ransom is paid. Other families of ransomware encrypt files on an infected computer using an encryption key known only to the adversary. Still other families encrypt files on any network drives connected to an infected computer. Some families may combine characteristics of multiple of these families, and adversaries continue to develop new families of ransomware and other malware.

The widespread availability of high-speed Internet connections and powerful computers has increased the use of malware variants by unskilled adversaries as well as by sophisticated adversaries. Therefore, a CM that is trained and overfit to distinguish between specific families of ransomware may not correctly classify new families of ransomware, and may even fail to identify other types of malware such as spyware.

To reduce the probability of overfitting, in some examples, the second broad model 522 can be tested using a validation set of data streams and associated classifications 122. Even if the second broad model 522 is very accurate on the training data streams 118, it may be necessary to retrain or adjust the second broad model 522 if it is not very accurate on the validation set.

In some examples, training operations, e.g., gradient-descent epochs, can be repeated as long as accuracy on the validation set is improving as training proceeds, and can terminate when accuracy on the validation set ceases to improve as training proceeds. This can permit detecting overfitting, e.g., when accuracy on the validation set ceases to improve. Avoiding overfitting can permit determining second broad models 522 that have a higher probability of successfully determining whether data streams are associated with malware, even for malware families not represented in the training data streams 118 ("unseen samples").

Figure 6:
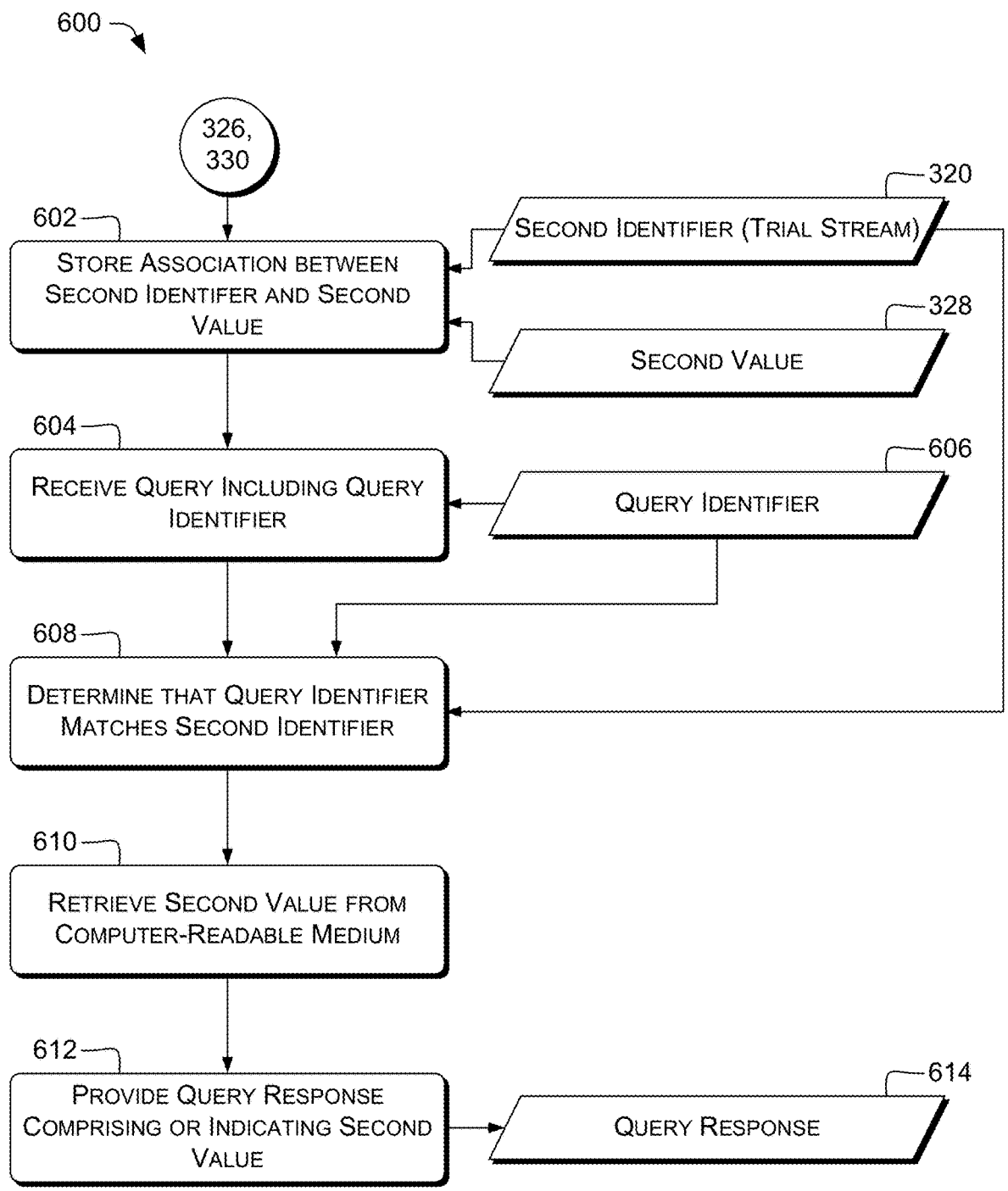
FIG. 6 is a dataflow diagram that illustrates example techniques for caching query results and responding to subsequent queries using the cache.

FIG. 6 is a dataflow diagram that illustrates an example technique 600 for determining and operating CM(s), and related dataflow. In some examples, technique 600 can be performed by a control unit, as described herein, e.g., of a computing device 102. Technique 600 can permit, e.g., caching or memoizing query results to speed subsequent queries. Operation 326 or 330 can be followed by operation 602. Operation 602 can be used, e.g., in examples that include receiving second identifier 320 at operation 316.

In some examples, at operation 602, the operation module 230 can store, in a computer-readable medium, an association between the second identifier 320 and the second value 328. For example, the operation module 230 can store the second value 328 in a table indexed by second identifiers 320. In some examples, the second identifier 320 comprises a cryptographic hash, e.g., a 256-bit hash, of the contents of the trial data stream 120.

In some examples, at operation 604, the operation module 230 can receive, via the communications interface 236, a query comprising a query identifier 606. Operation 604 can be performed subsequent to operation 602. The query identifier 606 can indicate another trial data stream 120, e.g., as a hash of the contents thereof.

In some examples, at operation 608, the operation module 230 can determine that the query identifier 606 matches the second identifier 320. This can include a bitwise or logical comparison, in some examples.

In some examples, at operation 610, the operation module 230 can retrieve the second value 328 from the computer-readable medium. This can be done in response to a match indication from operation 608.

In some examples, at operation 612, the operation module 230 can provide, via the communications interface 236, a query response 614 comprising or indicating the second value 328. Examples are discussed herein, e.g., with reference to operation 330. Query response 614 can represent first indication 332, in some examples.

Figure 7:
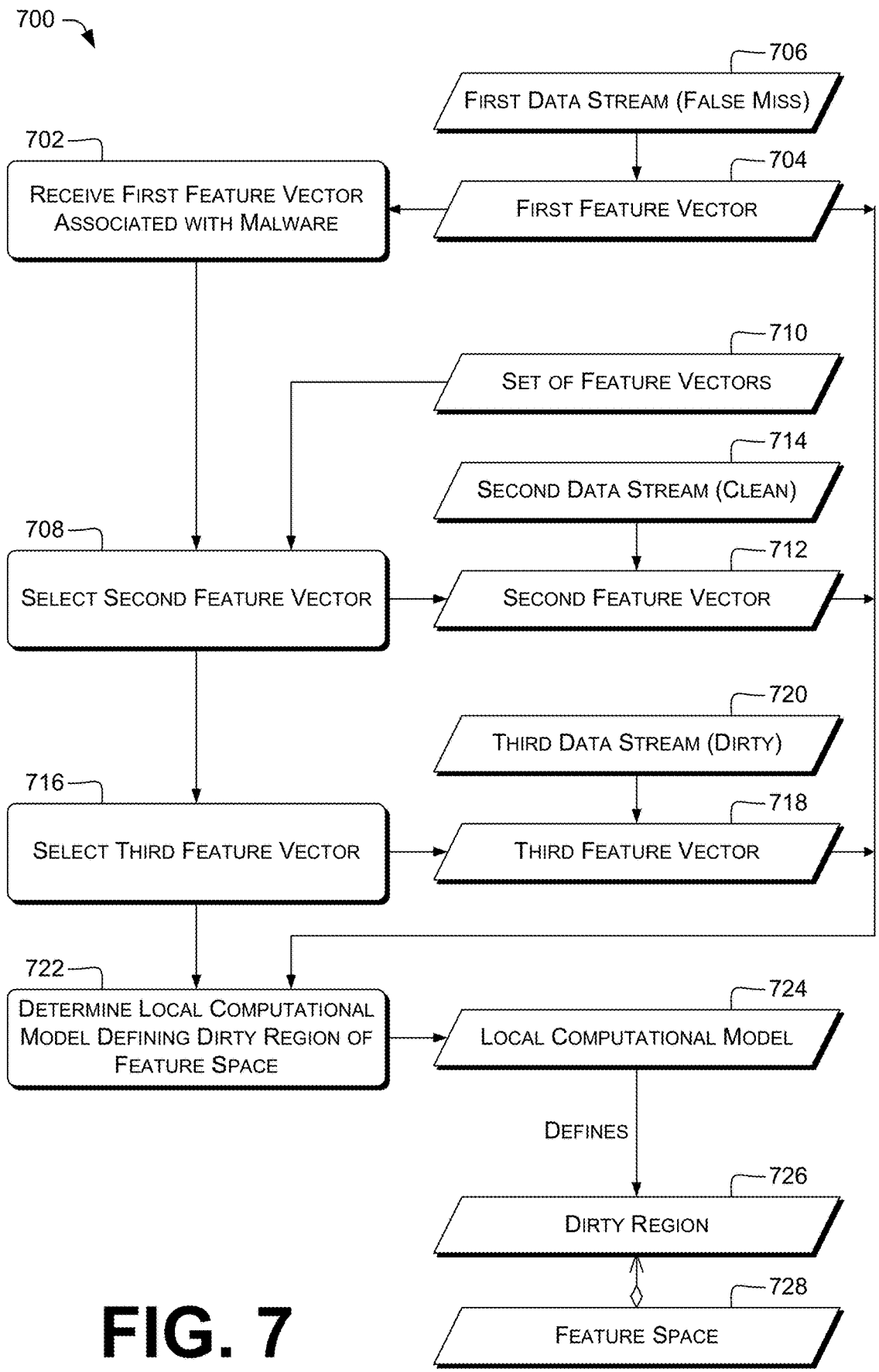
FIG. 7 is a dataflow diagram that illustrates example techniques for determining local computational model(s) that define a dirty region of a feature space.

FIG. 7 is a dataflow diagram that illustrates an example technique 700 for determining and operating computational model(s), e.g., to determine whether a trial data stream 120 is associated with malware, and related dataflow. In some examples, technique 700 can be performed by a control unit, as described herein, e.g., of a computing device 102. Various of the following figures provide more details of example implementations of the operations shown in FIG. 7. In some examples: operation 708 can include operation 902; operation 716 can include operation 904; operation 722 can include operations 906 and 910, operations 1002-1012, or operations 1102-1130; or operation 722 can be followed by operations 912-920.

In some examples, at operation 702, communications module 232 can receive a first feature vector 704 associated with a first data stream 706. The first data stream 706 can be associated with malware. For example, the first data stream 706 can be a false miss.

In some examples, at operation 708, the patching module 228 can select, from a set 710 of feature vectors, a second feature vector 712 associated with a second data stream 714. The set 710 can include an entire corpus of feature vectors, or only some. Subsets of a corpus can be selected as discussed herein with reference to operation 502. The second data stream 714 can be a clean data stream, i.e., a data stream that is not associated with malware. In some examples, the second data stream 714 can be the clean data stream closest, in feature space, to first feature vector 704 (e.g., feature vector 712 can be no farther from the first feature vector 704 than is any other feature vector not associated with malware of the set 710 of feature vectors).

In some examples, at operation 716, the patching module 228 can select, from the set 710 of feature vectors, a third feature vector 718 associated with a third data stream 720. The third data stream 720 can be associated with malware. For example, the third data stream 720 can be a nearby, or nearest, dirty data stream in the feature space with respect to the first feature vector 704.

Some examples determine local models 724, e.g., using Gaussian process models (GPMs) or other models that produce a field in feature space indicating strength of association between feature vectors and malware. Examples are discussed herein with reference to operation 1012. In some of these examples, operation 702, operation 708, or operation 716 can include retrieving the respective feature vector 704, 712, or 718 from a plurality of training feature vectors 1004, FIG. 10.

In some examples, at operation 722, the patching module 228 can determine, based at least in part on the first feature vector 704, the second feature vector 712, and the third feature vector 718, a local computational model 724 defining a dirty region 726 of a feature space 728. The dirty region 726 can include the first feature vector 704 and can exclude the second feature vector 712. Examples are discussed herein, e.g., with reference to operation 310 or FIG. 5 or 8-17.

In some examples, technique 700, e.g., operations 702, 708, 716, and 722, can be repeated for each of a plurality of first feature vectors 704, e.g., associated with respective, different first data streams 706 (false misses). This can permit determining respective local computational models 724 defining respective dirty regions 726 of the feature space 728. Each dirty region 726 can include the respective first feature vector 704. Other examples of processing of multiple first feature vectors 704 are described herein with reference to FIG. 11.

In some examples, technique 700 can include reducing the dimensionality of input data, e.g., to improve the discriminative power of Euclidean or other distance metrics. For example, the patching module 228 can determine the local model 724 using fewer than all of a plurality of elements of each of the first feature vector 704, the second feature vector 712, and the third feature vector 718, e.g., a common subset of those elements. In some examples, the fewer than all of the plurality of elements are selected using Principal Component Analysis. variance analysis, or other techniques, e.g., to determine a lower-dimensional space having axes that are substantially not redundant with each other, or that are less redundant with each other than are at least two axes of the feature space.

In some examples, the patching module 228 can, at operation 722 or another operation, determine a transformation, e.g., a transformation matrix, from the feature space to a second feature space. For example, the patching module 228 can perform PCA of a training set of feature vectors, or another technique for selecting basis vectors to reduce redundancy in the contributions made by individual elements to the determination of whether a feature vector represents a clean sample or a dirty sample. Applying the local model 724 can then include transforming a trial feature vector into the second feature space using the transformation, and testing whether the transformed trial feature vector is within the dirty region. Correspondingly, the patching module 228 can define the dirty region in the second feature space.

Figure 8:
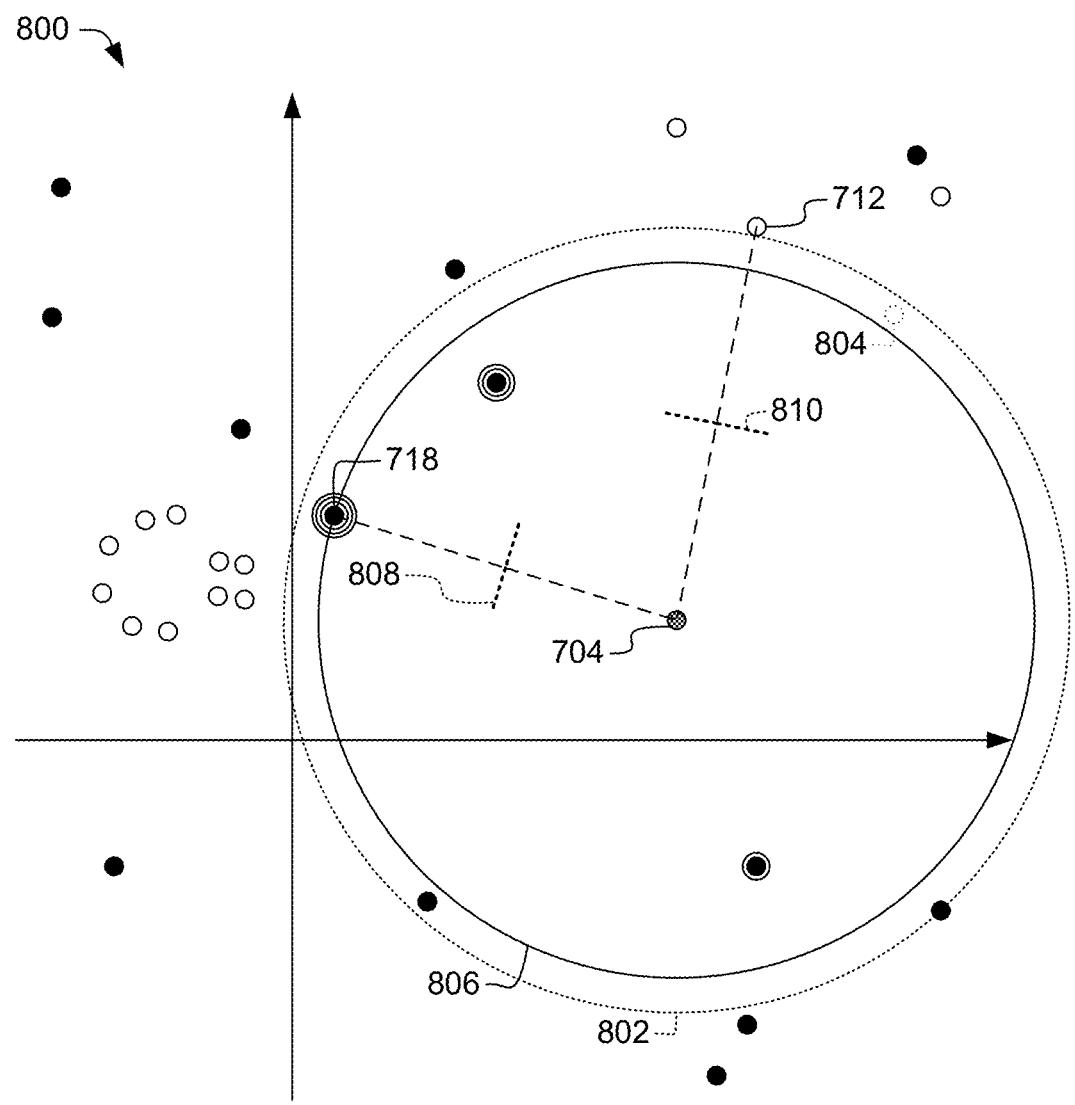
FIG. 8 depicts an example feature space.

FIG. 8 shows an example feature space 800, which can represent feature space 728, and models and partitions thereof. Feature space 800 is shown as a two-dimensional space for clarity of explanation, without limitation. Feature vectors are represented as circles at the points in feature space 800 defined by those vectors.

First feature vector 704 (shaded) represents a false miss. Some prior schemes record an indication of first data stream 706 to prevent future false misses with respect to that data stream, e.g., by adding a cryptographic hash or other identifier of the first data stream 706 to a blacklist. However, testing against only first data stream 706 does not prevent false misses with respect to variations of that malware, and some malicious programs can have dozens or hundreds of variants. Local model 724 can be used to avoid false misses with respect to not only first data stream 706, but also data streams having similar features.

Second feature vector 712 represents a clean sample, e.g., the closest clean feature vector to first feature vector 704. Local computational model 802, which can represent local model 724, is a hypersphere centered at first feature vector 704 and extending to, but not including, second feature vector 712. Therefore, local model 802 encompasses as much of feature space 800 as possible centered around first feature vector 704 without erroneously reporting second feature vector 712 as being associated with malware.

In some examples, extending the local model 724, e.g., to the nearest clean feature vector, may cause the local model 724 to produce false detections on newly-discovered clean samples that fall within the local model 724. One such sample is depicted as feature vector 804. Accordingly, in some examples, the size of local model 724 can be determined further based on the distance to a dirty feature vector such as third feature vector 718. In the illustrated example, third feature vector 718 is the third-closest dirty feature vector to first feature vector 704. The closest dirty feature vector is marked with a single ring, the second-closest with two rings, and feature vector 718 (third-closest) with three rings.

In the illustrated example, local computational model 806, which can represent local model 724, is a hypersphere centered at first feature vector 704. The radius of local model 806 is the lesser of: (a) the distance from first feature vector 704 to second feature vector 712 (or, in other examples, a predetermined portion p of that distance, p>0, e.g., 0<p<=1); and (b) the distance to the third feature vector 718. The third feature vector 718 can be, e.g., the Nth closest dirty feature vector to feature vector 704, for a predetermined integer N>0. In the illustrated example, N=3, so there are three dirty feature vectors within the dirty region of local computational model 806. In some examples, the radius of local model 806 can additionally or alternatively be constrained to be no larger than half (or another predetermined percentage <100%, in some examples) of the distance from first feature vector 704 to third feature vector 718, depicted as midpoint line 808 bisecting the dashed line between first feature vector 704 and third feature vector 718. Limiting the radius based on the proximity or density of dirty feature vectors near first feature vector 704 in the feature space 800 can reduce the probability of producing false detections, and can therefore provide increased accuracy of malware detection. Limiting the radius can additionally or alternatively permit balancing the number and size (e.g., in terms of number of values to be tested, or number of operations to be performed, to determine whether a trial data stream is within an individual local model) of local models deployed concurrently in conjunction with a particular broad model 114 to provide a desired level of detection accuracy while capping the computational load of testing the local models. In some examples in which computing cluster 106 informs computing devices 104(k) of data streams detected by local models, it is desirable to reduce communications overhead by keeping local models as specific as possible (small radius) and detect as many data streams as possible with only the broad model.

Moreover, as noted above with reference to second broad model 522, some computational models can be used for determining the family of malware to which a particular dirty data stream belongs. In some examples, first data stream 706 is of a particular type or family, e.g., ransomware or spyware. In some examples, any feature vector within the dirty region 726, e.g., within the illustrated hyperspheres of local models 802 and 806, can be determined to be of the same family as first data stream 706. Limiting the radius of the dirty region 726, e.g., using at least one of operation 708 or operation 716, can reduce the probability of mis-classifying a sample in an incorrect family (e.g., mis-classifying an adware sample as a rootkit) compared to some prior schemes. In some examples, therefore, operation 716 can include selecting third feature vector 718 of the same family of malware as first feature vector 704.

In this example, local models 802 and 806 are defined by their geometry in feature space 800. Therefore, the dirty region for each local model 802, 806 is exactly the illustrated hypersphere for that local model 802, 806. In other examples, a local model 724 is not defined in terms of geometry, so the dirty region defined by the model is a consequence of the definition or parameters of the model. For example, as described in FIGS. 13-17, internal values or outputs of a broad model 114, e.g., leaf identifiers or hidden-neuron outputs, can be used to define a local model 802, 806. Such local models may not be concisely visualizable or expressible in closed form, but can nonetheless effectively distinguish feature vectors within the dirty region of the local model 802, 806 from those outside the dirty region. Examples of such local models are discussed herein, e.g., with reference to at least FIGS. 10 and 15-17.

In some examples, e.g., as discussed herein with reference to operation 906, the radius or other geometry of a hypersphere can be determined based on a percentage of the distance from the first feature vector 704 to second feature vector 712, e.g., the nearest clean feature vector. Midpoint line 810 shows the radius of a hypersphere for a local model (omitted for clarity) having a radius of 50% of the distance from the first feature vector 704 to second feature vector 712.

Figure 9:
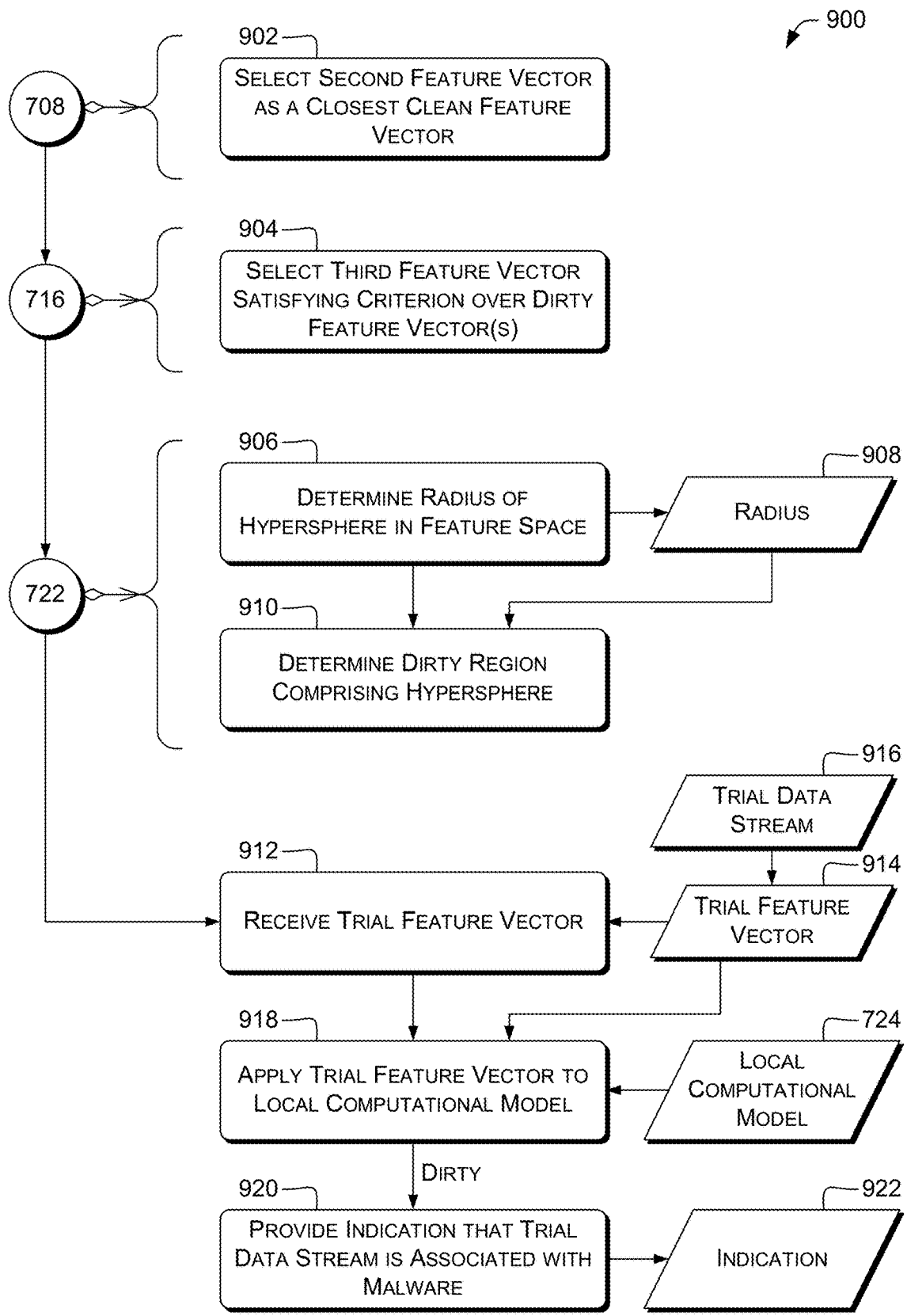
FIG. 9 is a dataflow diagram that illustrates example techniques for determining local computational model(s) or using those model(s) to determine whether a trial data stream is associated with malware.

FIG. 9 is a dataflow diagram that illustrates an example technique 900 for determining and operating computational model(s), e.g., to determine whether a trial data stream 120 is associated with malware, and related dataflow. In some examples, technique 900 can be performed by a control unit, as described herein, e.g., of a computing device 102.

In some examples, at operation 902, patching module 228 can select the second feature vector 712 being no farther from the first feature vector 704 than is any other feature vector of the set 710 of feature vectors. For example, the second feature vector 712 can be the clean feature vector closest to the first feature vector 704 in feature space 800. If multiple feature vectors are equally the closest to the first feature vector 704, any of the equally-close feature vectors can be selected as the second feature vector, e.g., at random. In some examples, the second feature vector is selected as the Nth closest feature vector, for a predetermined integer N>0. In some examples, the second feature vector is selected as a clean feature vector at substantially the mth percentile of distances between feature vector 704 and any feature vector in the set 710 of feature vectors, or a predetermined subset thereof. In some examples, if no clean feature vector falls within the mth percentile band, the next-nearest or next-farthest clean feature vector can be selected as the second feature vector.

In some examples, at operation 904, patching module 228 can select the third feature vector 718 having a distance from the first feature vector 704 satisfying a predetermined criterion with respect to at least one other feature vector of the set of feature vectors, the at least one other feature vector being associated with malware.

In some examples, the selected criterion can be based on rank. For example, operation 904 can include selecting the third feature vector 718 having a distance to the first feature vector 704 of a predetermined rank with respect to distances between the at least one other feature vector and the first feature vector 704. In some examples, operation 904 can select the closest (rank=1), second-closest (rank=2), third-closest (rank=3), tenth-closest (rank=10), or other specifically-ranked dirty feature vector as the third feature vector 718. In the example of FIG. 8, the third-closest dirty feature vector was selected.

In some examples, at operation 906, the patching module 228 can determine a radius 908 of a hypersphere in the feature space. The radius can be at most the lower of: a first distance from the second feature vector 712 to the first feature vector 704; and a second distance from the third feature vector 718 to the first feature vector 704. For example, the radius can be the lower of the first distance and the second distance, or the lower of the first distance and a percentage of the second distance, or the lower of the second distance and a percentage of the first distance. An example of the last of those is discussed above with reference to midpoint line 810.

In some examples, operation 906 can include determining the radius 908 being at most the lower of: a predetermined percentage of the distance from the second feature vector 712 to the first feature vector 704, wherein the predetermined percentage is greater than zero and is less than 100%; and a distance from the third feature vector 718 to the first feature vector 704. In some examples, e.g., as in FIG. 8, the percentage is applied with respect to the third feature vector 718 instead of the second feature vector 712. In some examples, a percentage is applied to both the second feature vector 712 and the third feature vector 718.

In some examples, at operation 910, patching module 228 can determine the dirty region being, comprising, or consisting of a hypersphere within the feature space. In some examples, the hypersphere is substantially centered at the first feature vector 704 or has the determined radius 908. Examples are discussed herein, e.g., with reference to FIG. 8. In some examples using operation 910, the local model 724 can include the center, the radius 908, and a distance function 1120. In some examples, patching module 228 can determine the local model 724 configured to provide, as output, a trial value indicating the trial data stream 916 is not associated with malware in response to the trial feature vector 914 being outside the hypersphere.

In some examples, at operation 912, operation module 230 can receive, e.g., via communications interface 236, a trial feature vector 914 associated with a trial data stream 916. Examples are discussed herein, e.g., with reference to operation 316. For example, a computing device 104 can provide the trial feature vector 914 to the operation module 230 via a network 108.

In some examples, at operation 918, operation module 230 can apply the trial feature vector 914 to the local model 724 to determine whether the trial feature vector 914 is within the dirty region of the feature space. If so, operation 918 can be followed by operation 920 ("Dirty"). Examples are discussed herein, e.g., with reference to operation 326. In some examples, before applying the trial feature vector 914 to the local model 724, operation module 230 can determine that the local model 724 is within a neighborhood of the trial feature vector 914. Examples are discussed herein, e.g., with reference to operation 326.

For example, operation module 230 can compute a distance between the trial feature vector 914 and the first feature vector 704 defining the center of a hypersphere local model 724. Operation module 230 can then determine that the trial feature vector 914 is associated with malware in response to the distance being less than, or less than or equal to, a radius of the hypersphere. In the example of FIG. 8, feature vector 804 would be classified as being associated with malware by local model 802, but not by local model 806.

In some examples, at operation 920, communications module 232 can provide, via a communications interface 236, an indication 922 that the trial data stream 916 is associated with malware. Operation 920 can be performed, e.g., in response to determining that the trial feature vector 914 is within the dirty region of the feature space 800. Examples are discussed herein, e.g., with reference to operation 330.

In some examples, operation 918 can be repeated with respect to multiple local computational models 724. Examples are discussed herein, e.g., with reference to operation 326. Once any local model 724 indicates that the trial feature vector 914 is associated with malware, operation 920 can be carried out and iteration can terminate.

Figure 10:
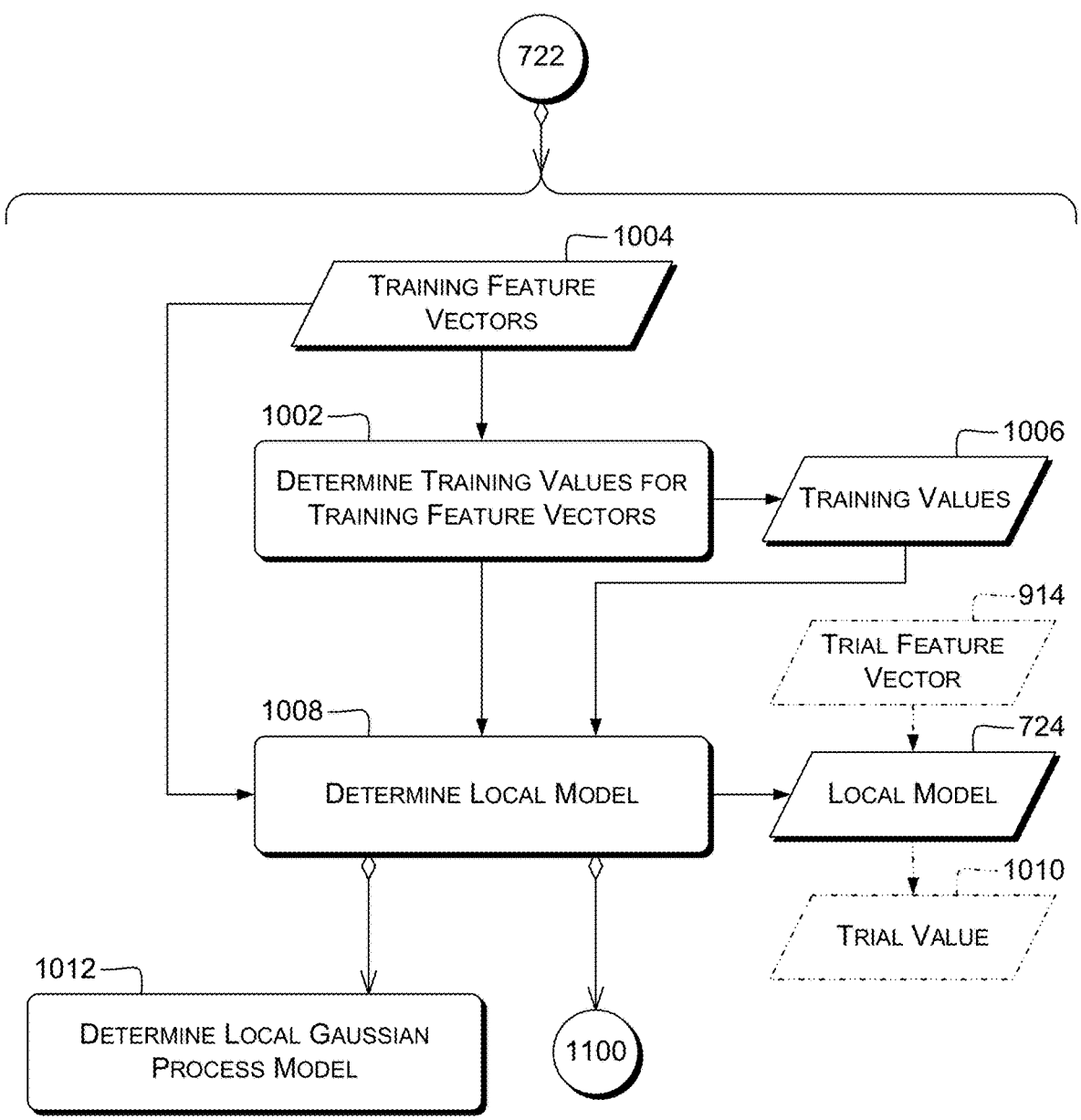
FIG. 10 is a dataflow diagram that illustrates example techniques for determining local computational model(s).

FIG. 10 is a dataflow diagram that illustrates an example technique 1000 for determining computational model(s), e.g., that can determine whether a trial data stream 120 is associated with malware, and related dataflow. In some examples, technique 1000 can be performed by a control unit, as described herein, e.g., of a computing device 102. Operation 722 can include performing operation 1008, or any of the operations of technique 1000.

In some examples, at operation 1002, patching module 228 can determine, for each training feature vector of a plurality of training feature vectors 1004, a respective training value 1006 indicating strength of association of that training feature vector with malware. The plurality of training feature vectors 1004 can include the second feature vector 712 and the third feature vector 718. In some examples, the plurality of training feature vectors 1004 can additionally or alternatively include the first feature vector 704. In some examples, accordingly, feature space 800 can be a scalar field that maps position (feature-vector contents) to strength of association. In some examples, patching module 228 can select the plurality of training feature vectors 1004 from the set 710 of feature vectors from which the clean data streams were selected as discussed herein with reference to operation 708. For example, patching module 228 can select a random subset of the set 710 of feature vectors to be the training feature vectors 1004. In some examples, patching module 228 can use minibatch-based or other random-sampling training techniques.

Each training value 1006 can be or include, e.g., a binary classification value such as a zero or one, a probability that the respective feature vector is associated with malware, or a value that represents both association with malware and confidence in the classification, e.g., a value between −1 and +1. Training values 1006 can be discrete or continuous. In this discussion, more positive values represent dirty (e.g., 0=clean, 1=dirty, or −1=clean, +1=dirty), although the opposite can be used, or another scale can be used (e.g., with values closer to 0 being more strongly associated with malware than either values closer to −1 or values closer to +1). In some examples, values of the scalar field can be interpolated for trial feature vectors 914 in between training feature vectors. Using a scalar field with interpolation can avoid mis-classifying a data stream based on a small difference, e.g., due to calculation precision. Moreover, for feature values outside a hull of the training feature vectors, interpolation can be performed to a value representing "unknown" (e.g., zero on a −1 to +1 scale) to permit effectively representing the limits of applicability of the model.

In some examples, at least one training value 1006 can be or include a vector or other collection of any of the types of values described in the preceding paragraph. For example, each training value 1006 can include multiple classification or confidence values, each associated with a specific malware family. In some examples, the vector of confidence values is a vector of binary values for respective malware families, e.g., each binary value indicating whether that training value 1006 is associated with, or not associated with, the respective malware family.

In some examples, at operation 1008, patching module 228 can determine the local model 724 based at least in part on at least some of the training values 1006. The local model 724 can be determined to have a configuration represented by elements depicted in phantom. The local model 724 can receive as input a trial feature vector 914. The local model 724 can provide as output a trial value 1010 indicating strength of association of the trial feature vector 914 with malware. Operation 1008 of determining the local model 724 having this configuration can permit readily determining whether a newly-supplied feature vector, e.g., corresponding to a newly-installed program, is associated with malware. In some examples, the local model 724 determined at operation 1008 can be used with operations 912, 918, and 920. In some examples, operation 1008 can include operations 1102-1130.

In some examples, at operation 1012, patching module 228 can determine the local computational model comprising a Gaussian process model. Operation 1012 can include fitting the Gaussian process model to training data comprising the plurality of training feature vectors 1004 and the respective training values 1006. In some examples, operation 1012 can include carrying out a maximum-likelihood estimation or gradient-descent learning procedure to fit coefficients of the Gaussian process model to the training data. The coefficients can include, e.g., coefficients of regression functions, standard deviation(s) of error term(s), or element(s) of a correlation matrix on the error terms.

In some examples, a Gaussian process model is based on a vector of k inputs, e.g., training feature vectors 1004, and a vector of k associated outputs, e.g., training values 1006. The Gaussian process model can include a k-variate Gaussian distribution that provides values, e.g., trial values 1010, for particular locations, e.g., trial feature vectors 914. Note that the number k of variables in the Gaussian process model may be the same as, or different from, the number N of dimensions in a training feature vector 1004. Operation 1012 can include determining the covariance matrix of the k-variate Gaussian distribution. In some examples, the location of the distribution is fixed, e.g., at the centroid or medoid of the training feature vectors 1004. Mathematical optimization techniques such as maximum-likelihood estimation can be used to determine the elements of the covariance matrix so that a draw from the multivariate Gaussian distribution will, e.g., with high or mathematically optimal probability, produce the training values 1006. Once the Gaussian process model has been determined, the trial value 1010 can be computed by determining the mean of the trained Gaussian process model at the trial feature vector 914.

As discussed herein with reference to operation 1002, in some examples, the trial values 1010 can be between −1 and +1, and the mean of the Gaussian process can be taken as zero, representing "unknown." The trial value 1010 can then be computed by determining the mean, as noted in the preceding paragraph, and applying threshold(s). In some examples, a mean value below a predetermined threshold, e.g., −0.5, corresponds to a determination that the trial feature vector 914 represents a clean data stream; a mean value above a second predetermined threshold, e.g., +0.5, corresponds to a determination that the trial feature vector 914 represents a dirty data stream; and a mean value between the threshold and the second threshold corresponds to no determination ("unknown"). If no determination is made by the trained Gaussian process model, indication 922 can be determined based on an output of broad model 222 or another local model 224, 724. In some examples, the threshold(s) can be determined based on, e.g., the family of malware, or a user preference. In some examples of Gaussian process models or other models (e.g., regression trees/forests) that provide association strengths rather than true/false values for particular trial feature vectors, the dirty region 726 can be or include that portion of the feature space for which the association strength is greater than the threshold, or satisfies a different criterion on association-strength values.

Figure 11:
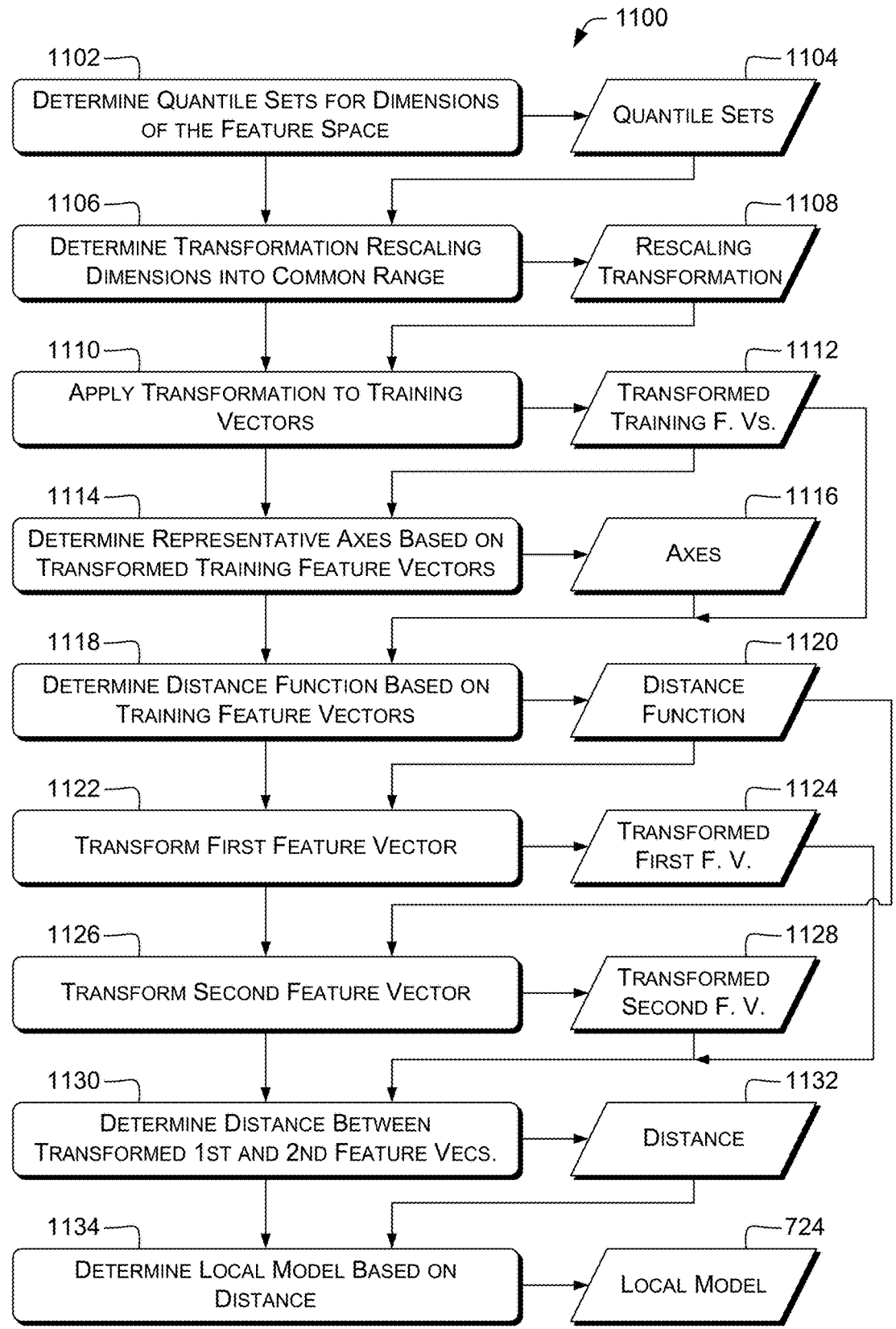
FIG. 11 is a dataflow diagram that illustrates example techniques for determining local computational model(s), e.g., using transformations of a feature space.

FIG. 11 is a dataflow diagram that illustrates an example technique 1100 for determining computational model(s), e.g., that can determine whether a trial data stream 120 is associated with malware, and related dataflow. In some examples, technique 1000 can be performed by a control unit, as described herein, e.g., of a computing device 102.

Technique 1100 can include using techniques such as Mahalanobis distance or eigendecomposition to determine distances between feature vectors in a feature space 800. Technique 1100 can be carried out as part of operation 1008. Additionally or alternatively, any distance computation described herein can be carried out using technique 1100 or results thereof. In some examples, operations 1102-1118 can be carried out to determine a distance function 1120. Distance function 1120 can then be used in any of the distance computations described herein. Using distance function 1120, or other operations of technique 1100, can reduce inaccuracies that might otherwise be introduced by, e.g., differences in scale across different dimensions of a feature space, or correlations between features.

In some examples, operations 1102-1110 are omitted. In some examples, operations 1114 and 1118 are performed in one operation, e.g., an operation of determining a precision matrix to be used for Mahalanobis-distance computation. In some examples, operations 1114-1130 are used with Mahalanobis distance computations, as described below.

In some examples, at operation 1102, patching module 228 can determine, for each dimension of a plurality of dimensions of the feature space, a respective quantile set 1104 based on the extent in that dimension of at least some of the plurality of training feature vectors 1004. For example, a quantile set 1104 can include the position in a dimension of the minimum element (0%), the median (50%), and the maximum element (100%). This can permit representing each dimension of feature space 800 in a common range, even when one dimension may be binary and another dimension may be a real number having values spanning several orders of magnitude. Using quantile sets can also provide improved resolution in the central peak of a distribution associated with a dimension, in which peak many samples are near each other. Using quantile sets can also reduce the sensitivity of the data to high-magnitude or very distant outliers, compared to using the mean. Any number of quantiles may be used, e.g., four or ten. Additionally or alternatively, z-scores or other normalized values can be used in place of the quantile set 1104 in the operations described below.

In some examples, at operation 1106, patching module 228 can determine a transformation 1108 scaling each dimension of the plurality of dimensions into a common range based at least in part on the respective quantile set 1104. Accordingly, patching module 228 can determine transformation 1108 based at least in part on the plurality of training feature vectors 1004. The plurality of training feature vectors 1004 can include the second feature vector 712 and the third feature vector 718. For example, the transformation 1108 can replace each element of each feature vector with the quantile of that element in the respective dimension, or an interpolation between the adjacent quantiles according to the position of that element in the corresponding data set.

In some examples, at operation 1110, patching module 228 can apply the transformation 1108 to at least some training feature vectors of the plurality of training feature vectors 1004 to provide transformed training feature vectors 1112. Examples are discussed herein, e.g., with reference to operations 506 and 510. Operation 1110 can include, e.g., multiplication by a matrix of or representing the transformation 1108. In some examples, the transformation 1108 transforms the feature space 800 into a hypercube. Accordingly, the transformed training feature vectors 1112 can have values within a given range, e.g., zero to unity or zero to 100, for each dimension. This can reduce inaccuracies in distance computations due to differences in the scales of dimensions. In some examples, fewer than all of the training feature vectors 1004 are used, e.g., as discussed herein with reference to operation 502 or set 710. For example, a random subsample of the training feature vectors 1004 can be used. Using fewer training feature vectors 1004 can reduce the computational load of technique 1100.

In some examples, at operation 1114, patching module 228 can determine a plurality of representative axes 1116 based at least in part on the transformed training feature vectors 1112. The representative axes 1116 can be or include, e.g., eigenvectors, principal components, or Mahalanobis principal directions. For example, patching module 228 can determine the axes as directions along which variance is the greatest, next greatest, and so on. The number of axes can be equal to, or less than, the number of dimensions in the feature space 800. In some examples, operation 1114 can include determining a covariance matrix of the transformed training feature vectors 1112, since the representative axes 1116 are implicit in the covariance matrix when using a variance-based transformation such as the Mahalanobis distance. In some examples, operation 1114 can include determining eigenvectors, left singular vectors, right singular vectors, or principal components of a matrix representing the transformed training feature vectors 1112. In some examples, the representative axes 1116 can be axes of an orthogonal or orthonormal basis.

In some examples, operation 1114 can include determining a covariance matrix for the transformed training feature vector 1112 (or, as noted above, for the non-rescaled training feature vectors 1004). In some examples, if the distribution of data in a dimension is uniform (e.g., for continuous-valued data rescaled by quantiles), a predetermined variance can be used in determining the covariance matrix.

In some examples, at operation 1118, patching module 228 can determine a distance function 1120 based at least in part on the plurality of transformed training feature vectors 1112 (and thus, indirectly, on the plurality of training feature vectors 1004). Patching module 228 can determine the distance function 1120 further based on the plurality of representative axes 1116. The distance function 1120, as determined, can be configured to determine a distance in a space associated with the representative axes 1116. For example, operation 1118 can include inverting the covariance matrix to determine a Mahalanobis precision matrix P, or determining rotations to transform each axis in the feature space 800 (or a subset of the dimensions thereof) to the corresponding representative axis 1116. In some examples, the distance function 1120 is $d(x,y)=[(x-y)^T P (x-y)]^{0.5}$, i.e., a Mahalanobis distance (e.g., Euclidean distance in an orthonormal space with axes corresponding to principal components). In some examples, P can be adjusted by setting eigenvalues of P having a magnitude below a predetermined percentage of the magnitude of the largest eigenvalue to zero or to the percentage of the magnitude. This can improve numerical stability. Additionally or alternatively, the distance function 1120 can be, e.g., Euclidean distance in another transformed set of axes, Manhattan distance (in feature space 800 or a transformed space), or another distance function. In some examples, the distance function 1120 can include a transformation matrix that transforms input points into an orthonormal basis, and a distance operation (e.g., Euclidean distance) that computes the distance between the transformed input points.

In some examples, operation 1118 can include inverting the covariance matrix to determine a precision matrix. In some examples, if the covariance matrix is singular (or numerically singular), the precision matrix P can be determined by adding a positive definite matrix before inverting the result, e.g., as $P=(\Sigma+\lambda\Omega)^{-1}$, where $\Sigma$ is the covariance matrix, $\Omega$ is any positive definite matrix, and $\lambda$ is any positive number. In some examples, the precision matrix can be determined as $P=(\Sigma+\epsilon I)^{-1}$, for $\epsilon$ large enough to prevent numerical singularity and small enough to avoid substantially overwhelming correlation information in $\Sigma$.

In some examples, at operation 1122, the operation module 230 can apply the transformation 1108 to the first feature vector 704 to provide a transformed first feature vector 1124. Examples are discussed herein, e.g., with reference to operation 1110.

In some examples, at operation 1126, the operation module 230 can apply the transformation 1108 to the second feature vector 712 to provide a transformed second feature vector 1128. Examples are discussed herein, e.g., with reference to operation 1110.

In some examples, at operation 1130, patching module 228 can determine a distance 1132 between the transformed first feature vector 1124 and the transformed second feature vector 1128. In some examples, operations 1122, 1126, and 1130 can be performed together, e.g., by computing Mahalanobis distance or otherwise applying a transformation matrix and a distance operation to first feature vector 704 and second feature vector 712.

In some examples, at operation 1134, patching module 228 can determine the local model 724 based at least in part on the distance 1132. For example, the distance 1132 (or a percentage thereof) can be used as the radius of the hypersphere, as discussed herein with reference to FIG. 8 or operations 906-910, instead of the distance between the (non-transformed) first feature vector 704 and second feature vector 712. Determining radius in an orthonormal basis or other transformed space can reduce the probability of error due to different weights of various features.

In some examples, any of operations 310, 506, 722, 910, 1008, or 1122 can be performed one time or multiple times with respect to different feature vectors. For example, a separate local model 724 can be determined for each feature vector. Additionally or alternatively, if several false misses are within a predetermined distance of each other, a single local model 724 can be determined whose dirty region 726 includes the feature vectors for all of those false misses. Additionally or alternatively, if several local models 724 for respective, different false misses are determined to have at least a predetermined overlap (e.g., expressed as volume percentage), those local models 724 can be replaced by a consolidated local model.

The center of the dirty region 726 of a hypersphere consolidated local model 724 can be placed at, e.g., the centroid of the feature vectors for the false misses, or at the one of those false misses that is a medoid of the feature vectors. Additionally or alternatively, in some examples, the center of the dirty region 726 can be determined as the average, median, or other representative value of a plurality of feature vectors representing dirty data streams, e.g., data streams corresponding to variants of malware from the same family. In some of these examples, the representative value is determined from a plurality of first feature vectors 704 (false misses). In others of these examples, the representative value is determined based on at least one first feature vector 704 and at least one feature vector that does not represent a false miss. Accordingly, in some examples, operations 310, 722, 910, 1008, 1134, or 1320 can include determining a center of the dirty region as at least one of a centroid, medoid, average, median, or other representative value of a first group of feature vectors, e.g., first feature vectors 704. Examples are discussed herein with reference to technique 700.

In some examples, operation 702 is performed multiple times for multiple first feature vectors 704 to receive or otherwise provide a first group of feature vectors. The first group of feature vectors can include the first feature vector 704. Operations 708 and 716 can be performed one or more times, e.g., once per first feature vector 704, to select or otherwise provide a second group of one or more second (clean) feature vectors and a third group of one or more third (dirty) feature vectors. The second group can include the second feature vector 712. The third group can include the third feature vector 718. In some examples, operation 708 is performed once per first feature vector 704, and operation 716 is performed at least once. Operation 722 can be performed with respect to the first, second, and third groups, e.g., all the first feature vectors 704 and as many second feature vectors 712 and third feature vectors 718 as were selected by operations 708 and 716. Operation 722 can include, e.g., pairwise comparison of each first feature vector 704 with at least one second feature vector 712 and with at least one third feature vector 718. The resulting dirty region 726 can therefore contain the feature vectors of the first group and exclude the feature vectors of the second group. Percentages, e.g., as discussed herein with reference to midpoint lines 808 and 810, can be computed with respect to the nearest, the farthest, or randomly-selected ones of the second group and the third group.

Figure 12:
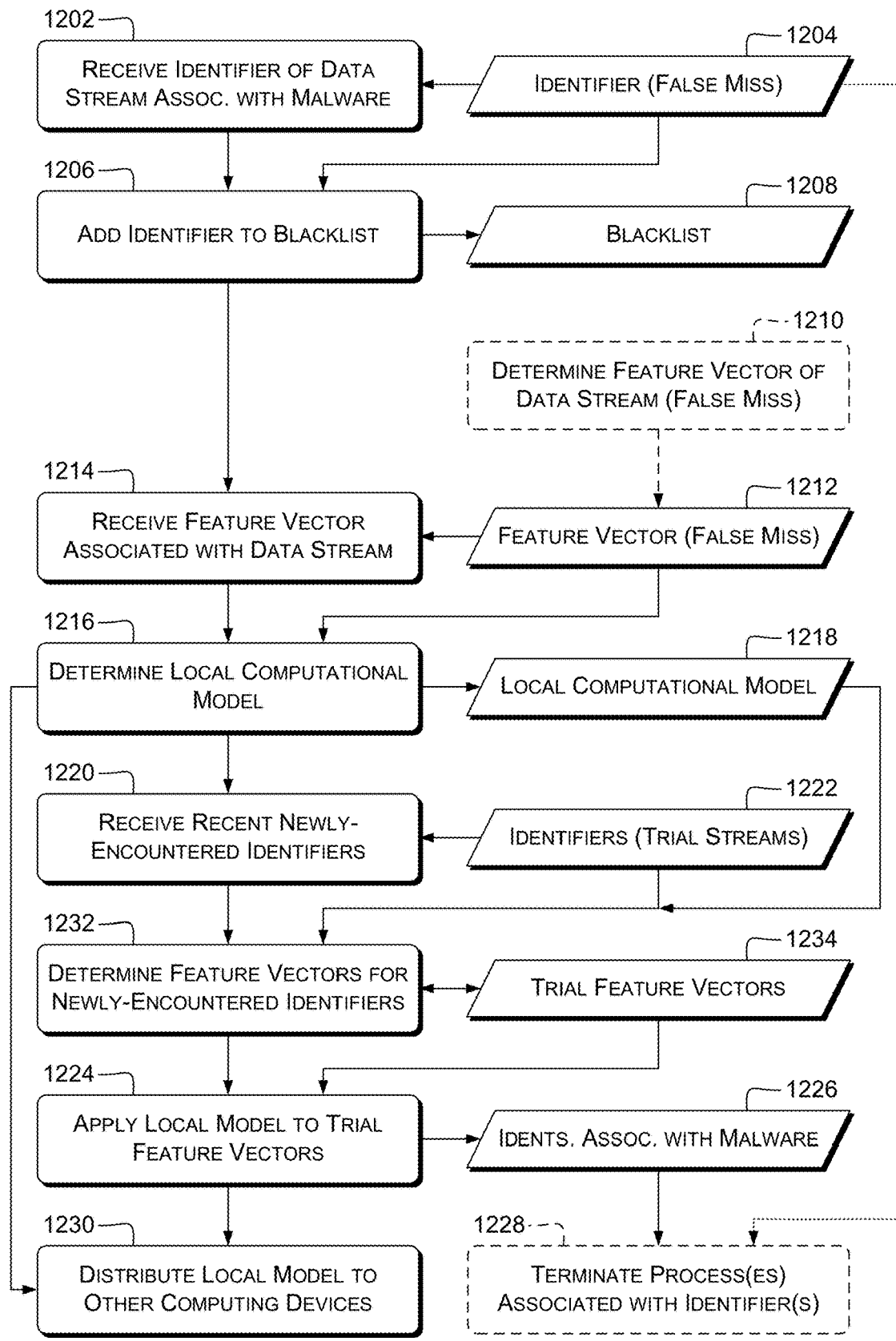
FIG. 12 is a dataflow diagram that illustrates example interactions between computing devices for identification or mitigation of malware.

FIG. 12 is a dataflow diagram that illustrates an example technique 1200 for determining computational model(s), e.g., that can determine whether a trial data stream 120 is associated with malware, and related dataflow. In some examples, technique 1200 can be performed by control units, as described herein, e.g., of computing devices 102 and 104. Operations performed in some examples by computing device 102 are depicted with solid outlines; operations performed in some examples by computing device 104 are depicted with dashed outlines. However, other assignments of operations to computing devices 102, 104 are possible.

In some examples, at operation 1202, computing device 102 can receive an identifier 1204 of a data stream associated with malware, e.g., a false miss. Examples are discussed herein, e.g., with reference to operations 302 or 702. Identifier 1204 can be or include, e.g., a cryptographic hash of the data stream, or other types of identifier described herein. In some examples, computing device 104 can transmit identifier 1204 to a computing device 102. In some examples, identifier 1204 can be provided by an external datasource such as, e.g., a malware hash blacklist service. In some examples, computing device 102 has access to the data stream; in other examples, computing device 102 has access to the identifier 1204 but not to the data stream itself. In some examples, operation 1202 can be followed by operation 1206, as shown. In other examples, operation 1206 can be omitted, and operation 1202 can be followed by operation 1214.

In some examples, at operation 1206, computing device 102 can add the identifier to a blacklist 1208. The blacklist can be distributed or made available to other computing device(s) 102 or 104, e.g., via network(s) 108. Those other computing devices 102, 104 can then use the blacklist to detect the data stream as malicious, and thereby to prevent subsequent false misses of the data stream. In some examples, computing device(s) 104 can maintain a local cache of identifiers of dirty data streams to permit detecting malware without requiring a network interaction with a computing device 102, e.g., a cloud service or an appliance. Operation 1206 can be followed by operation 1214.

In some examples, before accessing a data stream matching a configuration setting (e.g., all executables or all script files), computing device 104 can determine an identifier of the data stream. For example, accessing the data stream can include executing a program module or opening a data file. The configuration setting can indicate that, e.g., all compiled executables (e.g., MZ files on WINDOWS; ELF files on LINUX) should be checked, or that all script files (e.g., *.sh, *.bat, *.cmd, *.js, or files beginning with "#!") should be checked. Computing device 104 can check the identifier of the data stream against a local cache or blacklist to determine whether the data stream is associated with malware (e.g., operations 608 and 610, performed on computing device 104). Additionally or alternatively, computing device 104 can transmit the identifier to a computing device 102, and receive an indication of whether the data stream is associated with malware (e.g., FIG. 6 or operations 912-920). If the data stream is associated with malware, computing device 104 (e.g., a security or antivirus program running thereon) can prevent the data stream from being accessed, or take other operations described herein with reference to FIG. 4.

In some examples, at operation 1210, computing device 104 can determine a feature vector 1212 of the data stream. Operation 1210 can be performed before or after operation 1202. In some examples, operation 1210 can include operating a feature extractor to determine features such as those listed in Table 1. Determining the feature vector 1212 at computing device 104 rather than computing device 102 can permit determining feature vector 1212 without transmitting the data stream from computing device 104 to computing device 102, which can reduce the network bandwidth required to detect or classify malware. Moreover, in some examples including multiple computing devices 104, the feature vector 1212 can be determined by only one (or a small number) of the computing devices 104. The identifier 1204 (or other identifiers in set 1226, discussed below) can then be distributed to computing device(s) 102 or to the other computing devices 104. In some examples, an identifier requires less storage space than does a feature vector, e.g., between 256 and 1024 bits (32-128 bytes) regardless of the size of the data stream for typical cryptographic hashes. Accordingly, distributing identifiers, but not feature vectors, to the other computing devices 104 can permit those computing devices 104 to detect more malware than they might otherwise be able to, without requiring a significant increase in the network bandwidth required to exchange data regarding the malware.

In some examples, at operation 1214, computing device 102 can receive the feature vector 1212 associated with the data stream. For example, computing device 102 can retrieve the feature vector 1212 from a database, or request the feature vector 1212 from the computing device 104. The request can include the identifier 1204 or other identifying information of the data stream. In some examples, computing device 104 determines the feature vector 1212 only in response to a request from computing device 102. This can reduce the computational load of detecting malware by reducing the number of feature vectors extracted to only those required by computing device 102. For example, a computing device 104 may have stored a copy of a data stream that was not previously recognized as being malware. In response to a request for the feature vector 1212 associated with the identifier 1214, that computing device 104 can determine the feature vector 1212 without requiring any network transmission of the data stream.

Additionally or alternatively, in some examples, at operation 1214, computing device 102 can determine the feature vector, e.g., as discussed herein with reference to operation 1210. For example, a security analyst may upload the data stream from a thin client to a cloud or appliance computing device 102 at which the feature vector can be determined. In other examples, the computing device 102 may be or include a file server or other server that already has a copy of the file, in which case the computing device 102 can determine the feature vector 1212 without further network transmission of the data stream, e.g., by looking up the file by its identifier in a database.

In some examples, at operation 1216, computing device 102 can determine a local computational model 1218, which can represent local models 224, 724, or 1322. Examples are discussed herein, e.g., with reference to operation 310, FIG. 5, operation 722, FIGS. 8-14, and associated data items (e.g., local models 224, 724, or 1322). Operation 1216 can be followed by operation 1220 or operation 1230.

In some examples, at operation 1220, computing device 102 can receive one or more recent newly-encountered identifiers 1222, e.g., file hashes such as SHA-256 hashes. Operation 1220 can include retrieving the identifiers 1222 from a database or querying one or more data system(s) for the identifiers 1222. New malware variants, and new clean programs, are constantly being released. Therefore, new (formerly-unknown) data streams and their associated identifiers may be encountered over time. In some examples, newly-encountered identifiers 1222 can include, e.g., identifiers that were first encountered (e.g., first inserted into a database) within a predetermined time period, e.g., the last 24 hours or the last 48 hours. Checking for recent newly-encountered identifiers 1222 can permit rapidly detecting newly-released, rapidly-spreading malware, which can in turn reduce the severity of the outbreak of that malware. In some examples, operation 1220 includes receiving identifiers from one or more computing devices 104 and selecting, as the newly-encountered identifiers 1222, ones of the received identifiers that that are not already stored in a database or otherwise have not been encountered by computing device 102.

In some examples, at operation 1232, computing device 102 can determine trial feature vectors 1234 for the newly-encountered identifiers 1222. For example, computing device 102 can retrieve the trial feature vectors 1234 from a database indexed by identifier 1222. Additionally or alternatively, computing device 102 can determine a trial feature vector 1234 by processing the contents of a corresponding file identified by the corresponding identifier 1222, e.g., as described herein. Additionally or alternatively, computing device 102 can determine a trial feature vector 1234 by transmitting, to a computing device 104, a request for the trial feature vector 1234, and receiving the trial feature vector 1234 from the computing device 104. As noted herein, determination of the trial feature vector 1234 at a computing device 104 can reduce the need to transmit large files over a network, saving bandwidth and other communication resources.

In some examples, at operation 1224, computing device 102 can apply the local model 1218 to the trial feature vectors 1234 corresponding to the newly-encountered identifiers 1222, e.g., as described herein with reference to operation module 230, operation 326, or other similar operations. Computing device 102 can determine a set 1226 including those identifiers that are indicated by the local model 1218 as being associated with malware. In some examples, computing device 102 can add the identifiers in the set 1226 to the blacklist 1208, or otherwise distribute information of the identifiers in the set 1226 to other computing devices 102, 104, e.g., as discussed herein with reference to operation 1206.

In some examples, at operation 1228, computing device(s) 104 can terminate running process(es) associated with at least one of: the first identifier 1204, or any of the identifiers in the set 1226 of identifiers associated with malware. Examples are discussed herein, e.g., with reference to operation 408. Additionally or alternatively, removal or quarantine operations can be performed, as discussed herein with reference to operations 404 or 406. In some examples, in which computing device(s) hold local caches of identifiers, operation 1228 can additionally or alternatively include clearing or invalidating the cache. This can cause computing device(s) 104 to interact with computing device(s) 102 to determine whether data streams are malicious, which can permit more rapidly providing targeted information based on the local model 1218 to computing device(s) 104.

In some examples, at operation 1230, computing device 102 can distribute the local model 1218 to computing device(s) 104. The computing device(s) 104 can then use the local model 1218 to test data streams without requiring a network exchange.

Figure 13:
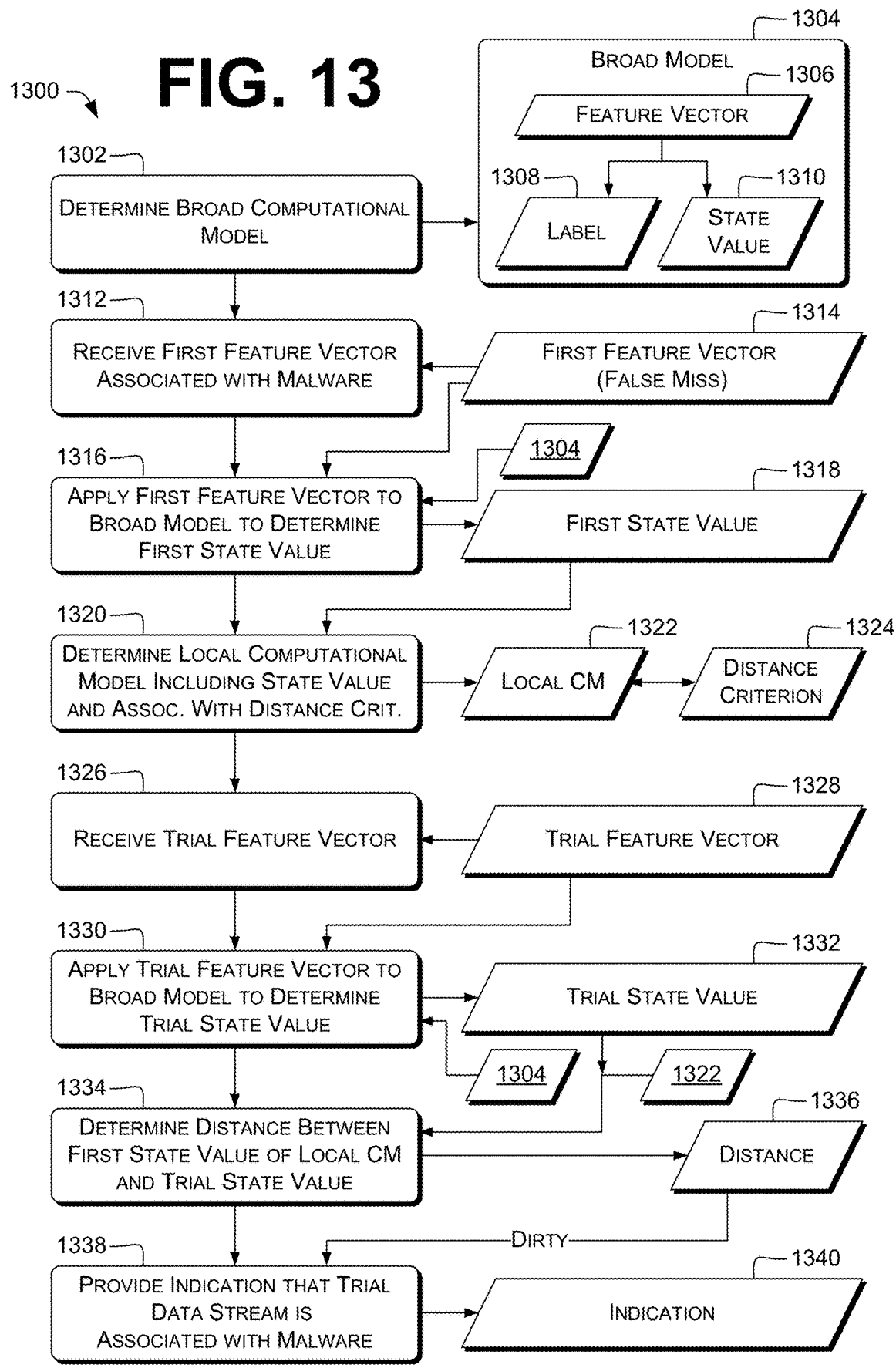
FIG. 13 is a dataflow diagram that illustrates example techniques for determining and operating computational model(s), e.g., to determine whether a trial data stream is associated with malware.

FIG. 13 is a dataflow diagram that illustrates an example technique 1300 for determining and operating computational model(s), e.g., to determine whether a trial data stream 120 is associated with malware, and related dataflow. In some examples, technique 1300 can be performed by a control unit, as described herein, e.g., of a computing device 102. In some examples, only operations 1302-1320 are performed at a particular device or group of devices, e.g., at a computing device 102. In some examples, only operations 1326-1338 are performed at a particular device or group of devices, e.g., at a computing device 104. Various of the following figures provide more details of example implementations of the operations shown in FIG. 13. In some examples: operation 1302 can include operations 1502, 1602, or 1702; operation 1316 can include operations 1504, 1604, or 1704; operation 1330 can include operations 1508, 1608, or 1708; operation 1320 can include operations of technique 1400; or operation 1334 can include operations 1512, 1612, or 1712.

In some examples, at operation 1302, training module 226 can determine a broad computational model 1304 (which can represent broad CM 114) based at least in part on training feature vectors of a plurality of training feature vectors and on respective labels of the training feature vectors. Examples are discussed herein, e.g., with reference to FIG. 8, 10, or 11. For example, training module 226 can train a decision forest, a DNN, or another broad CM 1304, e.g., using supervised-learning techniques such as xgboost. In some examples, each of the labels indicates whether the respective training feature vector is associated with malware. Examples are discussed herein, e.g., with reference to training values 1006.

In some examples, the trained broad CM 1304 is configured to receive as input a feature vector 1306, e.g., fourth feature vector 318 or trial feature vector 914. The broad CM 1304 can be configured to provide as output both: a label 1308 indicating whether the feature vector is associated with malware; and a state value 1310 associated with the feature vector. The state value 1310 can indicate, e.g., which leaf of a decision tree corresponds with the feature vector, or outputs of a hidden layer of a DNN fed with the feature vector as input. Examples are discussed herein, e.g., with reference to FIGS. 15-17.

In some examples, at operation 1312, the communications module 232 can receive, via a communications interface 236, a first feature vector 1314 that is associated with malware, The first feature vector 1314 can represent, e.g., a false miss, as described herein with reference to first feature vector 304 or 704. Examples are discussed herein, e.g., with reference to operation 302.

In some examples, at operation 1316, the operation module 230 can operate the broad CM 1304 based on the first feature vector 1314 to determine a first state value 1318 (which can represent state value 1310) associated with the first feature vector 1314. This can be done, e.g., as noted above with reference to feature vector 1306.

In some examples, at operation 1320, the patching module 228 can determine a local computational model 1322 (which can represent local CM 116) comprising the first state value 1318 and associated with a distance criterion 1324. For example, the local CM 1322 can include a distance such as radius 908 or another distance. The local CM 1322 can define a dirty region, e.g., dirty region 726, including point(s) close enough to the first state value 1318 to satisfy the distance criterion 1324. In some examples, the dirty region can be defined with respect to a feature space 728. In other examples, the dirty region can be defined with respect to a space that does not have, e.g., a distance function satisfying the triangle inequality. In some examples, the dirty region can be discontinuous. In some examples, the dirty region can be a mathematical construct not defined with respect to a particular space. Examples are discussed below.

In some examples, at operation 1326, the communications module 232 can receive, via the communications interface 236, a trial feature vector 1328 associated with the trial data stream 120. Examples are discussed herein, e.g., with reference to operation 316.

In some examples, at operation 1330, the operation module 230 can operate the broad CM 1304 based on the trial feature vector 1328 to determine a trial state value 1332 (which can represent state value 1310) associated with the trial feature vector 1328. This can be done, e.g., as noted above with reference to feature vector 1306. In some examples, a different broad model 222 is used instead of broad CM 1304 for non-local detections. In some of these examples, broad model 1304 can be used in determining first state value 1318, and a different model can be used to determine trial state value 1332.

In some examples, at operation 1334, the operation module 230 can determine a distance 1336 between the first state value 1318 of the local CM 1322 and the trial state value 1332. As noted above, distance 1336 can be a distance in a space, although this is not required. Examples are discussed below with reference to operations 1512, 1612, and 1712.

In some examples, e.g., as discussed below with reference to FIGS. 15-17, the first state value 1318 and the trial state value 1332 can include respective vectors, e.g., of Boolean, numerical (e.g., floating-point), string, or other values. In some examples, respective locality-sensitive hashing (LSH) codes or bins can be computed for the first state value 1318 and the trial state value 1332, e.g., using $E^2$LSH or other LSH techniques such as those discussed above with reference to FIG. 1. The LSH codes can be vectors, e.g., of bits. For brevity, in the following discussion, "α" refers to the first state value 1318 or an LSH code or other transformation thereof, and "β" refers to the trial state value 1332 or an LSH code or other transformation thereof. In some examples, the distance 1336 between α and β can be determined using any, or any combination, of the following techniques.

In some examples, the distance 1336 can be computed as a distance in a predetermined evaluation space or metric, e.g., a Euclidean, Manhattan, earth-mover's, Mahalanobis, Hamming, or Jaccard distance, or an angle or dot product between the vectors or normalized versions of the vectors (zero when they point in the same direction). Hamming distances can be determined with respect to vectors of bits (or other two-valued elements) by counting the number of differences between corresponding elements. Hamming distances can be determined with respect to vectors of real numbers or other non-two-valued elements by counting the number of pairs of corresponding elements for which the difference between those elements exceeds a threshold, percentage, or number of standard deviations, in some examples. In some examples, the distance 1336 can be computed as an element-by-element sum of absolute, percentage, root-mean-square (RMS), or other differences between respective elements of a and corresponding elements of β. In some examples, the distance 1336 can be computed as a cross-entropy loss or Kullback-Leibler divergence.

In some examples, operation 1334 can include determining that the distance 1336 satisfies the distance criterion 1324 of the local CM 1322. This corresponds to a determination that the trial feature vector 1328 is associated with malware, as is the corresponding trial data stream. Examples are discussed herein, e.g., with reference to dirty region 726, FIG. 8, operation 918, or FIG. 11. In some examples, this determination can be performed separately from operation 1334. In some examples, e.g., as discussed herein with reference to FIG. 8, lower values of distance 1336 represent greater similarity than do higher values of distance 1336. In some examples, e.g., as discussed herein with reference to operation 1514, FIG. 15, higher values of distance 1336 represent greater similarity than do lower values of distance 1336.

In some examples, at operation 1338, the operation module 230 or the communications module 232 can provide, via the communications interface 236, an indication 1340 (which can represent output 242, indication 332, or indication 922) that the trial data stream 120 is associated with malware. Operation 1338 can be performed in response to the distance 1336 satisfying the distance criterion 1324 of the local CM 1322 ("Dirty"). Examples are discussed herein, e.g., with reference to dirty region 726, FIG. 8, operation 918, or FIG. 11.

Figure 14:
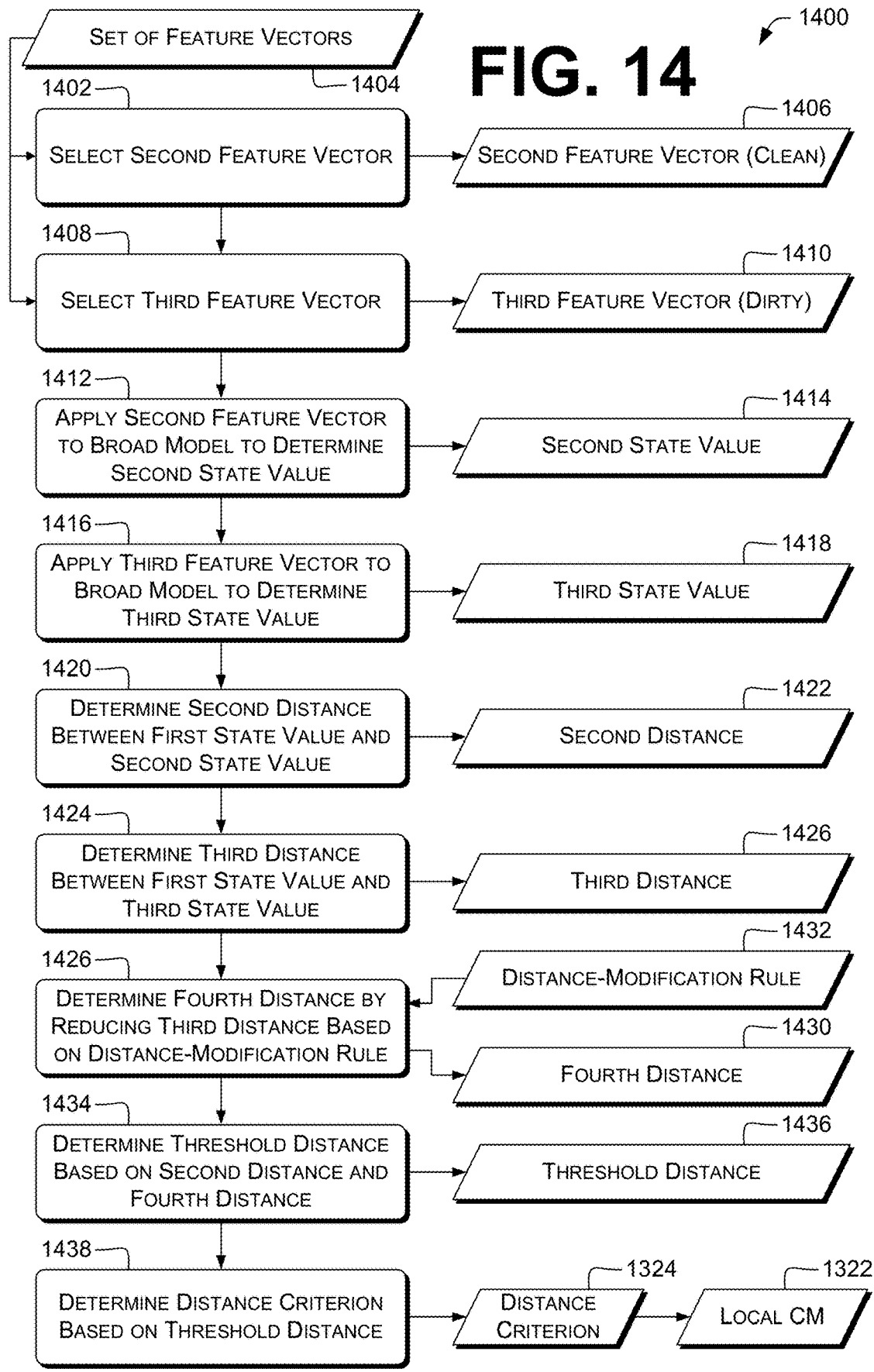
FIG. 14 is a dataflow diagram that illustrates example techniques for determining local computational model(s).

FIG. 14 is a dataflow diagram that illustrates an example technique 1400 for determining a local computational model 1322, and related dataflow. In some examples, technique 1400 can be performed by a control unit, as described herein, e.g., of a computing device 102. In some examples, the local CM 1322 can be determined, with respect to a particular first feature vector 1314 (false miss), based on nearby clean feature vector(s) and nearby dirty feature vector(s), e.g., as discussed herein with reference to FIG. 8.

In some examples, at operation 1402, the patching module 228 can select, from a set 1404 of feature vectors, a second feature vector 1406 that is not associated with malware (clean). Examples are discussed herein, e.g., with reference to FIGS. 7 and 8, e.g., operation 708. Set 1404 can represent set 710. Second feature vector 1406 can represent second feature vector 712. Set 1404 can include training feature vectors 1004 or other feature vectors. Set 1404 can include all or only part of a corpus of feature vectors.

In some examples, at operation 1408, the patching module 228 can select, from the set 1404 of feature vectors, a third feature vector 1410 that is associated with malware (dirty). Examples are discussed herein, e.g., with reference to operation 716. Third feature vector 1410 can represent third feature vector 718. For example, third feature vector 1410 can be the Nth-closest dirty feature vector to first feature vector 1314 (e.g., N=3).

In some examples, at operation 1412, the operation module 230 or the patching module 228 can operate the broad CM 1304 based on the second feature vector 1406 to determine a second state value 1414 associated with the second feature vector 1406 (clean). Examples are discussed herein, e.g., with reference to operations 1316 and 1330.

In some examples, at operation 1416, the operation module 230 or the patching module 228 can operate the broad CM 1304 based on the third feature vector 1410 (dirty) to determine a third state value 1418 associated with the third feature vector 1410. Examples are discussed herein, e.g., with reference to operations 1316 and 1330.

In some examples, at operation 1420, the operation module 230 or the patching module 228 can determine a second distance 1422 between the first state value 1318 and the second state value 1414 (a distance to a clean sample). Examples are discussed below, e.g., with reference to FIGS. 15-17.

In some examples, at operation 1424, the operation module 230 or the patching module 228 can determine determining a third distance 1426 between the first state value 1318 and the third state value 1418 (a distance to a dirty sample). This can be done as noted with reference to operation 1420.

In some examples, at operation 1428, the operation module 230 or the patching module 228 can determine a fourth distance 1430 by reducing the third distance 1418 based at least in part on a predetermined distance-modification rule 1432. For example, the rule 1432 can specify that the fourth distance 1430 be reduced to no more than P percent of the third distance 1426, for 0<P<100. Midpoint line 808 shows an example in which P=50. Examples are discussed herein, e.g., with reference to FIG. 8, operation 906, or operation 1134.

In some examples, at operation 1434, the operation module 230 or the patching module 228 can determine a threshold distance 1436 that is at most the lower of the second distance 1422 and the fourth distance 1430. Examples are discussed herein, e.g., with reference to FIG. 8. For example, in FIG. 8, midpoint line 808 is closer to first feature vector 704 than is second feature vector 712. Operation 1434 can be performed with respect to distances defined in a space or other distances.

In some examples, at operation 1438, the operation module 230 or the patching module 228 can determine the distance criterion 1324 indicating that the trial data stream is determined to be associated with malware if the distance 1336 determined at operation 1334 is less than (or, in some examples, less than or equal to) the threshold distance. Examples are discussed herein, e.g., with reference to operation 910.

Figure 15:
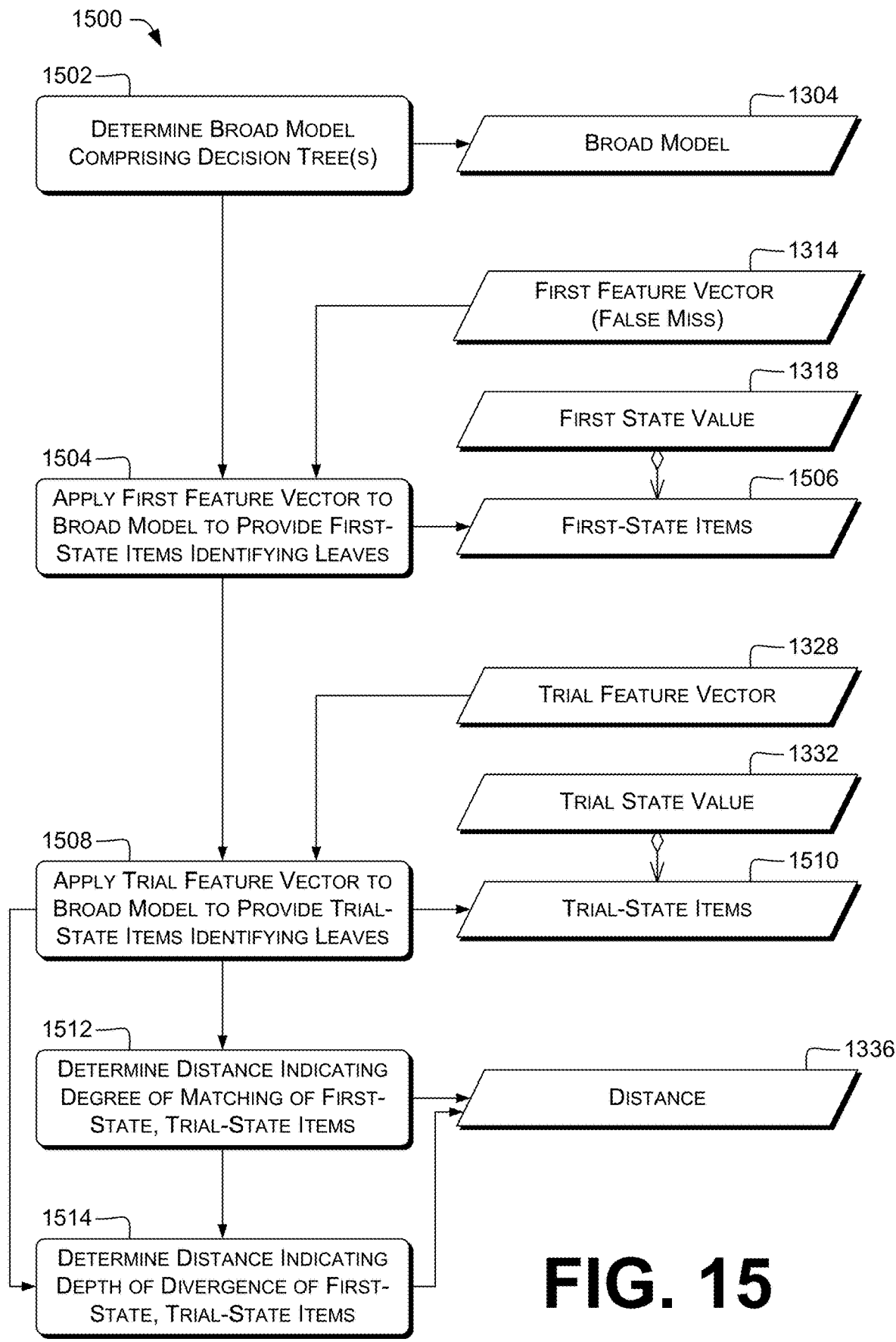
FIG. 15 is a dataflow diagram that illustrates example techniques for determining and operating decision-tree model(s), e.g., to determine whether a trial data stream is associated with malware.

FIG. 15 is a dataflow diagram that illustrates an example technique 1500 for determining and operating decision-tree based computational model(s), and related dataflow. In some examples, technique 1500 can be performed by a control unit, as described herein, e.g., of a computing device 102. Technique 1500 uses decision trees, e.g., classification and regression (CART) trees. In some examples of technique 1500, the distance 1336 can be determined with respect to the identities of leaves of the decision trees and without regard to the actual numerical values or other data that may be carried at the leaves.

In some examples, at operation 1502, the training module 226 can determine the broad computational model 1304 comprising at least one decision tree, e.g., a plurality of decision trees. For example, the training module 226 can perform recursive partitioning, boosting, bagging, RANDOM FOREST or xgboost training, or other techniques for building decision trees based, e.g., on feature values in feature vectors of set 1404 of feature vectors, training feature vectors, or other feature vectors.

Each non-leaf node of a decision tree can specify a test of one or more feature values in a feature vector, e.g., comparison(s) of those value(s) to learned threshold(s). The results of the test are used to select a child node for further testing. The decision tree can be traversed from a root node, performing tests at each non-leaf node, until a leaf of the tree is reached. The leaf can specify a prediction value with respect to a result to be estimated, e.g., a value indicating whether the input feature vector is associated with malware (classification), or how likely the input feature vector is associated with malware (regression).

In some examples, at operation 1504, the operation module 230 can operate the broad CM 1304 by processing the first feature vector 1314 through one or more decision trees of the plurality of decision trees to provide respective first-state items 1506 identifying leaves of the respective decision trees associated with the first feature vector. The first-state items 1506 can include, e.g., unique identifiers of the leaf nodes, such as leaf numbers in depth-first or breadth-first order; the paths through the tree traversed to reach the leaf nodes; or other indications of which leaves were selected by the respective decision trees. The first state value 1318 can include the first-state items 1506. For example, the first state value 1318 can be a K-element vector of the K first-state items 1506 corresponding to K decision trees of the broad CM 1304. The operation module 230 can traverse the decision trees as described in the previous paragraph. In an example using a forest of five decision trees, the first state value 1318 can be, e.g., the vector {8,9,7,9,3} to indicate that the first tree returned a value from leaf 8 based on the first feature vector 1314, the second tree return a value from leaf 9, and so on.

In some examples, at operation 1508, the operation module 230 can operate the broad CM 1304 by processing the trial feature vector 1328 through one or more decision trees of the plurality of decision trees to provide respective trial-state items 1510 identifying leaves of the respective decision trees associated with the trial feature vector 1328. This can be done as described with reference to operation 1504. The trial state value 1332 can include the trial-state items 1510. Continuing the five-tree example above, the trial state value 1332 can be, e.g., the vector {5,9,0,4,5}. Operation 1508 can be followed by operation 1512 or operation 1514.

In some examples, at operation 1512, the operation module 230 can determine the distance 1336 indicating a degree of matching of the first-state items with respective trial-state items. For example, the distance 1336 can indicate how many of the first-state items 1506 match respective items of the trial-state items 1510. For example, the operation module 230 can determine a bit vector in which each bit corresponds to a first-state item 1506 and a corresponding trial-state item 1510. The bit value can be 1 if the items associated with that bit match, and 0 if not. The operation module 230 can determine the distance 1336 as the number or percentage of 0 bits in the bit vector. Continuing the five-tree example above, the bit vector can be {0,1,0,0,0}, since 8≠5, 9=9, 7≠0, and so forth. Therefore, the distance 1336 can be ⅕=0.2.

Similar operations can be carried out without expressly forming a bit vector, e.g., by setting a distance counter to zero and then iterating over the first-state items 1506. For each first-state item 1506, the distance counter can be incremented if a corresponding trial-state item 1510 does not match that first-state item 1506. The distance 1336 can then be determined as the value in the distance counter, or as that value divided by the total number of first-state items 1506 (e.g., the number of decision trees). Using this division (e.g., a percentage) can reduce the sensitivity of distance computations to the specific number of decision trees used.

In some examples, the operation module 230 can determine the first state value 1318 and the trial state value 1332 including respective vectors of path values. Each path value identifies a leaf, as noted below, so can be a first-state item 1506 or a trial-state item 1510, respectively. Each path value can indicate, for the respective decision tree in the broad CM 1304, the path taken through that tree in determining that tree's output. Each path value can begin at the root of the respective tree (or an edge out of the root), end at a leaf node in the respective tree (or an edge into that leaf), and include identifications of what node(s) or edge(s) were visited between the root and the leaf.

In some examples using path values, at operation 1514, the operation module 230 can determine the distance 1336 by comparing at least one path value in the trial state value 1332 with at least one respective path value in the first state value 1318. The operation module 230 can determine at what depth the evaluation of each tree diverges, e.g., the number of nodes or edges away from the root of the respective decision tree at which a different edge is taken, or a different node reached, in the trial state value 1332 than in the first state value 1318. For two path values that are identical (no divergence), the depth can be determined to be, e.g., infinity, the depth of the tree, or the depth of the tree plus unity.

In some examples, divergence at deeper nodes in the tree corresponds to higher similarity than does divergence at shallower nodes in the tree, i.e., depth of divergence is positively correlated with similarity between the first feature vector 1314 and the trial feature vector 1328. Accordingly, in some examples of distance 1336 described with reference to operation 1514, higher distance values represent greater similarity. In other examples, operation 1514 can include determining a tentative value for distance 1336 using example techniques described with reference to FIG. 15. Operation 1514 can further include dividing a predetermined value by the tentative value, subtracting the tentative value from a predetermined value, or otherwise inverting the sense of distance 1336 so that larger tentative distances, and smaller distances 1336, represent greater similarity.

In some examples, depths are expressed in a normalized fashion, such as percent of maximum depth of the respective tree, percent of depth of minimum of the depths of the first feature vector and trial feature vector leaves, or percent of depth of the maximum of the depth of the first feature vector and trial feature vector leaves. This can permit comparing imbalanced trees (e.g., where leaves in a single tree are at varying depths), or comparing multiple trees in a forest, when not all the trees have the same depth. For example, the xgboost classifier sometimes produces decision forests in which later decision trees are less complex, and therefore less deep, than earlier decision trees.

In some examples of forests, operation module 230 can determine the distance 1336 indicating, e.g., the divergence of the first tree in the forest, the number of trees in the forest without divergence (or with divergence depths above a threshold), or the divergence depth of the first tree that differs between the two items. Additionally or alternatively, the path divergence values for multiple trees in a forest, with respect to a particular pair of feature vectors, can be combined in various ways. In a forest of K trees, in some examples, the K divergence values (e.g., normalized divergence values) can be combined to form distance 1336 using, e.g., min or max; mean or another measure of central tendency; or sum. In some examples, the K divergence values (e.g., normalized or not) form a coordinate vector in a K-dimensional space. The distance 1336 can be determined as the length of that coordinate vector, e.g., in a Euclidean, Manhattan, or other space.

In some examples, e.g., of xgboost training, the iteration can progress from earlier-determined decision trees to later-determined decision trees. The iteration can terminate upon reaching a first-state item 1506 (or, in some examples, a trial-state item 1510) satisfying a termination criterion, e.g., having a value less than a threshold. This can reduce the time required to determine the distance 1336 without significantly reducing accuracy in systems in which later-determined decision trees carry generally lower-magnitude state values than do earlier-determined decision trees. In some examples, termination criteria can be used with other comparisons of state values, e.g., as discussed herein with reference to operation 1612 and 1712.

Figure 16:
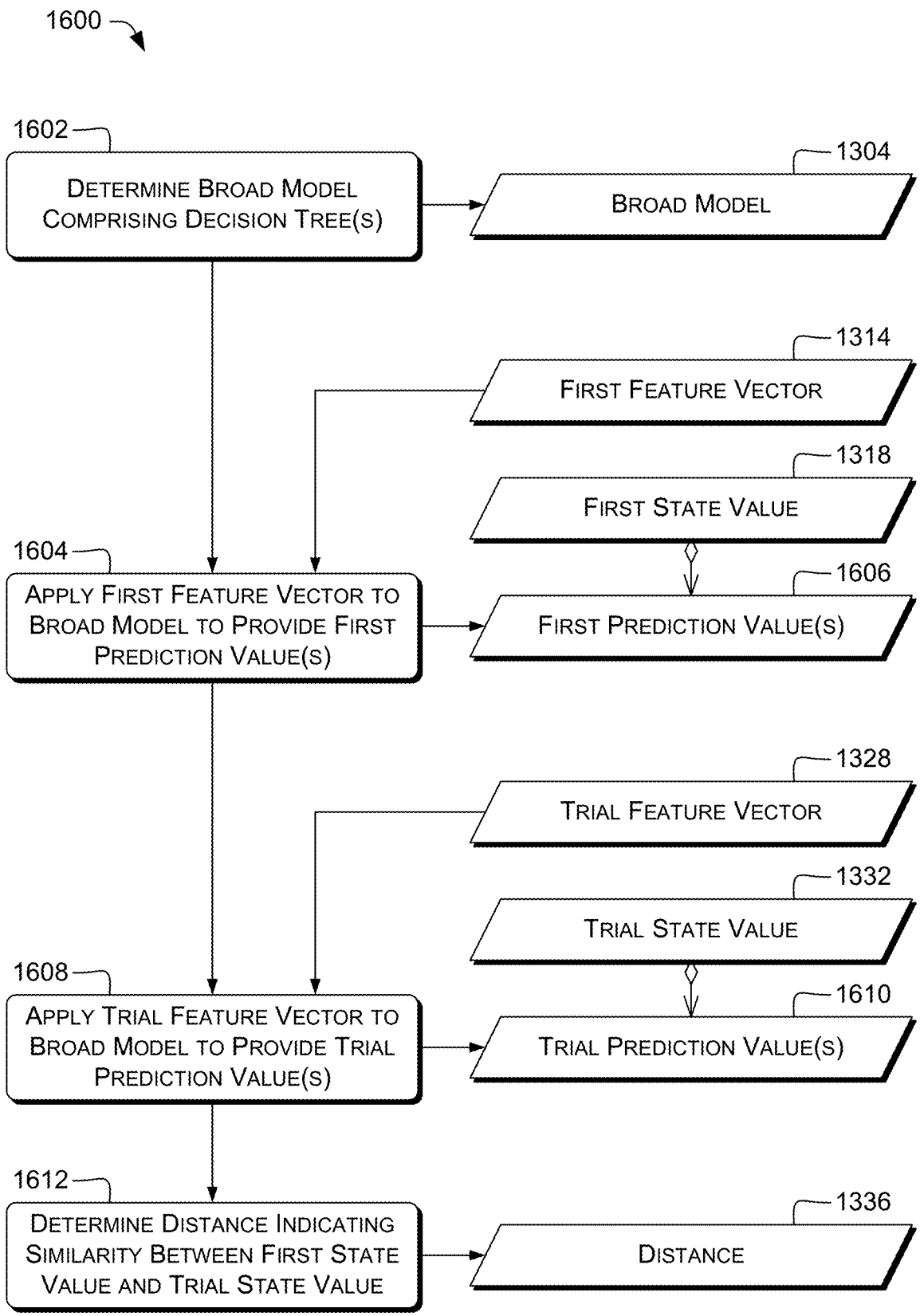
FIG. 16 is a dataflow diagram that illustrates example techniques for determining and operating decision-tree model(s), e.g., to determine whether a trial data stream is associated with malware.

FIG. 16 is a dataflow diagram that illustrates an example technique 1600 for determining and operating decision-tree based computational model(s), and related dataflow. In some examples, technique 1600 can be performed by a control unit, as described herein, e.g., of a computing device 102. In some examples of technique 1600, distance 1336 can be determined based on the values at leaves of a decision tree.

In some examples, at operation 1602, the training module 226 can determine the broad computational model 1304 comprising a plurality of decision trees. Examples are discussed herein, e.g., with reference to operation 1502.

In some examples, at operation 1604, the operation module 230 can operate the broad computational model 1304 by processing the first feature vector 1314 through one or more decision trees of the plurality of decision trees to provide one or more first prediction values 1606. The first state value 1318 can include the one or more first prediction values 1606. Operation of the broad CM 1304 can be as discussed herein with reference to operation 1504. The first prediction values 1606 can be first-state items 1506, or can be other outputs of the decision-tree traversal process.

In some examples of regression trees, each first prediction value 1606 is a numerical value indicating a function value. For example, function values of +1 can indicate that a feature vector is associated with malware, and function values of −1 can indicate that a feature vector is not associated with malware. Other values can be used, e.g., zero and one. In some examples of classification trees, each first prediction value 1606 can be an output, e.g., a bit or other discrete value, indicating whether the corresponding feature vector is considered by the corresponding decision tree to be clean or dirty.

In some examples, accordingly, the first prediction values 1606 can be the prediction values provided by respective decision trees of the one or more decision trees. Additionally or alternatively, the one or more first prediction values 1606 can include or consist of a single value. The single value can be, e.g., the sum, median, or other single-value aggregate of the prediction values provided by the one or more decision trees. The single value can additionally or alternatively be such a single-value aggregate, processed through a logistic or other squashing function to provide a consistent range, or a single-value aggregate of prediction values to which such a squashing function has been applied.

In some examples, at operation 1608, the operation module 230 can operate the broad CM 1304 by processing the trial feature vector 1328 through one or more decision trees of the plurality of decision trees to provide one or more trial prediction values 1610. The trial state value 1332 can include the trial prediction values 1610. Examples are discussed herein, e.g., with reference to operations 1508 and 1604. The trial prediction values 1610 can be determined using single-value aggregating or squashing as described with respect to the first prediction values 1606.

In some examples, at operation 1612, the operation module 230 can determine the distance 1336 indicating a similarity between the first state value 1318 and the trial state value 1332. In some examples, the similarity can be positively correlated with distance 1336 (i.e., higher similarity implies higher distance, e.g., for metrics that measure dissimilarity); in other examples, the similarity can be negatively correlated with distance 1336 (i.e., higher similarity implies lower distance). Some examples include computing the similarity as a dissimilarity value, and determining the distance 1336 as, e.g., a maximum value minus the dissimilarity, or the reciprocal of the dissimilarity.

In some examples using multi-element state values 1318 and 1332 (e.g., per-tree prediction values, per-tree leaf identifiers, per-tree depth values of nodes of divergence between first feature vector 1314 and trial feature vector 1328), the operation module 230 can treat the first state value 1318 and the trial state value 1332 as respective vectors, and can compute a distance between those vectors or other indication of similarity or dissimilarity of those vectors. Examples are discussed herein, e.g., with reference to operation 1334. For example, operation 1612 can include comparing prediction values of the first prediction values 1606 to corresponding prediction values of the trial prediction values 1610. Additionally or alternatively, in some examples using single-element state values 1318 and 1332 (e.g., single-value aggregates such as the squashed sum of the individual prediction values), operation 1612 can include determining a difference or ratio of the state values 1318 and 1332.

Figure 17:
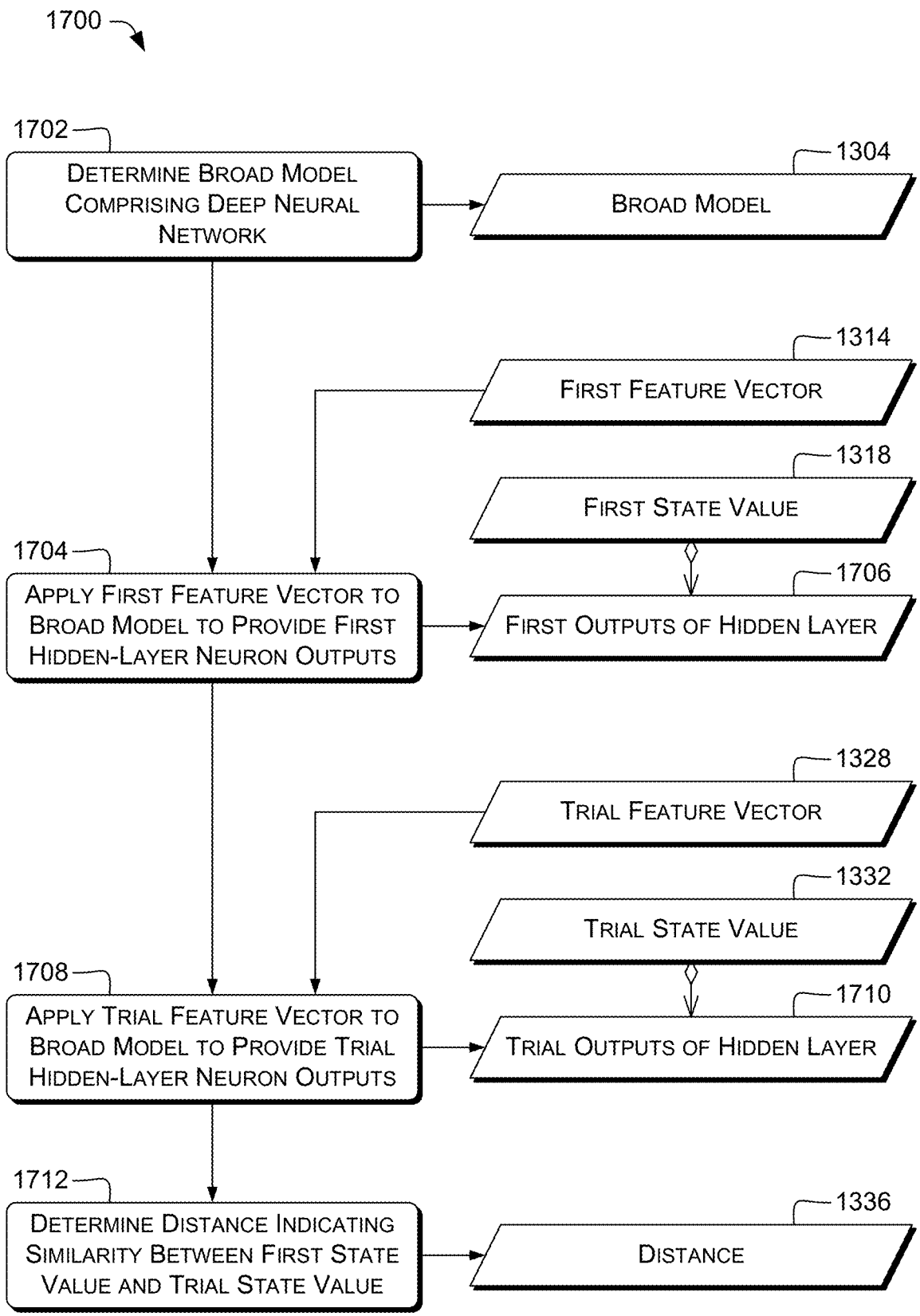
FIG. 17 is a dataflow diagram that illustrates example techniques for determining and operating deep neural network model(s), e.g., to determine whether a trial data stream is associated with malware.

FIG. 17 is a dataflow diagram that illustrates an example technique 1700 for determining and operating DNN-based computational model(s), and related dataflow. In some examples, technique 17 can be performed by a control unit, as described herein, e.g., of a computing device 102. In some examples of technique 1700, distance 1336 can be determined based on interior values in a DNN, e.g., values of a chokepoint layer.

In some examples, at operation 1702, the training module 226 can determine the broad CM 1304 comprising a deep neural network (DNN). The DNN can include an input layer, a hidden layer, and an output layer. In some examples, the hidden layer has fewer neurons than the input layer does, and the hidden layer has fewer neurons than the output layer does. In these examples, the hidden layer is an example of a chokepoint layer. In some examples, the DNN includes more than one hidden layer. Operations 1704-1712 can be performed with respect to any hidden layer of the DNN. Operation 1702 can include operating a supervised-learning process such as gradient descent or other learning techniques such as those described herein with reference to FIG. 2.

In some examples, at operation 1704, the operation module 230 can operate the broad CM 1304 by applying the first feature vector 1314 to the input layer and determining the first state value 1318 including first outputs 1706 of one or more neurons of the hidden layer.

In some examples, at operation 1708, the operation module 230 can operate the broad CM 1304 by applying the trial feature vector 1328 to the input layer and determining the trial state value 1332 comprising trial outputs 1710 of one or more neurons of the hidden layer.

In some examples, at operation 1712, the operation module 230 can determine the distance 1336 indicating a similarity between the first state value 1318 and the trial state value 1332. Similarity can be determined, e.g., as described herein with reference to operation 1612.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method of determining that a trial data stream is associated with malware, the method comprising, by a control unit: receiving, via a communications interface, a first feature vector associated with a first data stream, wherein the first data stream is associated with malware; determining a local computational model associated with the first data stream based at least in part on: the first feature vector; a second feature vector that is not associated with malware; and a third feature vector that is associated with malware; receiving, via the communications interface, a fourth feature vector associated with the trial data stream; applying the fourth feature vector to a broad computational model to determine a first value indicating whether the trial data stream is associated with malware; applying the fourth feature vector to the local computational model to determine a second value indicating whether the trial data stream is associated with malware; in response to the second value indicating the trial data stream is associated with malware, providing, via the communications interface, a first indication that the trial data stream is associated with malware.

B: The method according to paragraph A, further comprising, in response to the first value indicating the trial data stream is not associated with malware, applying the fourth feature vector to a second local computational model to determine a third value indicating whether the trial data stream is associated with malware; and applying the fourth feature vector to the local computational model further in response to the third value indicating the trial data stream is not associated with malware.

C: The method according to paragraph A or B, further comprising, before applying the fourth feature vector to the local computational model, determining that the local computational model is within a neighborhood of the fourth feature vector.

D: The method according to any of paragraphs A-C, further comprising applying the fourth feature vector to the local model in response to the first value indicating the trial data stream is not associated with malware.

E: The method according to any of paragraphs A-D, further comprising, by a second control unit communicatively connected with the control unit: receiving, via a second communications interface communicatively connected with the second control unit, the first indication, and, in response, performing at least one of: deleting the trial data stream from a computer-readable medium communicatively connected with the second control unit; quarantining the trial data stream on the computer-readable medium; or terminating a process associated with the trial data stream by: locating the process active on the second control unit; and terminating the process on the second control unit.

F: The method according to any of paragraphs A-E, further comprising, by the control unit: determining the local computational model by: determining a feature-vector transformation based at least in part on at least a portion of the broad computational model; and applying the feature-vector transformation to the first feature vector to determine a fifth feature vector; applying the fourth feature vector to the local computational model by: applying the feature-vector transformation to the fourth feature vector to determine a sixth feature vector; and determining the second value indicating that the trial data stream is associated with malware if the sixth feature vector is within a predetermined distance of the fifth feature vector.

G: The method according to any of paragraphs A-F, further comprising, by the control unit: receiving, via the communications interface, an identifier of the trial data stream; storing, in a computer-readable medium, an association between the identifier and the second value; subsequently, receiving, via the communications interface, a query comprising a query identifier; determining that the query identifier matches the identifier; retrieving the second value from the computer-readable medium; and providing, via the communications interface, a query response comprising or indicating the second value.

H: The method according to any of paragraphs A-G, wherein the broad computational model is associated with a plurality of data streams, the method further comprising, by the control unit: receiving a plurality of fifth feature vectors associated with respective dirty data streams; determining a plurality of local computational models based at least in part on respective feature vectors of the plurality of fifth feature vectors; and subsequently, determining a second broad computational model based at least in part on at least some data streams of the plurality of data streams and on at least some data streams of the plurality of dirty data streams.

I: The method according to any of paragraphs A-H, wherein distances are determined as Mahalanobis distances in a feature space.

J: A method comprising, by a control unit: receiving a first feature vector associated with a first data stream, wherein the first data stream is associated with malware; selecting, from a set of feature vectors, a second feature vector associated with a second data stream, wherein the second data stream is not associated with malware; selecting, from the set of feature vectors, a third feature vector associated with a third data stream, wherein the third data stream is associated with malware; and determining, based at least in part on the first feature vector, the second feature vector, and the third feature vector, a local computational model defining a dirty region of a feature space, the dirty region containing the first feature vector and excluding the second feature vector.

K: The method according to paragraph J, wherein the first data stream is associated with a first family of malware, the method further comprising, by the control unit, selecting the third feature vector associated with the third data stream of the first family of malware.

L: The method according to paragraph J or K, further comprising, by the control unit, determining the local computational model using fewer than all of a plurality of elements of each of the first feature vector, the second feature vector, and the third feature vector.

M: The method according to any of paragraphs J-L, further comprising repeating the method with respect to a fourth feature vector to determine a second local computational model defining a second dirty region of the feature space, the second dirty region containing the fourth feature vector.

N: The method according to any of paragraphs J-M, further comprising, by the control unit, receiving a first group of feature vectors, the first plurality comprising the first feature vector; selecting a second group of one or more feature vectors, the second group comprising the second feature vector; selecting a third group of one or more feature vectors, the second group comprising the third feature vector; and determining the local computational model further based at least in part on the first group, the second group, and the third group, wherein the dirty region contains the feature vectors of the first group and excludes the feature vectors of the second group.

O: The method according to paragraph N, further comprising determining a center of the dirty region as at least one of a centroid or a medoid of the first group.

P: The method according to any of paragraphs J-O, further comprising, by the control unit: receiving a trial feature vector associated with a trial data stream; applying the trial feature vector to the local computational model to determine whether the trial feature vector is within the dirty region of the feature space; and in response to determining that the trial feature vector is within the dirty region of the feature space, providing, via a communications interface, an indication that the trial data stream is associated with malware.

Q: The method according to paragraph P, further comprising applying the trial feature vector to a second local computational model; and, in response to determining that the trial feature vector is within a second dirty region defined by the second local computational model, providing, via the communications interface, the indication that the trial data stream is associated with malware.

R: The method according to paragraph P or Q, further comprising, before applying the trial feature vector to the local computational model, determining that the local computational model is within a neighborhood of the trial feature vector.

S: The method according to any of paragraphs J-R, further comprising, by the control unit: selecting the second feature vector being no farther from the first feature vector than is any other feature vector not associated with malware of the set of feature vectors; selecting the third feature vector having a distance from the first feature vector satisfying a predetermined criterion with respect to at least one other feature vector of the set of feature vectors, the at least one other feature vector being associated with malware; determining a radius of a hypersphere in the feature space, the radius being at most the lower of: a distance from the second feature vector to the first feature vector; and a distance from the third feature vector to the first feature vector; and determining the dirty region being a hypersphere within the feature space, the hypersphere substantially centered at the first feature vector and having the determined radius.

T: The method according to paragraph S, further comprising, by the control unit, selecting the third feature vector having a distance to the first feature vector of a predetermined rank with respect to distances between the at least one other feature vector and the first feature vector.

U: The method according to paragraph S or T, further comprising, by the control unit, determining the radius being at most the lower of: a predetermined percentage of the distance from the second feature vector to the first feature vector, wherein the predetermined percentage is greater than zero and is less than one hundred percent; and a distance from the third feature vector to the first feature vector.

V: The method according to any of paragraphs J-U, further comprising, by the control unit, determining a transformation from the feature space to a second feature space and determining the local computational model defining the dirty region in the second feature space.

W: The method according to any of paragraphs J-V, further comprising, by the control unit: determining, for each training feature vector of a plurality of training feature vectors, a respective training value indicating strength of association of that training feature vector with malware, wherein the plurality of training feature vectors comprises the second feature vector and the third feature vector; and determining, based at least in part on at least some of the training values, the local computational model configured to: receive as input a trial feature vector; and provide as output a trial value indicating strength of association of the trial feature vector with malware X: The method according to paragraph W, further comprising, by the control unit, determining the dirty region comprising a hypersphere according to operations recited in any of paragraphs S-U; and determining the local computational model configured to provide, as output, a trial value indicating the trial data stream is not associated with malware in response to the trial feature vector being outside the hypersphere.

Y: The method according to paragraph W or X, further comprising, by the control unit, selecting, from the set of feature vectors, the plurality of training feature vectors.

Z: The method according to any of paragraphs J-Y, wherein: the method further comprises, by the control unit, determining the local computational model comprising a Gaussian process model by fitting the Gaussian process model to training data; the training data comprises a plurality of training feature vectors and respective training values indicating strengths of association with malware of the respective training feature vectors; and the plurality of training feature vectors comprises the first feature vector, the second feature vector, and the third feature vector.

AA: The method according to any of paragraphs J-Z, further comprising, by the control unit: determining a transformation based at least in part on a plurality of training feature vectors, the plurality of training feature vectors comprising the second feature vector and the third feature vector, by; determining, for each dimension of a plurality of dimensions of the feature space, a respective quantile set based on the extent in that dimension of at least some of the plurality of training feature vectors; and determining the transformation scaling each dimension of the plurality of dimensions into a common range based at least in part on the respective quantile set; determining a distance function based at least in part on the plurality of training feature vectors by: applying the transformation to at least some training feature vectors of the plurality of training feature vectors to provide transformed training feature vectors; determining a plurality of representative axes based at least in part on the transformed training feature vectors; and determining the distance function based at least in part on the transformed training feature vectors and the plurality of representative axes, wherein the distance function is configured to determine a distance in a space associated with the representative axes; applying the transformation to the first feature vector to provide a transformed first feature vector; applying the transformation to the second feature vector to provide a transformed second feature vector; determining a distance between the transformed first feature vector and the transformed second feature vector; and determining the local computational model based at least in part on the distance.

AB: The method according to any of paragraphs J-AA, wherein distances are determined as Mahalanobis distances in a feature space.

AC: A method of determining whether a trial data stream is associated with malware, the method comprising, by a control unit: determining a broad computational model based at least in part on training feature vectors of a plurality of training feature vectors and on respective labels of the training feature vectors, wherein: each of the labels indicates whether the respective training feature vector is associated with malware; and the broad computational model is configured to receive as input a feature vector and to provide as output both: a label indicating whether the feature vector is associated with malware; and a state value associated with the feature vector; receiving, via a communications interface, a first feature vector that is associated with malware; operating the broad computational model based on the first feature vector to determine a first state value associated with the first feature vector; determining a local computational model comprising the first state value and associated with a distance criterion; receiving, via a communications interface, a trial feature vector associated with the trial data stream; operating the broad computational model based on the trial feature vector to determine a trial state value associated with the trial feature vector; determining a distance between the first state value of the local computational model and the trial state value; determining that the distance satisfies the distance criterion of the local computational model; and in response, providing, via the communications interface, an indication that the trial data stream is associated with malware.

AD: The method according to paragraph AC, further comprising, by the control unit: selecting, from a set of feature vectors, a second feature vector that is not associated with malware; selecting, from the set of feature vectors, a third feature vector that is associated with malware; operating the broad computational model based on the second feature vector to determine a second state value associated with the second feature vector; operating the broad computational model based on the third feature vector to determine a third state value associated with the third feature vector; determining a second distance between the first state value and the second state value; determining a third distance between the first state value and the third state value; determining a fourth distance by reducing the third distance based at least in part on a predetermined distance-modification rule; determining a threshold distance that is at most the lower of the second distance and the fourth distance; and determining the distance criterion indicating that the trial data stream is determined to be associated with malware if the distance is less than the threshold distance.

AE: The method according to paragraph AC or AD, further comprising, by the control unit: determining the broad computational model comprising a plurality of decision trees; operating the broad computational model by processing the first feature vector through one or more decision trees of the plurality of decision trees to provide respective first-state items identifying leaves of the respective decision trees associated with the first feature vector; operating the broad computational model by processing the trial feature vector through one or more decision trees of the plurality of decision trees to provide respective trial-state items identifying leaves of the respective decision trees associated with the trial feature vector; and determining the distance indicating a degree of matching of the first-state items with respective trial-state items; wherein the first state value comprises the first-state items and the trial state value comprises the trial-state items.

AF: The method according to any of paragraphs AC-AE, further comprising, by the control unit: determining the broad computational model comprising a plurality of decision trees; operating the broad computational model by processing the first feature vector through one or more decision trees of the plurality of decision trees to provide one or more first prediction values, wherein the first state value comprises the one or more first prediction values; operating the broad computational model by processing the trial feature vector through one or more decision trees of the plurality of decision trees to provide one or more trial prediction values, wherein the trial state value comprises the one or more trial prediction values; and determining the distance indicating a similarity between the first state value and the trial state value.

AG: The method according to any of paragraphs AC-AF, further comprising, by the control unit: determining the broad computational model comprising a deep neural network (DNN), the DNN comprising an input layer, a hidden layer, and an output layer; operating the broad computational model by applying the first feature vector to the input layer and determining the first state value comprising first outputs of one or more neurons of the hidden layer; operating the broad computational model by applying the trial feature vector to the input layer and determining the trial state value comprising trial outputs of one or more neurons of the hidden layer; and determining the distance indicating a similarity between the first state value and the trial state value.

AH: The method according to paragraph AG, wherein the hidden layer has fewer neurons than the input layer does.

AI: The method according to paragraph AH, wherein the hidden layer has fewer neurons than the output layer does.

AJ: The method according to any of paragraphs AC-AI, wherein distances are determined as Mahalanobis distances in a feature space.

AK: A computer-readable medium, e.g., a computer storage medium, having thereon computer-executable instructions, the computer-executable instructions upon execution configuring a computer to perform operations as any of paragraphs A-I, J-AB, or AC-AJ recites.

AL: A device comprising: a processor; and a computer-readable medium, e.g., a computer storage medium, having thereon computer-executable instructions, the computer-executable instructions upon execution by the processor configuring the device to perform operations as any of paragraphs A-I, J-AB, or AC-AJ recites.

AM: A system comprising: means for processing; and means for storing having thereon computer-executable instructions, the computer-executable instructions including means to configure the system to carry out a method as any of paragraphs A-I, J-AB, or AC-AJ recites.

CONCLUSION

Various computational-model determination and operation techniques described herein, e.g., for determining and operating local models 224, can permit more efficiently determining a classification of a data stream. Various examples can reduce the time or memory requirements of software to determine classifications while maintaining or improving the accuracy of such determinations. Some examples permit supplementing a broad model 222 with at least one local model 224 to prevent false misses without requiring full retraining of the broad model 222 every time a false miss occurs. In some examples, local models 224 can be computationally inexpensive to operate, so can be used in a high-query-volume production environment (e.g., cloud or appliance) to detect newly-developed malware variants, e.g., polymorphic malware, with reduced computational load compared to some prior schemes. Some examples herein can provide improved accuracy of classification of malware within a malware family, based on one sample (or a small number of samples). Some examples herein can provide targeted local models, reducing the risk of false detections and hence reducing the amount of testing and validation needed before a local model can be deployed. Some examples are described with reference to malware, but techniques described herein are not limited to files associated with malware. For example, techniques used herein can be used to determine classifications 122 of media files (e.g., audio, video, or image); productivity files (e.g., text documents or spreadsheets); data files (e.g., database indexes or tables); or other types of files. Furthermore, techniques described herein in the context of malware can also be used in the context of clean file detection, for example to mitigate false detections on a family of legitimate applications by generating a local model targeting those legitimate applications. Some examples may provide any of, or none of, the above-listed benefits, or other benefits. The claims are not limited to examples providing the benefits described above, and at least one embodiment within the scope of the claims may not provide any of the benefits described above. Furthermore, the claimed subject matter is not limited to implementations that solve any or all disadvantages noted in any part of this disclosure.

Various examples herein can be used with a variety of types of data streams, including data streams that have been compiled or linked, assembled into distribution packages or script packages, combined into self-extractors or self-installers, packed, or encrypted, e.g., for content protection. Example trial data streams 120 that can be analyzed using CM(s) 112 as described herein include, but are not limited to, PE, ELF, Mach-O, JAR, or DEX executables, or any other executable formats; PNG, GIF, or other image formats; OGG, MP3, MP4, Matroska, or other audio or video container or bitstream formats; or traces of network traffic, e.g., headers or bodies of data packets in protocols such as IEEE 802.11, IP, UDP, or TCP. Example types of trial data streams 120 that can be analyzed using CM(s) 112 as described herein include, but are not limited to, executables, static libraries, dynamic libraries, data files, compressed files, encrypted files, or obfuscated files.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed invention. For example, computing devices 102 or 104, network 108, processing unit(s) 210, or other structures described herein for which multiple types of implementing devices or structures are listed can include any of the listed types, and/or multiples and/or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS) 216. In other instances, the functionality and/or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing device(s) 102, 104, and/or 200, such as one or more internal or external CPUs or GPUs, or one or more pieces of hardware logic such as FPGAs, DSPs, or other types of accelerators.

What is claimed is:

1. A method of determining that a trial data stream is associated with malware, the method comprising, by a control unit:
  receiving, via a communications interface, a first feature vector in a first feature space associated with a first data stream, wherein the first data stream is associated with malware;
  determining a local computational model associated with the first data stream based at least in part on:
    the first feature vector;
    a second feature vector in the first feature space that is not associated with malware; and
    a third feature vector in the first feature space that is associated with malware;
  receiving, via the communications interface, a fourth feature vector in a first feature space associated with the trial data stream;
  applying the fourth feature vector to a broad computational model to determine a first value indicating whether the trial data stream is associated with malware;
  applying the fourth feature vector to the local computational model to determine a second value indicating whether the trial data stream is associated with malware including:
    determining a feature-vector transformation based at least in part on at least a portion of the broad computational model;
    transforming the fourth feature vector in the first feature space to a fifth feature vector in a second feature space; and
    determining the second value based at least in part on applying the fifth feature vector to the local computational model; and
  in response to the second value indicating the trial data stream is associated with malware, providing, via the communications interface, a first indication that the trial data stream is associated with malware.

2. The method according to claim 1, further comprising, by a second control unit communicatively connected with the control unit:
  receiving, via a second communications interface communicatively connected with the second control unit, the first indication; and
  in response, performing at least one of:
    deleting the trial data stream from a computer-readable medium communicatively connected with the second control unit;
    quarantining the trial data stream on the computer-readable medium; or
    terminating a process associated with the trial data stream by:
      locating the process active on the second control unit; and
      terminating the process on the second control unit.

3. The method according to claim 1, further comprising, by the control unit:
  receiving, via the communications interface, an identifier of the trial data stream;
  storing, in a computer-readable medium, an association between the identifier and the second value;
  subsequently, receiving, via the communications interface, a query comprising a query identifier;
  determining that the query identifier matches the identifier;
  retrieving the second value from the computer-readable medium; and
  providing, via the communications interface, a query response comprising or indicating the second value.

4. The method according to claim 1, wherein:
  the broad computational model is associated with a plurality of data streams; and
  the method further comprises, by the control unit:
    receiving a plurality of fifth feature vectors associated with respective dirty data streams;
    determining a plurality of local computational models based at least in part on respective feature vectors of the plurality of fifth feature vectors; and subsequently, determining a second broad computational model based at least in part on at least some data streams of the plurality of data streams and on at least some data streams of the plurality of dirty data streams.

5. A method comprising, by a control unit:
receiving a first feature vector associated with a first data stream, wherein the first data stream is associated with malware;
selecting, from a set of feature vectors, a second feature vector associated with a second data stream, wherein the second data stream is not associated with malware;
selecting, from the set of feature vectors, a third feature vector associated with a third data stream, wherein the third data stream is associated with malware;
determining a transformation from the feature space to a second feature space;
determining a local computational model defining a dirty region in the second feature space; and
determining, based at least in part on the first feature vector, the second feature vector, and the third feature vector, the dirty region containing the first feature vector, excluding the second feature vector, and being a hypersphere within the feature space, the hypersphere substantially centered at the first feature vector and having a radius determined based on at least one of a distance from the second feature vector to the first feature vector, or a distance from the third feature vector to the first feature vector.

6. The method according to claim 5, further comprising, by the control unit:
receiving a trial feature vector associated with a trial data stream;
applying the trial feature vector to the local computational model to determine whether the trial feature vector is within the dirty region of the feature space; and
in response to determining that the trial feature vector is within the dirty region of the feature space, providing, via a communications interface, an indication that the trial data stream is associated with malware.

7. The method according to claim 5, further comprising, by the control unit:
selecting the second feature vector being no farther from the first feature vector than is any other feature vector not associated with malware of the set of feature vectors;
selecting the third feature vector having a distance from the first feature vector satisfying a predetermined criterion with respect to at least one other feature vector of the set of feature vectors, the at least one other feature vector being associated with malware; and
determining the radius of the hypersphere in the feature space, the radius being at most the lower of:
the distance from the second feature vector to the first feature vector; and
the distance from the third feature vector to the first feature vector.

8. The method according to claim 7, further comprising, by the control unit, selecting the third feature vector having a distance to the first feature vector of a predetermined rank with respect to distances between the at least one other feature vector and the first feature vector.

9. The method according to claim 7, further comprising, by the control unit, determining the radius being at most the lower of:
a predetermined percentage of the distance from the second feature vector to the first feature vector, wherein the predetermined percentage is greater than zero and is less than 100%; and
the distance from the third feature vector to the first feature vector.

10. The method according to claim 5, further comprising, by the control unit:
determining, for each training feature vector of a plurality of training feature vectors, a respective training value indicating strength of association of that training feature vector with malware, wherein the plurality of training feature vectors comprises the second feature vector and the third feature vector; and
determining, based at least in part on at least some of the training values, the local computational model configured to:
receive as input a trial feature vector; and
provide as output a trial value indicating strength of association of the trial feature vector with malware.

11. The method according to claim 5, wherein:
the method further comprises, by the control unit, determining the local computational model comprising a Gaussian process model by fitting the Gaussian process model to training data;
the training data comprises a plurality of training feature vectors and respective training values indicating strengths of association with malware of the respective training feature vectors; and
the plurality of training feature vectors comprises the first feature vector, the second feature vector, and the third feature vector.

12. The method according to claim 5, further comprising, by the control unit:
determining a transformation based at least in part on a plurality of training feature vectors, the plurality of training feature vectors comprising the second feature vector and the third feature vector, by:
determining, for each dimension of a plurality of dimensions of the feature space, a respective quantile set based on the extent in that dimension of at least some of the plurality of training feature vectors; and
determining the transformation scaling each dimension of the plurality of dimensions into a common range based at least in part on the respective quantile set;
determining a distance function based at least in part on the plurality of training feature vectors by:
applying the transformation to at least some training feature vectors of the plurality of training feature vectors to provide transformed training feature vectors;
determining a plurality of representative axes based at least in part on the transformed training feature vectors; and
determining the distance function based at least in part on the transformed training feature vectors and the plurality of representative axes, wherein the distance function is configured to determine a distance in a space associated with the representative axes;
applying the transformation to the first feature vector to provide a transformed first feature vector;
applying the transformation to the second feature vector to provide a transformed second feature vector;
determining a distance between the transformed first feature vector and the transformed second feature vector; and determining the local computational model based at least in part on the distance.

13. A method of determining whether a trial data stream is associated with malware, the method comprising, by a control unit:
    determining a broad computational model based at least in part on training feature vectors of a plurality of training feature vectors and on respective labels of the training feature vectors, wherein:
        each of the labels indicates whether the respective training feature vector is associated with malware; and
        the broad computational model comprises a plurality of decision trees and is configured to receive as input a feature vector and to provide as output both:
            a label indicating whether the feature vector is associated with malware; and
            a state value indicating a leaf of the decision tree associated with the feature vector;
    receiving, via a communications interface, a first feature vector that is associated with malware;
    operating the broad computational model based on the first feature vector to determine a first state value associated with the first feature vector;
    determining a local computational model comprising the first state value and associated with a distance criterion;
    receiving, via a communications interface, a trial feature vector associated with the trial data stream;
    operating the broad computational model based on the trial feature vector to determine a trial state value associated with the trial feature vector;
    determining a distance between the first state value of the local computational model and the trial state value;
    determining that the distance satisfies the distance criterion of the local computational model; and
    in response, providing, via the communications interface, an indication that the trial data stream is associated with malware.

14. The method according to claim 13, further comprising, by the control unit:
    selecting, from a set of feature vectors, a second feature vector that is not associated with malware;
    selecting, from the set of feature vectors, a third feature vector that is associated with malware;
    operating the broad computational model based on the second feature vector to determine a second state value associated with the second feature vector;
    operating the broad computational model based on the third feature vector to determine a third state value associated with the third feature vector;
    determining a second distance between the first state value and the second state value;
    determining a third distance between the first state value and the third state value;
    determining a fourth distance by reducing the third distance based at least in part on a predetermined distance-modification rule;
    determining a threshold distance that is at most the lower of the second distance and the fourth distance; and
    determining the distance criterion indicating that the trial data stream is determined to be associated with malware if the distance is less than the threshold distance.

15. The method according to claim 13, further comprising, by the control unit:
    operating the broad computational model by processing the first feature vector through one or more decision trees of the plurality of decision trees to provide respective first-state items identifying leaves of the respective decision trees associated with the first feature vector;
    operating the broad computational model by processing the trial feature vector through one or more decision trees of the plurality of decision trees to provide respective trial-state items identifying leaves of the respective decision trees associated with the trial feature vector; and
    determining the distance indicating a degree of matching of the first-state items with respective trial-state items;
    wherein the first state value comprises the first-state items and the trial state value comprises the trial-state items.

16. The method according to claim 13, further comprising, by the control unit:
    operating the broad computational model by processing the first feature vector through one or more decision trees of the plurality of decision trees to provide one or more first prediction values, wherein the first state value comprises the one or more first prediction values;
    operating the broad computational model by processing the trial feature vector through one or more decision trees of the plurality of decision trees to provide one or more trial prediction values, wherein the trial state value comprises the one or more trial prediction values; and
    determining the distance indicating a similarity between the first state value and the trial state value.

17. The method according to claim 13, further comprising, by the control unit:
    determining the broad computational model comprising a deep neural network (DNN), the DNN comprising an input layer, a hidden layer, and an output layer;
    operating the broad computational model by applying the first feature vector to the input layer and determining the first state value comprising first outputs of one or more neurons of the hidden layer;
    operating the broad computational model by applying the trial feature vector to the input layer and determining the trial state value comprising trial outputs of one or more neurons of the hidden layer; and
    determining the distance indicating a similarity between the first state value and the trial state value.

18. The method according to claim 17, wherein the hidden layer has fewer neurons than the input layer does.

* * * * *